(12) United States Patent
Coffee et al.

(10) Patent No.: US 8,484,370 B1
(45) Date of Patent: Jul. 9, 2013

(54) METHOD AND SYSTEM FOR EFFICIENT EXTENDED DATA COMMUNICATIONS USING GPRS

(75) Inventors: John Coffee, Tempe, AZ (US); Kevin Marvin, Gilbert, AZ (US); Terry Gin, Chandler, AZ (US); David Anderson, Gilbert, AZ (US)

(73) Assignee: Trimble Navigation Limited, Sunnyvale, CA (US)

( * ) Notice: Subject to any disclaimer, the term of this patent is extended or adjusted under 35 U.S.C. 154(b) by 2449 days.

(21) Appl. No.: 10/124,167

(22) Filed: Apr. 16, 2002

(51) Int. Cl.
*G06F 15/16* (2006.01)

(52) U.S. Cl.
USPC .......................... 709/232; 709/228; 709/234

(58) Field of Classification Search
USPC ...... 709/227–229, 217–219, 232, 234; 714/4, 714/23; 370/229–240, 230–235
See application file for complete search history.

(56) References Cited

U.S. PATENT DOCUMENTS

| | | | |
|---|---|---|---|
| 5,553,239 A * | 9/1996 | Heath et al. | 726/2 |
| 5,938,732 A * | 8/1999 | Lim et al. | 709/229 |
| 6,359,877 B1 * | 3/2002 | Rathonyi et al. | 370/349 |
| 6,370,656 B1 * | 4/2002 | Olarig et al. | 714/23 |
| 6,477,160 B2 * | 11/2002 | Gleeson | 370/337 |
| 6,621,793 B2 * | 9/2003 | Widegren et al. | 370/230.1 |
| 6,633,540 B1 * | 10/2003 | Raisanen et al. | 370/230.1 |
| 6,658,025 B2 * | 12/2003 | Mauritz et al. | 370/507 |
| 6,744,730 B2 * | 6/2004 | Le et al. | 370/229 |
| 6,901,081 B1 * | 5/2005 | Ludwig | 370/519 |
| 6,947,761 B2 * | 9/2005 | Hutcheson et al. | 455/518 |
| 6,950,398 B2 * | 9/2005 | Guo et al. | 370/235 |
| 6,961,334 B1 * | 11/2005 | Kaczmarczyk | 370/354 |
| 6,973,309 B1 * | 12/2005 | Rygula et al. | 455/436 |
| 7,099,273 B2 * | 8/2006 | Ha et al. | 370/229 |
| 7,106,714 B2 * | 9/2006 | Spear et al. | 370/336 |
| 7,130,268 B2 * | 10/2006 | Mascolo | 370/232 |
| 7,177,277 B2 * | 2/2007 | Koponen et al. | 370/235 |
| 7,280,809 B2 * | 10/2007 | Lauterbach et al. | 455/115.1 |
| 2001/0007137 A1 * | 7/2001 | Suumaki et al. | 714/18 |
| 2001/0025280 A1 * | 9/2001 | Mandato et al. | 707/3 |
| 2002/0111996 A1 * | 8/2002 | Jones et al. | 709/203 |
| 2002/0136174 A1 * | 9/2002 | Gleeson | 370/329 |
| 2003/0084161 A1 * | 5/2003 | Watson et al. | 709/227 |
| 2004/0057378 A1 * | 3/2004 | Gronberg | 370/230 |
| 2004/0075378 A1 * | 4/2004 | Niibori et al. | 313/495 |

FOREIGN PATENT DOCUMENTS

GB 2372406 A * 8/2002

OTHER PUBLICATIONS

Joshua et al., Improving TCP Performance over Multi-Slot GSM, Published on 1999 by IEEE, whole document.*
Drane et al. Positioning GSM Telephones, Published on Apr. 1998 by IEEE, whole document.*
Ludwig et al. "Multi-Layer Tracing of TCP over a Reliable Wireless Link" ACM SIGMETRICS © 1999.*
Meyer, "TCP Performance over GPRS" IEEE © 1999.*

* cited by examiner

*Primary Examiner* — Kenny Lin

(57) ABSTRACT

A method and system for efficient extended data communications using a GPRS (General Packet Radio Service) carrier network. In a communications system having a server and client device coupled by a GPRS network, a communication session is initiated by the client. A combination of data packet transmission frequency adjustment and the transmission of "keep alive" packets are used to prevent carrier network timeout of the communication session. In multiple server environments such as those using load sharing, a queuing mechanism is provided for outbound messages to client devices.

16 Claims, 30 Drawing Sheets

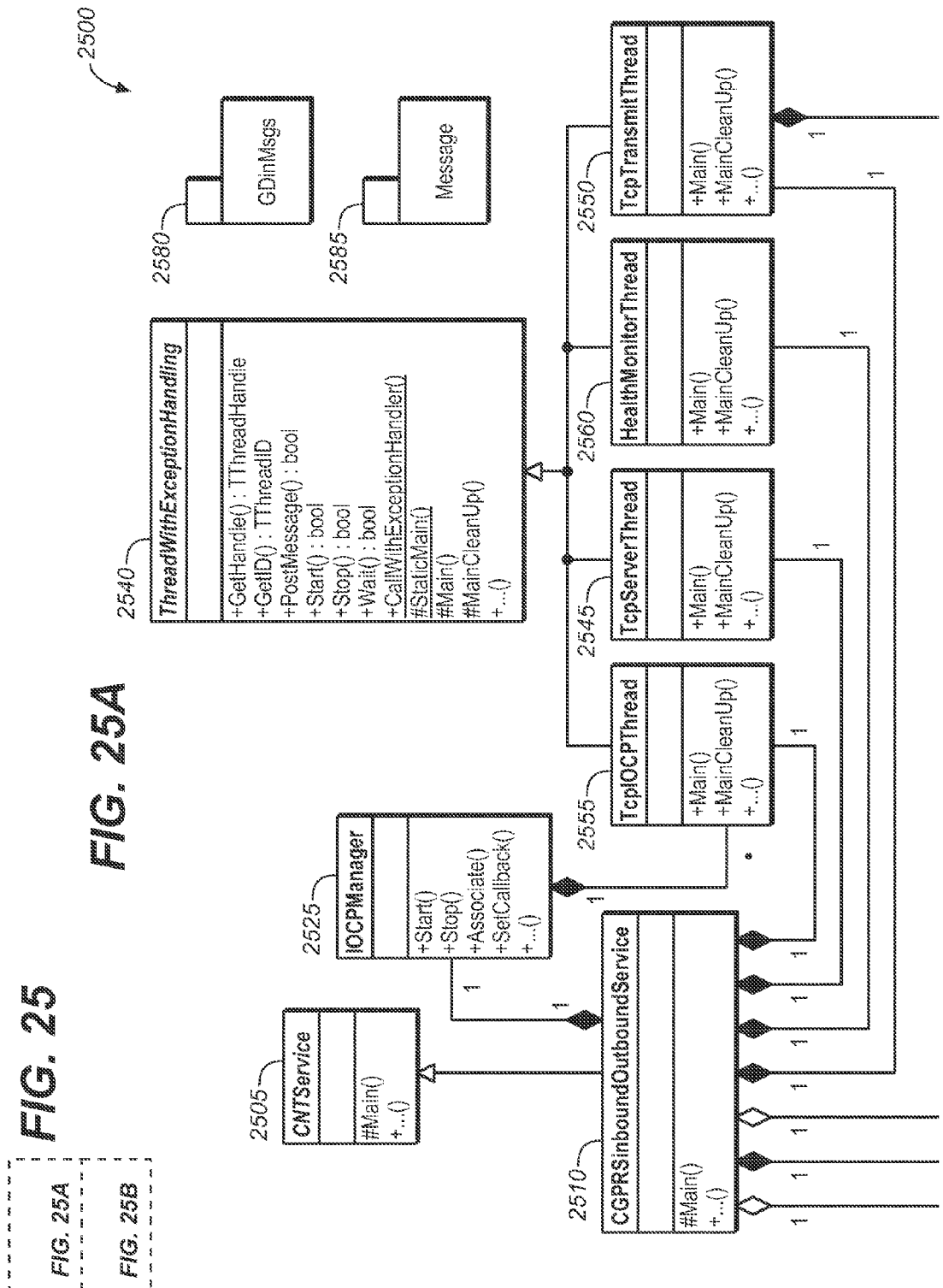

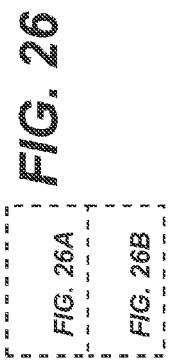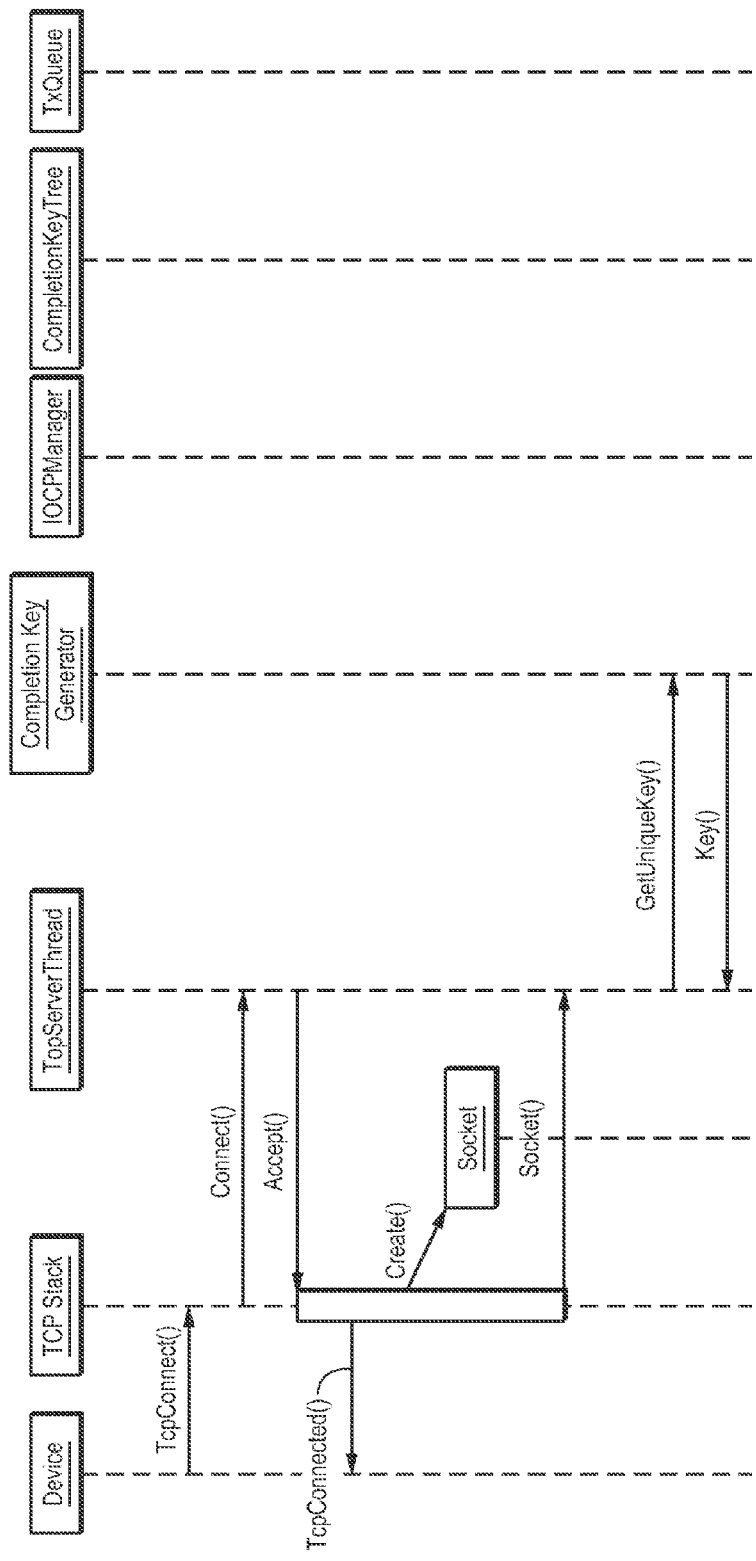

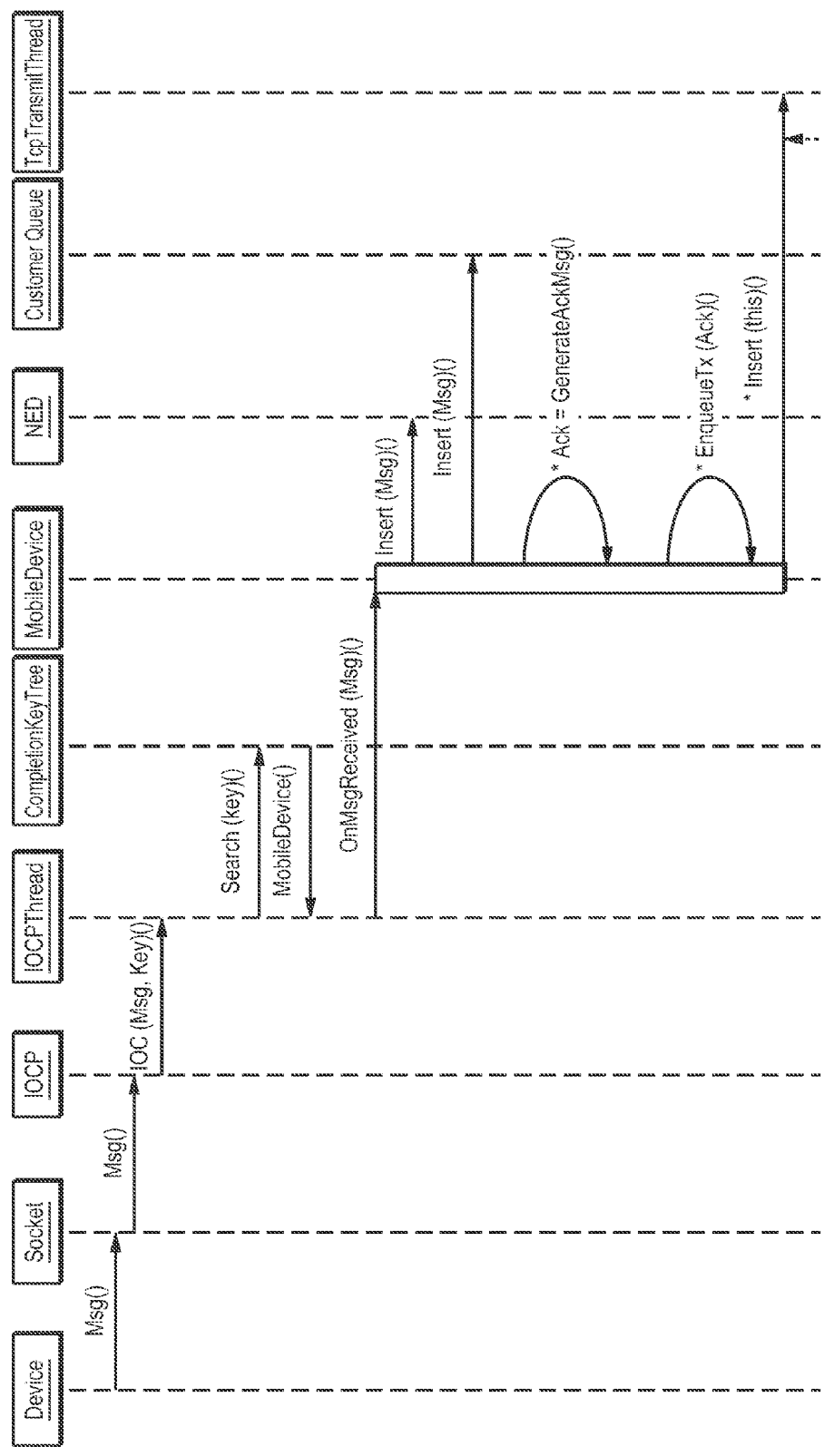

METHOD AND SYSTEM FOR EFFICIENT EXTENDED DATA COMMUNICATIONS USING GPRS

FIELD OF THE INVENTION

The present claimed invention relates to wireless communications between a base station and a remote device. More particularly, the present claimed invention relates to a method for efficient use of wireless bandwidth using packet based communications protocols.

BACKGROUND ART

General Packet Radio Service (GPRS) is an overlay onto the GSM (Global System for Mobile Communications) wireless cellular phone network that allows IP (Internet Protocol) based packet switched data communications. GPRS is an attractive medium for wireless data devices because it is packet switched instead of circuit switched and it is priced on a volume basis as opposed to a time basis. GPRS technology is also economically attractive when compared with other packet services, such as Cellular Digital Packet Data (CDPD).

Wide coverage and low cost make GPRS a very attractive transport mechanism for in-vehicle devices and wireless handsets. A GPRS device can provide packet data based real time dispatch services in the U.S., Canada, and Europe, and service is expanding to other regions as well.

The GPRS overlay on the GSM network provides for IP connectivity between the mobile devices and the platform (base station); however, the common implementation does not allow termination of IP connections at the mobile device. In addition, IP addresses assigned to mobiles will be private and dynamic. A protocol (such as the UDP-based protocol used with CDPD) that does not account for these factors cannot be used.

The GPRS data implementation differs greatly from that of CDPD. CDPD devices have fixed, public IP addresses. This means that their address on the Internet is always known and that data can be sent to them at any time, as long as they have CDPD service available.

The standard GPRS implementation is designed to support web browsing from wireless handsets. This is an operational model that is very familiar to the wireless carriers. This model is a TCP-based request/response paradigm. With this implementation, there are no device terminated IP connections. Devices are assigned dynamic, private IP addresses that reside behind a Network Address and Port Translator (NAPT). This scheme has the advantage to the wireless carrier of conserving public IP addresses and preventing unsolicited data (e.g. spam) from being sent to the device, and thus avoiding the billing issues related to it.

The lack of a device terminated IP connection is a significant disadvantage in telemetry applications and has three major difficulties. First, in order to send any data to a wireless device, a server side application must wait for the device to open an IP connection to the server. The frequency of device reporting and the time duration for which the connection can be maintained will determine the latency of messages sent to the device.

A second difficulty that is associated with the server side waiting for a device to open an IP connection, is the handling of messages targeted for a client device that has not opened connection with a server. For a system such as UDP (User Datagram Protocol) on CDPD, a simple FIFO (first in, first out) queue will suffice since the message destination is always known. However, for a system such as GPRS, messages may accumulate and/or age while a server waits for a device to establish a connection.

In production network environments, the communications workload is divided among many servers to provide both redundancy and load balancing. With CDPD, outbound messages may simply be forwarded to any server for transmission since CDPD devices have public static IP addresses. However, with GPRS, only the server instance to which a device connects may send an outbound message to the device. A practice of assigning each client device a dedicated server may result in workload imbalances among the servers depending upon the client device population activity. In a dedicated server environment, a portion of the servers will typically be under-utilized. A more efficient approach is to use load balancing, that is, assigning client devices on the basis of available servers. In a balanced load environment it is uncertain which server will be serving a new client at any particular time, and a FIFO queue will be inadequate for the task. The queuing mechanism must be able to deliver an outbound message to the particular server instance to which a device has connected.

The third difficulty with using GPRS for telemetry communications between a client device and a server is minimizing the overall cost. When a connection oriented protocol such as TCP (Transmission Control Protocol) is used, a GPRS carrier may have a time-out period for a connection that has not been used for a period of time. For telemetry applications that have periodic data transmissions with a period that exceeds the time-out period of the carrier, the overhead of frequent setup and teardown of connections will increase the cost.

The User Datagram Protocol (UDP) is a connectionless protocol with a minimum of packet overhead. Data are sent with no guarantee of delivery or handshaking between the sender and recipient. UDP is desirable for use in wireless links because of its low overhead and because delivery guarantee protocols are completely under the control of the applications, which can further minimize airtime costs.

However, in order for UDP to work, the recipient IP address must be known to the sender. In the case of GPRS, where the device IP is dynamic and private, the device IP address is not known to the platform until the device sends data to the platform. Once the device IP becomes known to the platform, there is still no guarantee that the platform will be able to send data back to the device because the GPRS carrier's equipment is not required to keep the IP and port translation alive indefinitely after the packet is sent.

Dynamic Host Configuration Protocol (DHCP) is a communications protocol that lets network administrators manage centrally and automate the assignment of Internet Protocol (IP) addresses in an organization's network. Each device connecting to the Internet needs a unique IP address. DHCP automatically sends a new IP address when a device is activated in the network. DHCP uses the concept of a "lease" or amount of time that a given IP address will be valid for a computer. The lease time can vary depending on how long a user is likely to require the Internet connection using very short leases, DHCP can dynamically reconfigure networks in which there are more computers than there are available IP addresses. GPRS carriers use very short DHCP lease timeouts for this reason. Network. Address and Port Translation (NAPT) also addresses the problem of having a large number of devices and too few public IP address by limiting the number of public IP addresses being used. Private networks use private IP addresses when communicating locally. However, off-network traffic goes through a NAPT. A NAPT translates the internal network's IP address/port pairs to public IP address/port pairs. This gives the device a public identity on the Internet. Packets sent to the device from the Internet are sent to this public identity. The NAPT performs a reverse (i.e., public-to-private) mapping in order to route a packet back to the device. The lifetime of these translations is also limited to very short time intervals in GPRS networks.

The Transmission Control Protocol (TCP) is a connection-oriented protocol that is extensively used for communication between computers using IP. The TCP protocol stack provides for guarantee of delivery and a stateful connection between computers. Its disadvantage for wireless communication is the large amount of overhead required for TCP to provide its functionality. Further, the TCP stack assumptions about retry intervals, packet loss, and latencies are not well suited for wireless interfaces. For effective wireless use, the TCP stack must be modified to tolerate an unreliable interface. The advantage of TCP for GPRS implementation is that TCP is used for normal web browsing; therefore, the carriers' network equipment must be configured to support use of TCP in this manner.

Thus, a need exists for a method that provides for efficient telemetry communications over GPRS with minimal overhead. There is also a need for a method of queuing of messages in a multiple server system using connection-oriented protocols over GPRS.

SUMMARY OF INVENTION

Accordingly, the present invention provides a system and method for providing low overhead, extended data communications over a GPRS network. The invention also provides for message queuing in multiple server environments with client-initiated connections.

A method and system for efficient extended data communications using a GPRS (General Packet Radio Service) carrier network is disclosed. In a communications system having a server and client device coupled by a GPRS network, a communication session is initiated by the client. A combination of data packet transmission frequency adjustment and the transmission of "keep alive" packets are used to prevent carrier network time-out of the communication session. In multiple server environments such as those using load sharing, a queuing mechanism is provided for outbound messages to client devices.

In an embodiment of the present invention, a remote or mobile client device is coupled to a server by a GPRS network. A TCP session is initiated by the client device. The GPRS network has a time-out parameter that will result in the teardown of the TCP connection if the time period between packet transmissions between the server and client exceeds the period. The server and/or client is made aware of the parameter and ensures that the period between data packet transmissions does not exceed the time-out parameter by either adjusting the data transmission rate, or by sending a "keep alive" packet.

In another embodiment of the present invention, a remote or mobile client device is coupled to a server by a GPRS network. A UDP session is initiated by the client device. The server and/or client is provided access to the Network Address Port Translation (NAPT) and Dynamic Host Configuration Protocol (DHCP) implementations of the GPRS network so that communication between the server and client are maintained.

In a further embodiment of the present invention, a remote or mobile client device is coupled to a network control center by a GPRS network. The communication protocols as implemented by the GPRS network require that a communication session be initiated by the client. The network control center comprises a multiple server environment in which outbound messages are queued, and routed to the servers for transmission to the clients when a communication session is established by the client.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances well known network methods, procedures, components, and protocols have not been described in detail as not to unnecessarily obscure aspects of the present invention.

Figure 1:
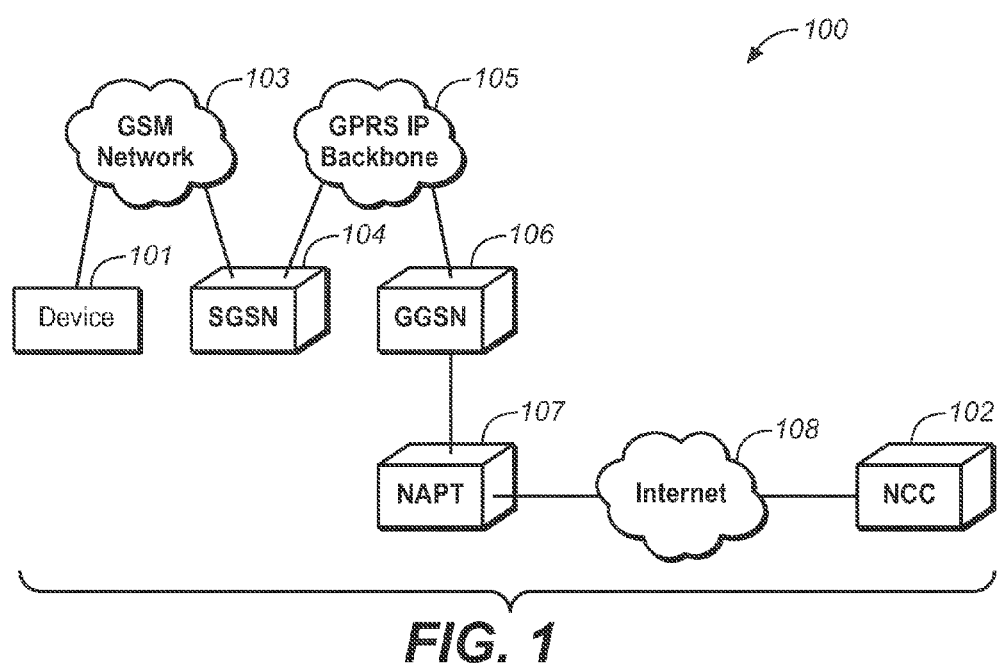
FIG. 1 shows a Network Control Center (NCC) coupled to a mobile/remote device by a GPRS network in accordance with an embodiment of the present claimed invention.

FIG. 1 shows the basic elements of a communications network 100 comprising a mobile or remote client device 101 and a network control center (NCC) 102, coupled by a GPRS (General Packet Radio Service) network that is part of a GSM (Global System for Mobile Communications) Network 103 that includes SGSN (Serving GPRS Support Node) 104, GPRS IP Backbone 105, GGSN (Gateway GPRS Support node) 106, NAPT (Network Address Port Translator) 107. The NCC 102 may be coupled to the NAPT 107 by the Internet 108 as shown, or may also be coupled to the NAPT by another network such as a Local Area Network (LAN), Wide Area Network (WAN), or a Municipal Area Network (MAN). These networks may be public, in the case of the Internet, or private using dedicated circuits or a Virtual Private Network (VPN).

The device 101 is a remote station or a mobile device in the GPRS network. An example of a remote station would be a vending machine. An example of a mobile device would be a delivery truck. In general, the device is an asset that communicates with a control center. In the case of a mobile device, position data would be an example of data that would be transmitted.

The device 101 may be a mobile data station that interfaces to the GSM network 103 (e.g., mobile data base stations) through RF signals. There will typically be several devices 101 coupled to the NCC 102. The GSM network 103 passes packet data out to the external data network (e.g., the Internet 108) through the SGSN 104. The SGSN 104 provides packet-data-routing support to and from devices in the SGSN's service area. GGSN 106 acts as a gateway between the GPRS network and the external data network (e.g., the Internet 108). GGSNs may also connect to other GPRS networks to facilitate. GPRS roaming.

The SGSN 104 and the GGSN 106 communicate over a GPRS IP backbone 105. It is possible, though not necessary, for the GPRS network to deploy a NAPT 107 to separate the private GPRS network from the Internet 108. Finally, the NCC 102 communicates with the GPRS network over the Internet 108.

The GPRS network supports both TCP (Transmission Control Protocol) and UDP (User Datagram Protocol). TCP is a reliable connection-based protocol. By "reliable," packets are guaranteed to be delivered, and they will be delivered in the order that they were sent. By "connection-based," we mean that TCP maintains a point-to-point session that allows the two endpoints in the session to talk to each other. UDP is an unreliable connectionless protocol. UDP does not guarantee delivery but has no connection to set up or maintain. In general, applications using UDP need to build in their own reliability mechanism. In using UDP, information from the carrier related to DHCP and NAPT time-outs and configurations or other IP provisioning options is used.

One approach to allowing the platform to communicate with a device is to have the platform wait until the device connects to report its location (e.g., at one minute intervals). Until the device connects, the platform must queue messages destined for the device. Once the device connects, the platform may send the queued messages.

Another option is a variation on this approach. In this case, it is assumed that the frequency of the reporting by the device will ensure that the DHCP and NAPT will not time-out. The platform then assumes that the IP address of the mobile is known as long as it has received a location report or keep-alive message from the device within the expected time-out period. Default time-outs for normal Internet routing equipment are about five minutes. Location reports at one minute intervals will keep the dynamic routing active.

It is desired that the TCP communication scheme between the NCC and the device be flexible. There are three separate scenarios that may exist for communications within the communications network 100: (1) long-term connection with no keep-alives, (2) long-term connection with keep-alives, and (3) new connection for each transaction. The NCC 102 tells the device 101 how it must behave via a Set Intervals Definition message. In all scenarios, the device is typically responsible for initiating a connection to the NCC.

A long-term connection with no keep-alives is the most attractive scenario for a GPRS user. It assumes that the GPRS network will be configured in such a way that we can maintain a TCP connection indefinitely without having to send any keep-alive messages. If the connection is lost, the device initiates a new connection to the NCC as soon as possible. The NCC configures the device to maintain a long-term connection without keep-alives by specifying a Connection Configuration value of zero (0) in the Set Main Repeating Slot Intervals Definition message. However, for economic reasons, this scenario is not attractive to the GPRS service provider. A service provider will typically want to avoid having resources tied up by a connection that is not being used to transmit data, and will time-out under-utilized sessions.

The time-out parameter for a GPRS network may be a value that may obtained from the GPRS service provider. It may also be dynamic and require updating through polling or other means. Alternatively, the time-out parameter may not be available as precise value that is obtainable from the GPRS service provider, and the time out behavior of communications sessions made through the GPRS network may be used to empirically establish a time interval for which a session will time out if exceeded.

A long-term connection with keep-alives is the preferred approach for handling connection time-outs imposed by the GPRS system. It assumes that the GPRS network will be configured to allow long-term TCP connections as long as the connection doesn't remain idle for too long. In this case, the device keeps track of the last time it sent a message to the NCC or received a message from the NCC. If the connection is idle for too long, the device sends a keep-alive message to the NCC in order to maintain the connection. If the connection is lost, the device initiates a new connection to the NCC as soon as possible.

An OTA (over-the-air) configuration protocol using TCP may be controlled by the platform on a device basis by specifying to the device the reporting intervals to be used. These can be controlled based on customer requirements and carrier networking equipment keep alive requirements. When the device first opens a connection to the platform after being turned on, it will receive its expected reporting intervals from the platform. The examples of intervals are given below.

Minimum keep alive transmission interval: This is the minimum interval at which the device will send at least an empty TCP packet in order to ensure the TCP session remains open. The keep alives do not have to be acknowledged by the platform.

Minimum location reporting interval: This is the minimum interval at which the device will send a location report. This is expected to be one minute unless the device is stationary; in that case the device would send a keep alive transmission instead.

Location sampling interval: Each location report may consist of one or more location samples. This interval will be less than or equal to the location reporting interval.

TCP Session per report flag: This flag indicates to the platform (and possibly to the device) to close the TCP session after every transaction rather than keeping the session open indefinitely.

The NCC configures the device to maintain a long-term connection with keep-alives by specifying a Connection Configuration value in the range from 0x0001 through 0xFFFE in the Set Main Repeating Slot Intervals Definition message. In this case, the Connection Configuration value specifies the keep-alive time-out in seconds. Alternatively, the protocol could be implemented by having the NCC send keep alives instead of the device. The communications session may be kept alive by sending data packets that have either user data or a keep-alive packet, and the packet flow may be from the NCC to the device, or vice versa.

A new connection for each transaction is the worst case because it involves the most airtime usage. It involves having the device initiate a new TCP connection each time it sends data (e.g., a periodic position report) to the NCC. The connection is torn down after the transaction. If the NCC has one or more messages to send to the device, it must wait for the device to connect. In this case, the device does not send any keep-alives to the NCC. The NCC configures the device to initiate a new connection for each transaction by specifying a Connection Configuration value of 0xFFFF in the Set Main Repeating Slot Intervals Definition message.

When a device connects to the NCC, it sends a Net Entry Request message along with any queued up messages it may have. If the Net Entry Request specifies a valid device ID, the NCC processes and acknowledges all of the device-initiated requests. The NCC will then send all of its queued messages to the device and wait for the T seconds (where T is the NCC Idle Time-out, a configurable time-out value) for the device to acknowledge the messages and to send more requests. The NCC will continue in this manner until the connection is idle for T seconds. At that point in time, the NCC will terminate the TCP connection.

UDP can be more efficient than TCP because UDP does not have the overhead of maintaining a connection. Also, UDP packet headers are smaller. However, an application using UDP must be able to take into account NAPTs. The GPRS network may be set up such that client devices 101 are sitting behind the GPRS NAPT 107. A NAPT is a network device that separates an internal network (in this case, the internal GPRS network) from an external network (in this case, the Internet 108). NAPTs serve as a form of security but are also necessary because of the IPv4 address scarcity problem.

The IP address scarcity problem is this: There is a fixed number of possible IP addresses (about 4 billion). However, the number of IP addressable devices is constantly growing. In the future, there may not be enough addresses to go around. NAPTs help to address this problem by limiting the number of public IP addresses being used. Private networks use private IP addresses when communicating locally. However, off-network traffic goes through a NAPT. A NAPT translates the internal network's IP address/port pairs to public IP address/port pairs. This gives the device a public identity on the Internet. Packets sent to the device from the Internet are sent to this public identity. The NAPT performs a reverse (i.e., public-to-private) mapping in order to route a packet back to the device. NAPTs present two problems. First, all devices behind a NAPT are part of a private network. Entities outside the NAPT cannot initiate communications to a device in the private network. The device must initiate communications to the external entity. Second, NAPT translation mappings are temporary. How long a translation lives depends on how the NAPT is configured. There is no industry standard setting.

Figure 24:
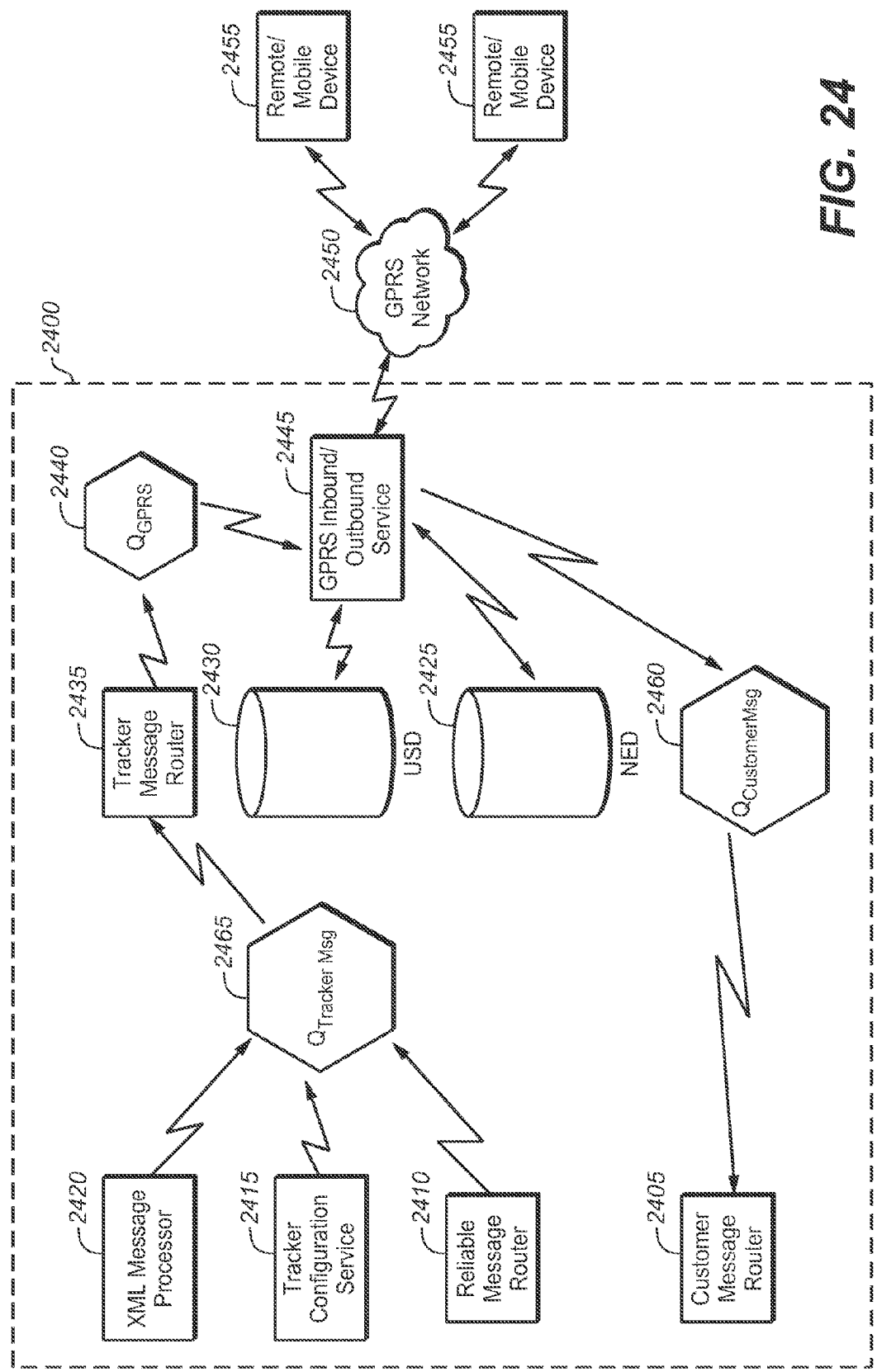
FIG. 24 shows an example of a NCC coupled to mobile devices by a GPRS network in accordance with an embodiment of the present claimed invention

The NCC 102 may be single server, but is generally configured as a multiple server environment. A server providing GPRS Inbound/Outbound Service (as shown in FIG. 24) is the entity within the NCC 102 that handles communications with the client devices 101.

The "base messages" are Data that may be sent from the NCC 102 to the devices 101 over the GPRS network using base messages. The base message data contain network control information, interval definitions messaging data, and user specific data.

Message data that control network activity (network and device control packets) are created by the GPRS Inbound/Outbound server (i.e., the NCC) in response to data received from devices and from customer requests to send messages to the devices. Note that both the device and the NCC may choose to bundle several GPRS protocol messages into a single "TCP" message in order to reduce overhead. Since the device may have limited TCP buffer resources, the NCC's maximum TCP "bundle" size is configurable. Furthermore, the NCC may not send any additional outgoing message bundles to the device until the device has acknowledged all of the messages in the previous bundle.

The data packets are of fixed or variable length, depending on the type. The packets include user commands, messaging, and device control commands. The format of each type of data packet is described below. Data packet decoding occurs after error detection/correction and decryption (if any). Each packet starts with a packet ID byte followed by the data in the packet. Table 1 provides a summary of all of the GPRS protocol packets sent by the NCC.

TABLE 1

Base Message Packet Summary

| Description | ID Number | Length (Bytes) | Comments |
| --- | --- | --- | --- |
| Text Message Packet - Single Device | 0x01 | Variable | Indicates a message and response set for a device. |
| : Pre-defined ID Message Packet | 0x02 | Variable | User Specific |
| : User Data Message Packet | 0x03 | Variable | User specific |
| : Set Main Repeating Interval Slot Definition Message Packet | 0x04 | 14 | Assigns reporting intervals and connection configuration. |
| Message Response Acknowledge | 0x05 | 6 | Acknowledges Text and Predefined Message Responses |
| Site Dispatch Message | 0x06 | Variable | Provides device with work site location and message for user. |
| User Data Acknowledge | 0x07 | 2 | Acknowledges reliable user data packets. |
| Site Purge Message | 0x08 | 13 | Erases a known site from a device. |
| Pre-defined Message Definition | 0x09 | Variable | Provides a pre-defined message definition to devices on a per customer basis. |
| Site Status Acknowledge | 0x0a | 7 | |
| Device State and Status Acknowledge | 0x0b | 3 | Lets the device know a State and Status block was received. |
| BIT Block Acknowledge | 0x0c | 3 | Lets the device know a BIT block was received. |
| Update Real Time Position | 0x0d | 1 | Request the devices current position. |
| RF Programming Schedule Packet | 0x0e | 14 | Schedule a programming event |
| RF Programming Start Packet | 0x0f | Variable | Start a programming event |
| RF Programming Data Packet | 0x10 | Variable | Programming data to be stored in memory. |
| RF Programming NAK Map Request Packet | 0x11 | 5 | Request the current programming data NAK map. |

Each Base Message may be encapsulated into a data packet that is bound by control characters and has a CRC to verify the packet data. This packet is displayed in Table 2.

TABLE 2

Base Message Packet Wrapper

| # of bytes | Description |
| --- | --- |
| 1 | Start Control Byte |
| 2 | Packet Length |
| — | Base Packet |
| 1 | 8-bit CRC |

Because TCP is a stream-based protocol (as opposed to a message-based protocol), the GPRS protocol must frame packets to allow the NCC and the devices to distinguish between different packets. The control byte, packet length, and the CRC provide for framing the packets.

Text message packets (shown in Table 3) are generated in response to messages/paging commands from user command stations. The maximum message length is assumed to be 250 characters. In addition, an optional 28 character response set may be appended. Pre-defined response sets are shown in Table 4. Acknowledgment of text messages will be performed at the time the message is received using the Message Response Acknowledge packet.

TABLE 3

Text Message Packet - Single Device

| # of bytes | Description |
|---|---|
| 1 | Packet ID: 0x01 |
| 4 | Message Sequence ID (unique for each customer) |
| 3 | Bits 0-19: Send Time[2] (GPS Second)<br>Bits 20-22: Response Set[1] (predefined set of response choices)<br>Bit 23: Spare |
| 2 | Message Length ($L_1$) |
| $L_1$ | Message |

[1] The table below indicates the predefined response sets.
[2] Indicates the time the message was originally sent.
NOTE:
Since only the GPS second is provided, devices may assume that the message is less than one GPS week minus 10 minutes old.

TABLE 4

Pre-defined Message Response Sets

| Response Set ID | MDT Softkey 1 | MDT Softkey 2 | MDT Softkey 3 | MDT Softkey 4 |
|---|---|---|---|---|
| 0[1] | {BLANK} | {BLANK} | {BLANK} | {BLANK} |
| 1 | Yes | No | Call | {BLANK} |
| 2 | OK | {BLANK} | {BLANK} | {BLANK} |
| 3 | OK | Cancel | Call | {BLANK} |
| 4 | Accept | Decline | Call | {BLANK} |
| 5 | {BLANK} | {BLANK} | {BLANK} | {BLANK} |
| 6 | {BLANK} | {BLANK} | {BLANK} | {BLANK} |
| 7 | {BLANK} | {BLANK} | {BLANK} | {BLANK} |

[1] Response Set ID of zero indicates that no pre-defined response is required. However, a custom response set may still be defined within the message. Custom response sets may be defined by appending response set values to the message. Response set values are delimited by a "|" (vertical bar) character.

The Pre-defined Message packet shown in Table 5 provides for a shorter message format for "canned" user messages that are frequently used by an individual customer. Since devices know the text of these messages a priori, only a message ID and a 16 Bit CRC must be sent by the NCC. The message ID indicates the ID of the message while the CRC is used as a sanity check for the device to determine if the text matches the CRC of the known associated pre-defined message.

Pre-defined message CRC's are computed using the entire pre-defined message. As a result, a device may determine if the ID has been reassigned to a new message. Devices that determine that a pre-defined ID has been associated with a new message (or do not know a specified pre-defined message) may request the entire pre-defined message using a "Pre-defined Message Request Packet".

Pre-defined message request packets (Table 44) are serviced by the NCC. When the NCC receives such a packet, it provides the device with the pre-defined message in a Pre-defined ID Message Definition Packet (Table 13).

TABLE 5

Pre-defined ID Message Packet

| # of bytes | Description |
|---|---|
| 1 | Packet ID: 0x02 |
| 4 | Message Sequence ID (unique for each customer) |
| 3 | Bits 0-19: Send Time (GPS Second)<br>Bits 20-22: Response Set (predefined set of response choices)[1]<br>Bit 23: Spare |
| 1 | Pre-defined Message ID |
| 2 | Pre-defined Message 16 Bit CRC |
| 1 | Custom Response Set Length ($L_1$) |
| $L_1$ | Custom Response Set |

[1] If the Pre-defined response set is 0, this pre-defined message packet may contain a custom set of pre-defined response sets. Custom response set values are delimited by a "|" (vertical bar) character.

The User Data message packet shown in Table 6 supports generic, user specific data that is sent to devices from customer end users or customer applications. The format of the message is similar to the text message packet, typically having 1024 data bytes available for any customer purpose. The NCC uses this message for remote device configuration. This message can also be used by $3^{rd}$-party customer software for customer-defined purposes.

TABLE 6

User Data Message Packet

| # of bytes | Description |
|---|---|
| 1 | Packet ID: 0x03 |
| 4 | Message Sequence ID |
| 3 | Send Time (GPS Second)[1] |
| 2 | Message Length ($L_1$) |
| $L_1$ | Message |

[1] Indicates the time the message was originally sent.
NOTE:
Since only the GPS second is provided, devices may assume that the message is less than one GPS week minus 10 minutes old.

The Set Intervals Definition packet shown in Table 7 lets the device know how long all of its intervals are going to be. These intervals may include sampling rate, reporting rate, low power update rate and the BIT rate. These values are generally positive integers. Other than the special sampling/reporting rate combination of 0/0 used to indicate an invalid device ID (see below), these intervals values are generally nonzero values.

This packet also tells the device how it should manage its connection to the NCC. The Connection Configuration field specifies whether the device should maintain a long-term TCP connection, either with or without time-outs, or initiate a new TCP connection at each reporting interval. If the configuration indicates a long-term connection with keep-alives, the Connection Configuration field also specifies how long the device should allow a connection to be idle before sending a Keep-Alive packet to the NCC. See the Connection Configuration field in Table 7 below for details. If the device already has a repeating interval assigned, it will be reset to the one contained in the message.

A device that receives a main repeating interval assignment may use the assigned interval until it requests to exit the network or until the NCC assigns new intervals to the device. If a device is unknown (e.g., the ID sent to the NCC is invalid), its sampling and reporting interval will be 0. This special interval combination tells the device that it is an invalid device and should wait for an hour before attempting to contact the NCC again.

TABLE 7

Set Main Repeating Interval Slot Definition Message Packet

| # of bytes | Description |
|---|---|
| 1 | Packet ID: 0x04 |
| 2 | Sampling Interval[1] |
| 2 | Reporting Interval[1] |
| 2 | Low Power Interval |
| 2 | BIT Packet Interval |
| 2 | Bit 0-9: GPS Week<br>Bit 10-12: GPS Rollover<br>Bits 14-15: Interval Unit<br>(0 = Seconds, 1 = Minutes, 2 = Hours, 3 = Days) |
| 3 | GPS Second |
| 2 | Connection Configuration<br>0x0000 = Long-Term Connection with No Keep-Alives<br>0x0001-0xFFFE = Long-Term Connection with Keep-Alives. This value specifies the device's keep-alive time-out in seconds.<br>0xFFFF = New Connection Per Transaction |

Table 8 below indicates special sample/reporting values to communicate to the device if it is unknown by the NCC.

TABLE 8

Special Sample/Reporting Intervals

| Sample/Reporting | State | Action |
|---|---|---|
| 0/0 | Unknown Device | Retry net entry in an hour |

When a Text or Pre-defined text message is sent to a device, a pre-defined or custom response set may be identified. This response set indicates the text labels that should be associated with the mobile data terminal softkeys when the message is displayed. When a softkey is pressed to respond to a message, the softkey number is returned to the NCC in a "Message Response Device Packet". The Message Response Acknowledge base message shown in Table 9 is used to acknowledge that the NCC has successfully received a response packet. A device typically does not discard a message response until it has successfully received an acknowledgment for that response.

TABLE 9

Message Response Acknowledge

| # of bytes | Description |
|---|---|
| 1 | Packet ID: 0x05 |
| 1 | Bits 0-2: Response Key ID<br>1 = Softkey #1, 2 = Softkey #2, 3 = Softkey #3, 4 = Softkey #4<br>Bit 3-7: Spare |
| 4 | Message Sequence ID[1] (unique for each customer) |

[1]The Message Sequence ID is the same ID associated with the original text/site dispatch message that required the response.

To automate the customer's ability to determine when a specific device has arrived/departed from a work site, the Site Dispatch Message shown in Table 10 indicates to the device a pair of latitude/longitude values that define a work site for this device. A text description of the site location (e.g., destination address) is also provided. Upon receipt of this message the device may acknowledge the message using the Message Response and User Data packets.

TABLE 10

Site Dispatch Message Packet

| # of bytes | Description |
|---|---|
| 1 | Packet ID: 0x06 |
| 4 | Message Sequence ID (unique for each customer) |
| 3 | Bits 0-19: Send Time (GPS Second)<br>Bits 20-22: Response Set[2] (predefined set of response choices)<br>Bit 23: Spare |
| 1 | Bits 0-1: Site Type[1] (0 = customer defined, 1 = home base, 2 = work, 3 = customer defined)<br>Bit 2-7: spare |
| 4 | Site ID (unique per type per customer)[2] |
| 3 | Northeast Latitude |
| 3 | Northeast Longitude |
| 3 | Southwest Latitude |
| 3 | Southwest Longitude |
| 2 | Time to Live (in hours) |
| 2 | Message Length ($L_1$)[3] |
| $L_1$ | Message |

[1]Work sites are valid for a specified number of time to live hours after the device first enters the work site. If the specified time to live is 0, the work is valid for a single trip. Home base sites are always valid.
[2]The site ID 0xFFFFFFFF can not be deleted individually and should be used carefully.
[3]A length of 0 indicates that no message will be sent to the device nor will a response be requested.

The User Data Acknowledge shown in Table 11 acknowledges a reliable user data message sent by a device. Devices should retain a copy of all reliable user data packets until they receive this acknowledgment message from the NCC.

TABLE 11

User Data Acknowledge

| # of bytes | Description |
|---|---|
| 1 | Packet ID: 0x07 |
| 1 | User Data Sequence ID[1] |

[1]Sequence ID assigned by device when reliable user data packet was transmitted.

Devices send Site Status packets when they enter/leave one of their known sites. The Site Purge Message shown in Table 12 requests a device to remove one of its known sites. As a result, devices receiving this packet may no longer provide a Site Status message for the site associated with the specified "Site ID". Upon receipt of this message the device acknowledges the message using the Message Response packet.

TABLE 12

Site Purge Message Packet

| # of bytes | Description |
|---|---|
| 1 | Packet ID: 0x08 |
| 4 | Message Sequence ID (unique for each customer) |
| 3 | Bits 0-19: Send Time (GPS Second)<br>Bits 20-23: Spare |
| 1 | Bits 0-1: Site Type[1] (0 = customer defined, 1 = home base, 2 = work, 3 = customer defined)<br>Bit 2-7: spare |
| 4 | Site ID (unique per type per customer)[2,3] |

[1]Work sites are valid for a specified number of time to live hours after the device first enters the work site. If the specified time to live is 0, the work is valid for a single trip. Home base sites are always valid. Site types 0 and 2 may be customer defined.
[2]Site ID values are unique per customer per site type.
[3]A site ID of 0xFFFFFFFF will result in purging all sites of the specified type.

The Pre-defined Message Definition packet shown in Table 13 provides devices with a text message that may be associated with a specified pre-defined message ID. Devices receiving this message may store the pre-defined message definition. This stored message may then be used to display the appropriate message upon receipt of a pre-defined message packet.

TABLE 13

Pre-defined ID Message Definition Message Packet

| # of bytes | Description |
|---|---|
| 1 | Packet ID: 0x09 |
| 1 | Pre-defined Message ID |
| 2 | Message Length ($L_1$) |
| $L_1$ | Message |

The Site Status Acknowledge message shown in Table 14 acknowledges a site status message sent by a device. Devices may retain a copy of all reliable site status packets until they receive this acknowledgment message from the NCC.

TABLE 14

Site Status Acknowledge

| # of bytes | Description |
|---|---|
| 1 | Packet ID: 0x0a |
| 1 | Bits 0-1: Site Type[2] (0 = customer defined, 1 = home base, 2 = work, 3 = customer defined) Bit 2-7: spare |
| 4 | Site ID |
| 1 | Site Sequence ID[1] |

[1]Sequence ID assigned by device when reliable site status packet was transmitted.
[2]Work sites are valid for a specified number of time to live hours after the device first enters the work site. If the specified time to live is 0, the work is valid for a single trip. Home base sites are always valid.

The Device State and Status Acknowledge message shown in Table 15 acknowledges a device's state and status block. Devices should retain a copy of all state and status block packets until they receive this acknowledgment message from the NCC.

TABLE 15

Device State and Status Block Acknowledge

| # of bytes | Description |
|---|---|
| 1 | Packet ID: 0x0b |
| 1 | Device Packet Sequence ID[1] |

[1]Sequence ID assigned by device when state and status packet was transmitted.

The BIT Block Acknowledge message shown in Table 16 acknowledges a device's BIT block. Devices should retain a copy of all BIT block packets until they receive this acknowledgment message from the NCC.

TABLE 16

BIT Block Acknowledge

| # of bytes | Description |
|---|---|
| 1 | Packet ID: 0x0c |
| 1 | BIT Packet Sequence ID[1] |

[1]Sequence ID assigned by device when BIT packet was transmitted

The Update Real Time Position message shown in Table 17 is used to request the current position of a device. Upon receipt the device should send-in its current position as soon as possible.

TABLE 17

Update Real Time Position

| # of bytes | Description |
|---|---|
| 1 | Packet ID: 0x0d |

The RF programming schedule packet shown in Table 18 alerts a device of an upcoming programming event. This packet may be broadcast during the day of the event until acknowledged by the device or the event time has expired. The packet may indicate the target to be programmed, revision information, and the scheduled time. The target device may determine if it needs to update its code based on the version information in the packet. If it does need to update code then it wakes up at the scheduled time. If the code revision is the same as the current code revision, the device sends a NAK to indicate code is up to date. An ACK is sent if the device determines that it needs to update its code.

TABLE 18

RF Programming Schedule Packet

| # of bytes | Description |
|---|---|
| 1 | Packet ID: 0x0e |
| 4 | Event ID, sent back as part of ACK/NAK response |
| 1 | Target: 0 = Device CPU, 1 = MDT |
| 1 | SW Major Rev |
| 1 | SW Minor Rev |
| 1 | SW Build |
| 1 | HW Major Rev |
| 1 | HW Minor Rev |
| 3 | Scheduled programming time (GPS seconds) |

At the scheduled programming time a RF Programming Start Packet (Table 19) is sent out to inform a device that the programming event is about to start. This packet provides revision information and a description of the code to be programmed. The device is required to check its revision against the revision in the packet to determine if its code needs to be updated. The packet will also have a detailed list of the code modules and their placement in flash. The RF programming start packet should be sent out before any RF programming data packets are sent out to allow a device to prepare to receive the firmware update. The NCC should delay sending any RF programming data packets for at least 1 minute after the start packet is sent out. This time will be used by the device to erase a portion of its flash in preparation for the update. This delay may not be needed by the next generation device and should be configurable.

TABLE 19

RF Programming Start Packet

| # of bytes | Description |
|---|---|
| 1 | Packet ID: 0x0f |
| 4 | Event ID, sent with NAK map or cancel message |
| 1 | Target: 0 = Device CPU, 1 = MDT |
| 1 | SW Major Rev |
| 1 | SW Minor Rev |
| 1 | SW Build |
| 1 | HW Major Rev |
| 1 | HW Minor Rev |
| 1 | Number of Code Modules |
| 2 | Record Size |
| 4 | Start Address Module 0 |
| 4 | End Address Module 0 |

TABLE 19-continued

RF Programming Start Packet

| # of bytes | Description |
|---|---|
| 4 | CRC Module 0 |
| 2 | Number of Records Module 0 |
| ... | ... |
| 4 | Start address Module N |
| 4 | End Address Module N |
| 4 | CRC Module N |
| 2 | Number of Records Module N |

Once the start packet has been received the device must listen for all of the RF Programming Data Packets (Table 20) associated with the modules to be updated. These data packets will indicate which module they are associated with and the record number. The device will be required to buffer up a complete set of records for the module being programmed and once all records have been received the CRC must be verified. If the CRC can be verified the new code module can then be used and the old discarded.

TABLE 20

RF Programming Data Packet

| # of bytes | Description |
|---|---|
| 1 | Packet ID: 0x10 |
| 1 | Module Number |
| 2 | Record Number |
| 2 | Record Size |
| N | Data |
| 4 | 32 bit CRC (CRC of variable size data section) |

The RF Programming NAK Map Request packet shown in Table 21 packet may be sent to a device during a programming event to determine which programming records have been successfully received by the device. Upon receipt of the request the device will respond with the current NAK map.

TABLE 21

RF Programming NAK Map Request Packet

| # of bytes | Description |
|---|---|
| 1 | Packet ID: 0x11 |
| 4 | Event ID |

The "device messages" are transmitted from the devices to the NCC over the GPRS network. Device data consist of navigation state information, responses to network related commands from the NCC, paging/messaging responses, and user specific data. Each device has its own assigned repeating interval to transmit its data. The devices send the data directly to the NCC with the TCP protocol on the Internet. The messages are then logged and processed.

All devices have an assigned continuous repeating interval time to send data on the network. Depending on how the device is configured, it may either maintain a TCP connection to the NCC or initiate a temporary connection to the NCC at its assigned repeating interval. A device transmits its tracking data during its reporting interval until its state changes (e.g., switch to low-power mode).

Each reporting interval is defined by an interval length. This is the number of seconds between updates sent by the device to the NCC. The reporting interval will contain one or more sampling intervals. The sampling interval is the number of seconds the device waits to record its position. Table 22 and Table 23 summarize typical device repeating interval rates.

TABLE 22

Intervals: Long-Term Connection

| Reporting Interval (sec) | Sampling Interval (sec) | Low Power Interval (sec) | BIT Interval (sec) | Comments |
|---|---|---|---|---|
| 600 | 60 | 3600 | 21600 | 10-minute reports |
| 120 | 120 | 3600 | 21600 | 2-minute reports (low resolution) |
| 120 | 60 | 3600 | 21600 | 2-minute reports (high resolution) |
| 60 | 60 | 3600 | 21600 | 1-minute reports (low resolution) |
| 60 | 30 | 3600 | 21600 | 1-minute reports (high resolution) |
| 30 | 30 | 3600 | 21600 | 30-second reports (low resolution) |
| 30 | 15 | 3600 | 21600 | 30-second reports (high resolution) |

TABLE 23

Intervals: New TCP Connection Per Transaction

| Reporting Interval (sec) | Sampling Interval (sec) | Low Power Interval (sec) | BIT Interval (sec) | Comments |
|---|---|---|---|---|
| 120 | 120 | 120 | 21600 | 2-minute polls (low resolution) |
| 120 | 60 | 120 | 21600 | 2-minute polls (high resolution) |
| 60 | 60 | 60 | 21600 | 1-minute polls (low resolution) |
| 60 | 30 | 60 | 21600 | 1-minute polls (high resolution) |
| 30 | 30 | 30 | 21600 | 30-second polls (low resolution) |
| 30 | 15 | 30 | 21600 | 30-second polls (high resolution) |

Each device message is encapsulated into a data packet. This packet starts with a control character and the length of the Device Packet. Next is the Device packet followed by a CRC to verify the packet data. This packet is displayed in Table 24. This format allows the NCC to distinguish between packets when more than one is sent at the same time. It also provides for minor error detection on the packets.

TABLE 24

Device Message Wrapper

| # of bytes | Description |
|---|---|
| 1 | Start Control Byte (0x02) |
| 2 | Packet Length |
| — | Device Packet |
| 1 | 8-bit CRC |

Tables 25-27 describe the basic data size requirements for information transmitted by the devices, (e.g., Minimum space requirements for device state, network status, and network command responses).

Device state comprises position, speed, and direction. Since the device can be in any cell, it needs to have the entire latitude and longitude from the GPS as shown in Table 25.

TABLE 25

Device State Data Block Byte/Bit Definitions

| Bytes | Description |
|---|---|
| 3 | GPS Second |
| 3-24 bits | Latitude $-90°$ to $+90°$ ($1° = 2^{16}$) |
| 3-25 bits | Longitude $-180°$ to $+180°$ ($1° = 2^{16}$) |

TABLE 25-continued

Device State Data Block Byte/Bit Definitions

| Bytes | Description | |
|---|---|---|
| 1-7 bits | Speed | 0x00 – 0x7F (LSB = 0.5 m/s ≈ 1.1 mph) |
| 1 | Heading | −180° to +180° (LSB = 360° * $2^{-7}$ = 2.8125°) |

Since the device may sample its position at a higher update rate than it will be reporting the data, the state and status blocks may be placed into a bundle. The first block of that bundle will be the regular Device State Data Block, but subsequent blocks will be a condensed version of the block. This condensed version is shown in Table 26.

TABLE 26

Condensed Device State Data Block Byte/Bit Definitions

| Bytes | Description |
|---|---|
| 2 | Time since last State Data Block (Seconds) |
| 20 bits | Change in Latitude (1° = $2^{16}$) |
| 20 bits | Change in Longitude (1° = $2^{16}$) |
| 1 | Speed  0x00 – 0x7F (LSB = 0.5 m/s ≈ 1.1 mph) |
| 1 | Heading  −180° to +180° (LSB = 360° * $2^{-7}$ = 2.8125°) |

The Network Status Code shown in table 27 is used by devices to exit the GPRS network. Additional codes may be defined in the future to automate tracking service changes. Currently, 4 network status codes, out of an available total of 8, are defined.

TABLE 27

Network Status Code Definitions

| Code | Description |
|---|---|
| 0 | No status |
| 1 | Network exit request |
| 2 | Low Power entry |
| 3 | Low Power exit request |
| 4-7 | Spare |

Text messages, pre-defined messages, user data, site purge, site dispatch, etc. messages will be acknowledged by devices to indicate the receipt of these messages. In addition, text messages, pre-defined messages, and site dispatch messages may require two responses. Acknowledgments/responses are sent to the NCC in a Message Acknowledgment/Response Block shown in Table 28.

TABLE 28

Message Acknowledgment/Response Block

| Byte/Bit, Bit Length | Description |
|---|---|
| 0/0, 1 | Acknowledgment/Response Flag (0 = Ack Only, 1 = Response) |
| 0/1, 3 | Response Key ID (0 = Return Receipt[2], 1 = Softkey #1, 2 = Softkey #2, 3 = Softkey #3, 4 = Softkey #4) |
| 0/4, 32 | Message Sequence ID |
| 4/4, 20 | GPS Second Receipt/Response Time[1] |

[1]Indicates the GPS Second when the message was received for acknowledgment or the GPS Second when the Softkey was pressed for a response.
[2]Indicates that message was read by driver.

A packet ID number identifies each packet. The packet ID requires 4 bits for a total of 16 different packet types. The first 4 bits of each packet are reserved for the ID Block. Initially, all devices must send a Net Entry Request Packet (Table 30) to enter the GPRS network. This packet allows devices to request their intervals for reporting, sampling, etc. This packet also allows the NCC to identify the device so that it can route messages to the device.

Once in the GPRS network, devices may send a variety of different packet types depending upon the device state. The most common packet sent by devices is the state and status packet (Table 31). Devices that need to send user data may use the user data packet. Devices that need to acknowledge user data or acknowledge/respond to text/pre-defined messages may use the Message Response packets.

Packet types are identified by packet ID; space for 16 different packet types is provided. The packet types are summarized below in Table 29. Unused or spare data bits and bytes in the packets may be set to zero. Packets are made up of bit-packed data blocks.

TABLE 29

Device Packet Summary

| Description | ID Number | Comments |
|---|---|---|
| Net Entry Request | 0 | Used to request an interval set. |
| State and Status Bundle | 1 | Normal Periodic Transmission |
| User Data with Location | 2 | User Specific with a SITE ID and Location. |
| User Data without Location. | 3 | User Specific Data. |
| Message Response Packet Bit Definitions | 4 | Message response with user data. |
| Site Status | 5 | Used to indicate work site arrival/departure |
| Built-in test (BIT) | 6 | Packet to provide info about the device, its environment, the RF network, etc. |
| Pre-defined Message Definition Request | 7 | Used by device to request a pre-defined message definition. |
| RF Programming Response Packet | 8 | Used to ACK/NAK RF programming event packets. |
| Keep-Alive Packet | 9 | Sent periodically to keep TCP connection alive |

The Net Entry Request message is always the first message sent by the device to the NCC on a newly established TCP connection. This request identifies the device and allows the device to "log on" to the network.

In response to a Net Entry Request, the NCC sends a Set Main Repeating Intervals Slot Definition message.

TABLE 30

Net Entry Request Packet Bit Definitions

| Byte/Bit, bit length | Bit Number | Description |
|---|---|---|
| 0/0, 4 | 0-3 | Packet ID Block (0x00) |
| 0/4, 30 | 4-33 | Bits 0-29: Device ID Number |

Devices periodically transmit the State and Status Packet (Table 31), which contains full resolution device position, velocity, network status information, and five user data bytes.

TABLE 31

State and Status Packet Bit Definitions

| Byte/Bit, bit length | Bit Number | Description |
|---|---|---|
| 0/0, 4 | 0-3 | Packet ID Block (0x01) |
| 0/4, 8 | 4-11 | Device Packet Sequence ID |
| 1/4, 4 | 12-15 | Network Status Code |
| 2/0, 88 | 16-103 | Device State Data Block |
| 13/0, 8 | 104-111 | Number of Blocks (c) |
| 14/0, 64 | 112-175 | Condensed State Data Block$_1$ |
| ... | ... | ... |
| ... | ... | Condensed State Data Block$_c$ |

.1.1

The Reliable User Data Packet provides several bytes of user application definable data. A device may send this user data packet anytime it is in the network. Upon receipt of a Reliable User Data packet, the NCC will broadcast a Message Response Acknowledge message with the same User Data Sequence ID. Devices may retain a copy of each Reliable User Data packet until the NCC successfully acknowledges it. Some user data packets need to have a Site ID and Lat/Long pair to provide valuable information to the customers. This packet contains these fields as shown in Table 32, so that they can be stored in the database with the user data.

TABLE 32

User Data Packet with Location Bit Definitions

| Byte/Bit, bit length | Bit Number | Description |
|---|---|---|
| 0/0, 4 | 0-3 | Packet ID Block (0x02) |
| 0/4, 8 | 4-11 | User Data Sequence ID |
| 1/4, 32 | 12-43 | Site ID[1] |
| 5/4, 24 | 44-67 | Latitude |
| 8/4, 25 | 68-92 | Longitude |
| 11/5, 20 | 93-112 | Time (GPS Seconds) |
| 14/1, 24 | 113-136 | Mileage (1/10 miles) |
| 17/1, 16 | 137-152 | User Data Block Length |
| 19/1, ... | 153- | User Data Block |

[1]If there is no site ID associated with the data, this may be 0xFFFFFFFF.

For those user data packets that are not location dependent, the packet shown in Table 33 may be used to save bandwidth.

TABLE 33

User Data Packet without Location Bit Definitions

| Byte/Bit, bit length | Bit Number | Description |
|---|---|---|
| 0/0, 4 | 0-3 | Packet ID Block (0x03) |
| 0/4, 8 | 4-11 | User Data Sequence ID |
| 1/4, 16 | 12-27 | User Data Block Length |
|  | 28- | User Data Block |

The Message Response and User Data packet shown in Table 34 contains an acknowledgment/response.

TABLE 34

Message Response Packet Bit Definitions

| Byte/Bit, bit length | Bit Number | Description |
|---|---|---|
| 0/0, 4 | 0-3 | Packet ID Block (0x04) |
| 0/4, 46 | 4-49 | Message Acknowledgment/Response Block |

The Site Dispatch Message (Table 10) indicates to the device the area of a work site. As a result, the device may determine when it has arrived/departed at/from a work site. The Site Status Packet is used by a device to indicate work site arrival/departure. This packet indicates the device ID, site type, site ID (originally associated with the site dispatch message), arrival/departure status, time of arrival/departure and the source of arrival/departure status.

Since the geocoding with the current mapping data is not always accurate, determining if a device has reached the work site using the expected latitude/longitude for an address may not always be possible. As a result, the device may send a site status packet (Table 35) based on lat/long if arrival/departure occurs (using the lat/long values in the Site Dispatch message) and allow the user to manually indicate arrival/departure. The site source bit in this packet indicates how arrival/departure was determined. Initially, this site status packet may be sent twice for arrival and twice for departure using the two status sources.

TABLE 35

Site Status Packet Bit Definitions

| Byte/Bit, bit length | Bit Number | Description |
|---|---|---|
| 0/0, 4 | 0-3 | Packet ID Block (0x05) |
| 0/4, 2 | 4-5 | Site Type (0 = customer defined, 1 = home base, 2 = work, 3 = customer defined) |
| 0/6, 32 | 6-37 | Site ID |
| 4/6, 24 | 38-61 | Latitude |
| 7/6, 25 | 62-86 | Longitude |
| 10/7, 20 | 87-106 | Event Time[1] (GPS Seconds) |
| 13/3, 24 | 107-130 | Mileage (1/10 miles) |
| 16/5, 1 | 131 | Status (0 = Arrival, 1 = Departure) |
| 16/6, 1 | 132 | Automatic Source Flag[2] |
| 16/7, 1 | 133 | User Source Flag[3] |
| 17/0, 8 | 134-141 | Site Status Sequence ID |

[1]Indicates the GPS Second value upon arrival/departure.
[2]Set for "event-driven" initiated event.
[3]Set for user initiated event.

The built-in test (BIT) device packet (Table 36) is sent to provide the NCC administrators and engineers information about devices to help with system testing and determine if devices are functioning properly. Devices may provide the BIT packet at a rate specified in the Set Main Repeating Interval Slot Definition Message Packet. The BIT packet is a collection of BIT Blocks. The device may determine which blocks need to be included in a BIT Packet. The BIT Packet will start with a Packet ID and a count of the number of BIT Blocks contained in the message. The blocks will then have a Block ID (Table 37) and then the data.

TABLE 36

Built-in Test (BIT) Packet

| Byte/Bit, bit length | Description |
|---|---|
| 0/0, 4 | Packet ID Block (0x06) |
| 0/4, 8 | Bit Packet Sequence ID |
| 1/4, 24 | Event Time (GPS Seconds) |
| 4/4, 4 | Block Count (c) |
| 5/0, 8 | Block I$_1$ |
| — | Block Data$_1$ |
| : | : |
| X/0, 8 | Block ID$_c$ |
| — | Block Data$_c$ |

TABLE 37

BIT Block IDs

| Size (bytes) | Block ID | Description |
| --- | --- | --- |
| 12 | 0x0 | Network Data |
| 15 | 0x1 | Environment Data |
| 12 | 0x2 | Navigation Data |
| 11 | 0x3 | Software Data |
| 11 | 0x4 | Ready Mix Data |
| Variable | 0x5 | Configuration Data |

TABLE 38

Network Bit Block Definitions

| Byte/Bit, bit length | Bit Position | Description |
| --- | --- | --- |
| 0/0, 8 | 0-7 | Block ID (0x00) |
| 1/0, 8 | 8-15 | RSSI Min (range approx. −50--115 dBm) |
| 2/0, 8 | 16-23 | RSSI Max (range approx. −50--115 dBm) |
| 3/0, 16 | 24-39 | Number of inbound CRC errors |
| 5/0, 8 | 40-47 | Net entry percent (0-100%) |
| 6/0, 8 | 48-55 | Position percentage (0-100%) |
| 7/0, 8 | 56-63 | Archived position percentage (0-100%) |
| 8/0, 8 | 64-71 | Auxiliary event percentage (0-100%) |
| 9/0, 8 | 72-79 | Bit packet percentage (0-100%) |
| 10/0, 8 | 80-87 | Spare 1 (future network) |
| 11/0, 8 | 88-95 | Spare 2 (future network) |

TABLE 39

Environment Bit Block Definitions

| Byte/Bit, bit length | Bit Position | Description |
| --- | --- | --- |
| 0/0, 8 | 0-7 | Block ID (0x01) |
| 1/0, 8 | 8-15 | Highest Battery Voltage (*150 for milliVolts) |
| 2/0, 8 | 16-23 | Lowest Battery Voltage (*150 for milliVolts) |
| 3/0, 8 | 24-31 | Number of Times Ignition Was Turned Off |
| 4/0, 12 | 32-43 | Shortest Off Duration (min) |
| 5/4, 12 | 44-55 | Longest Off Duration (min) |
| 7/0, 8 | 56-63 | Highest Temperature (° C.)[1] |
| 8/0, 8 | 64-71 | Lowest Temperature (° C.)[1] |
| 9/0, 24 | 72-95 | Odometer cal value (tics/mile) |
| 12/0, 16 | 96-111 | Odometer cal confidence (0-2000?) |
| 14/0, 8 | 112-119 | Flash file percent used (0-100%) |

TABLE 40

Navigation Bit Block Definitions

| Byte/Bit, bit length | Bit Position | Description |
| --- | --- | --- |
| 0/0, 8 | 0-7 | Block ID (0x02) |
| 1/0, 8 | 8-15 | Number of Times Nav was Invalid |
| 2/0, 10 | 16-25 | Maximum Duration Nav was Invalid (min) |
| 3/2, 4 | 26-29 | Average number of SVs tracked |
| 3/6, 2 | 30-31 | Last boot: 0 - cold, 1 - warm, 2 - hot[1] |
| 4/0, 7 | 32-38 | 5 or fewer tracked (0-100%) |
| 4/7, 1 | 39 | Spare |
| 5/0, 7 | 40-46 | Percent Valid (0-100%) |
| 5/7, 1 | 47 | BIT result: 0 - fail, 1 - pass |
| 6/0, 12 | 48-59 | Min HDOP (resolution 0.1) |
| 7/4, 12 | 60-71 | Max HDOP (resolution 0.1) |
| 9/0, 8 | 72-79 | Min SNR |
| 10/0, 8 | 80-87 | Max SNR |
| 11/0, 8 | 88-95 | Average SNR |

TABLE 41

Software Bit Block Definitions

| Byte/Bit, bit length | Description |
| --- | --- |
| 1 | Block ID (0x03) |
| 1 | Device Software Major Release |
| 1 | Device Software Minor Release |
| 1 | Device Software Build |
| 1 | Device Hardware Major Release |
| 1 | Device Hardware Minor Release |
| 1 | MDT Software Major Release |
| 1 | MDT Software Minor Release |
| 1 | MDT Software Build |
| 1 | MDT Hardware Major Release |
| 1 | MDT Hardware Minor Release |

TABLE 42

Built-in Test Block (Ready Mix, Type = 4)

| # of bytes | Description |
| --- | --- |
| 1 | Block ID (0x04) |
| 2 | Number of times wash out hose was on for 15 minutes continuously |
| 2 | Number of times water was turned on |
| 2 | Number of times door was opened[1] |
| 2 | Number of times drum was charged |
| 2 | Number of times drum was discharged |

TABLE 43

Configuration BIT Block Definitions

| Groups | # of bytes | Description |
| --- | --- | --- |
| Overhead | 1 | Block ID (0x05) |
|  | 2 | Block Length |
| TIM List configuration | 4 | Active TIM List ID[3] |
|  | 4 | In Process TIM List ID[3] |
| General Device Configuration | 2 | Device Logic Type |
|  | 2 | Device Shutdown Delay |
|  | 2 | MDT Shutdown Delay |
|  | 1 | Always on Device |
| Active Work Sites | 1 | Number of Work Sites |
|  | variable | Site ID (4 bytes per site) |
| Active Home Sites | 1 | Number of Home Sites |
|  | variable | Site ID (4 bytes per site) |
| Site Logic Configuration | 1 | Work Site Entry Speed |
|  | 1 | Home Site Entry Speed |
|  | 1 | Work Site Exit Speed |
|  | 1 | Home Site Exit Speed |
|  | 1 | Work Site Hysteresis |
|  | 1 | Home Site Hysteresis |
| Ignition Configuration | 1 | Ignition Reporting Enable |
| Discrete Input Configuration | 1 | Discrete Input Enable |
|  | 1 | Discrete Input Polarity[1] |
|  | 1 | Discrete Ignition Qualification Enable[1] |
|  | 2 | Discrete Spare[1] |
|  | 2 | Discrete 1 Hysteresis[2] |
|  | 2 | Discrete 2 Hysteresis[2] |
|  | 2 | Discrete 3 Hysteresis[2] |
| Discrete Tachometer Configuration | 1 | Discrete Tachometer Enable |
|  | 1 | Discrete Tach Speed Qualification Enable[1] |
|  | 3 | Discrete Tach Spare[1] |
|  | 2 | Discrete 1 Tach Hysteresis[2] |
|  | 2 | Discrete 2 Tach Hysteresis[2] |
|  | 2 | Discrete 3 Tach Hysteresis[2] |
|  | 1 | Discrete 1 Tach Frequency Threshold[2] |
|  | 1 | Discrete 2 Tach Frequency Threshold[2] |

TABLE 43-continued

Configuration BIT Block Definitions

| Groups | # of bytes | Description |
|---|---|---|
|  | 1 | Discrete 3 Tach Frequency Threshold[2] |
| Discrete Over Rev Configuration | 1 | Discrete Over rev Enable |
|  | 1 | Discrete Over rev Frequency[1] |
|  | 2 | Discrete Over rev Spare[1] |
| Store & Forward Configuration | 1 | Store & Forward Enable |
|  | 1 | Store & Forward Update Periods[1] |
| Speeding Configuration | 1 | Speeding Report Enable |
|  | 1 | Speeding Threshold[1] |
|  | 2 | Speeding Duration[1] |
| Stop Notification Configuration | 1 | Stop Notification Enable |
|  | 1 | Stop Threshold[1] |
|  | 2 | Stop Duration[1] |

[1]This field is sent only if the previous enable field is non zero.
[2]This field is sent only if the associated bit in the previous enable field is non zero. Bit 0 corresponds to Discrete 1, Bit 1 is Discrete 2 and so on.
[3]If this field is set to −1 or 0xFFFFFFFF it is an indication that the device does not contain a TIM list.

When a device receives a pre-defined message, it may display the known message associated with the specified pre-defined message ID/16 bit CRC. If the device does not know the message associated with the specified pre-defined message ID (or determines that the CRC of the known message does not match the CRC in the Pre-defined Message packet), it may request the message definition with a Pre-defined Message Definition Request packet shown in Table 44.

TABLE 44

Pre-defined Message Definition Request Packet Bit Definitions

| Byte/Bit, bit length | Bit Number | Description |
|---|---|---|
| 0/0, 4 | 0-3 | Packet ID Block (0x07) |
| 0/4, 8 | 4-11 | Pre-defined Message ID |

The RF Programming Response Packet shown in Table 45 is used by the device to acknowledge the various programming packets that it may receive. This packet may utilize a sub type field to conserve the limited number of device packet IDs. The various sub type definitions are described below.

TABLE 45

RF Programming Response Packet

| Byte/Bit, bit length | Bit Number | Description |
|---|---|---|
| 0/0, 4 | 0-3 | Packet ID Block (0x08) |
| 0/4, 4 | 4-7 | Sub Type |
| 1/0, 32 | 8-39 | Event ID |
| 5/0, N | N | Data |

The device will send the RF Programming Acknowledgment packet shown in Table 46 when it receives an RF programming schedule packet or a programming start packet. If the device has determined that its firmware matches the version number in the schedule packet it will send back a NAK to indicate that it will not accept programming. Otherwise, an ACK will be sent to indicate that the code will be accepted at the scheduled time. In the event that the device is unable to update code because the vehicle is in use, a cancel response may be sent to abort the firmware update. If the device receives a schedule packet with firmware for the bank that is currently in use the device will send a response of cancel bank in use. If the device has not erased the spare flash bank a response of bank not erased will be sent.

TABLE 46

RF Programming Acknowledgment

| Byte/Bit, bit length | Bit Number | Description |
|---|---|---|
| 0/0, 4 | 0-3 | Packet ID Block (0x08) |
| 0/4, 4 | 4-7 | Sub Type (0x00) |
| 1/0, 32 | 8-39 | Event ID (event ID contained in the schedule or start packet) |
| 5/0, 3 | 40-42 | Bits 0-2: (0 - ACK, 1 - NAK, 2 - Cancel, 3 - Cancel/Bank-in-Use, 4 - Cancel/Bank not erased, 5-7 undefined) |
| 5/3, 1 | 43 | ACK type (0-Programming Schedule ACK, 1 - Programming Start ACK) |

The RF programming NAK map shown in Table 47 is sent by the device to indicate which programming data records have been successfully received. The map will contain 1 bit for each record that is to be programmed. Since the device is informed of the number of records in the module the size of the map can be easily calculated. Any extra bits in the map must be set to 0 to avoid NAKs on records that do not exist. The NAK map will be sent upon receipt of a NAK map request packet. Programming success will be indicated by a NAK packet with all records acknowledged.

TABLE 47

RF Programming NAK Map

| Byte/Bit, bit length | Bit Number | Description |
|---|---|---|
| 0/0, 4 | 0-3 | Packet ID Block (0x08) |
| 0/4, 4 | 4-7 | Sub Type (0x01) |
| 1/0, 32 | 8-39 | Event ID (event ID contained in the start packet) |
| 5/0, 8 | 40-47 | Module Number |
| 6/0, 16 | 48-63 | NAK map size (bytes) |
| 8/0, 1 | 64 | Record 0 NAK (0 - ACK, 1 - NAK) |
| ... | ... | ... |
| 8/7, 1 | 71 | Record 7 NAK |

If the device is configured to send keep-alive messages and a connection has been idle for too long, the device sends this packet periodically in order to maintain the TCP session to the NCC. The device obtains its keep-alive-timer value from the Set Main Repeating Interval Slot Definition message.

Note that the protocol does not define an application-level acknowledge for the Keep-Alive packet. The device relies on the TCP-level ACK to determine if the Keep-Alive made it to the NCC. The NCC does not send an application-level acknowledge to a Keep-Alive packet.

TABLE 48

Keep-Alive Packet

| # of bytes | Description |
|---|---|
| 1 | Packet ID: 0x09 |

Figure 2:
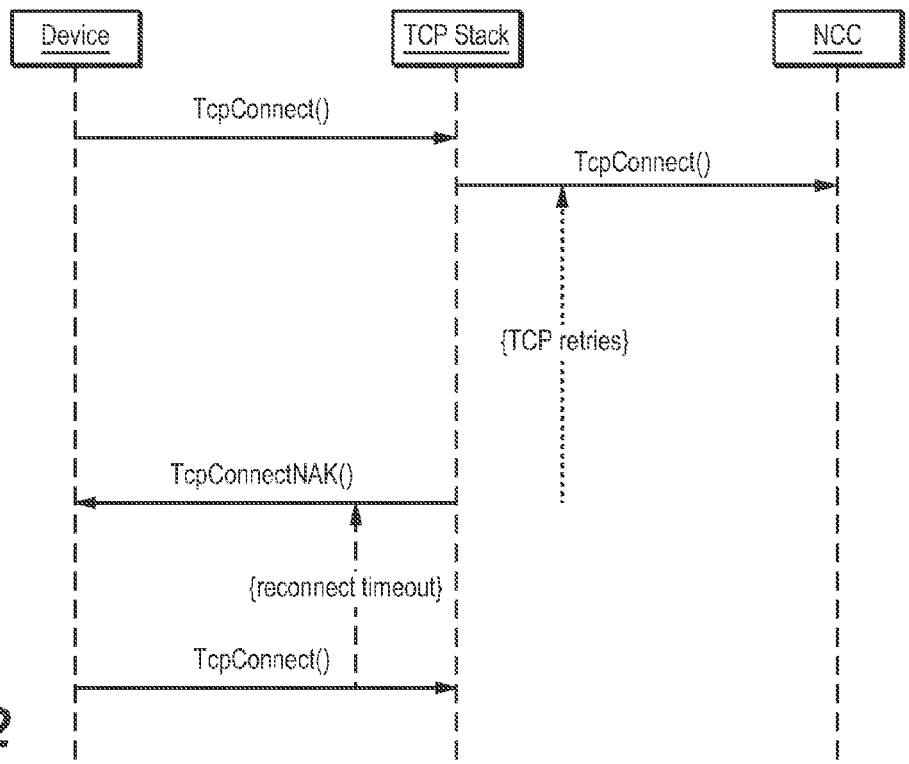
FIG. 2 shows a message flow between a NCC and a device for a TCP connection in accordance with an embodiment of the present claimed invention.

FIG. 2 shows a message flow between a NCC and a device for a TCP connection. If a connect attempt fails, the device attempts to reconnect after its reconnect timer expires. Note that the device uses a back-off strategy to dynamically increase its reconnect timer after multiple failed connect attempts.

Figure 3:
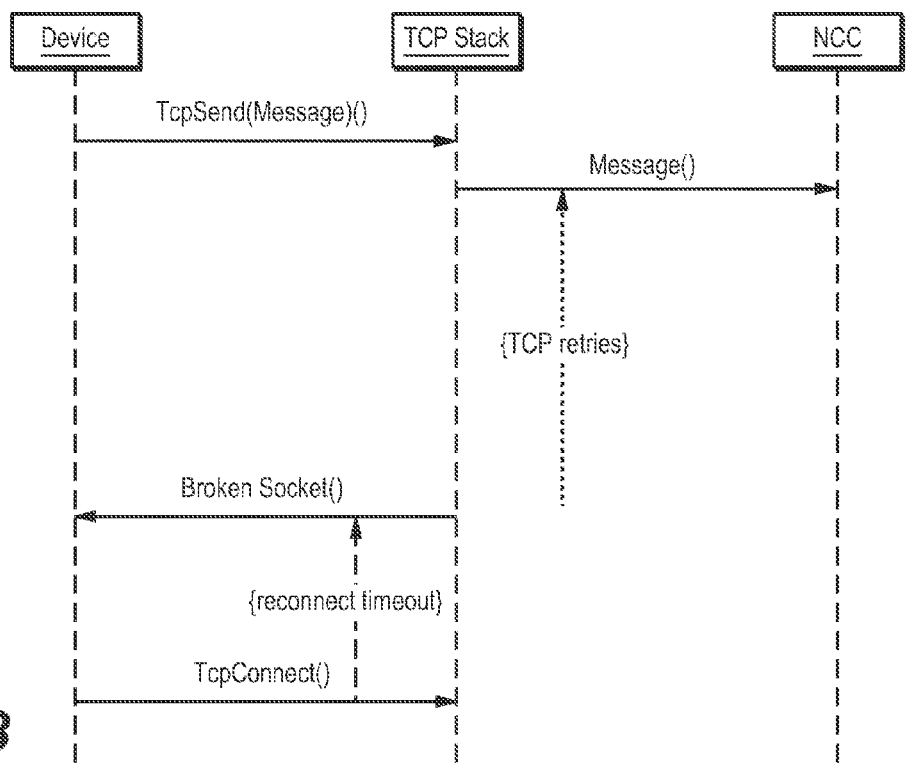
FIG. 3 shows a message flow between a NCC and a device for a TCP connection with retries and broken socket in accordance with an embodiment of the present claimed invention.

FIG. 3 shows a message flow between a NCC and a device for a TCP connection with retries and broken socket. When the device sends any messages to the NCC, it allows the TCP stack to perform retries. If the TCP stack notifies the device that the socket is broken, it uses its reconnect time-out logic to determine when to connect again. Like the failed connection case, the device uses a back-off strategy to dynamically adjust its reconnect time-out if repeated connect attempts fail.

Figure 4:
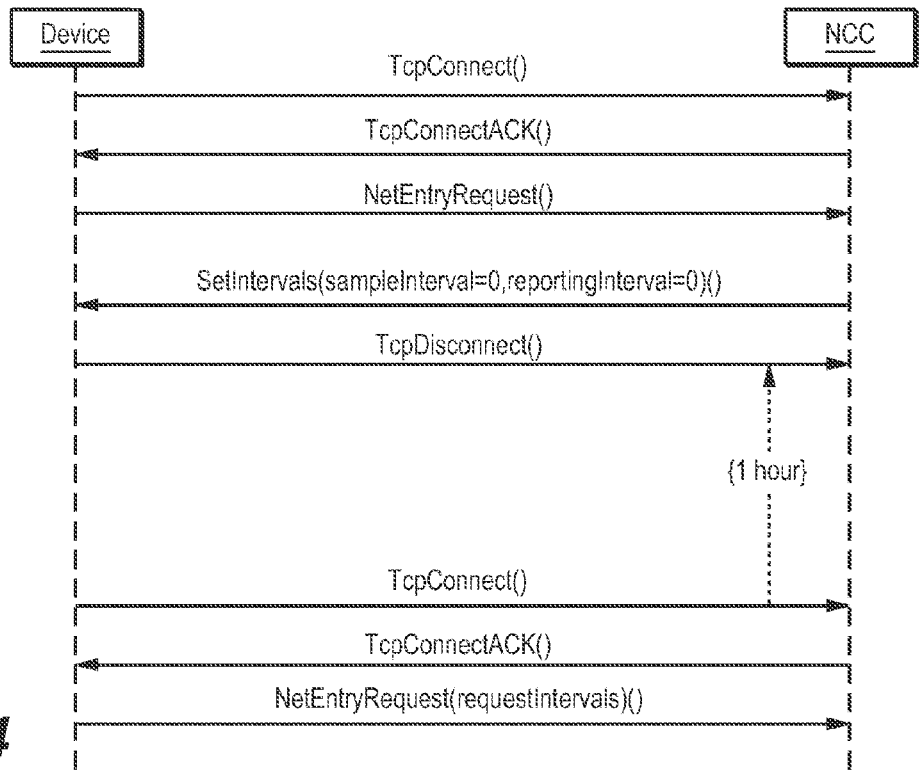
FIG. 4 shows a message flow between a NCC and a device for an unsuccessful logon in accordance with an embodiment of the present claimed invention.

As shown in FIG. 4 a device is usually responsible for initiating a TCP connection to the NCC in order to establish communications between the device and the NCC. The device sends a Net Entry Request to the NCC in order to identify itself and "log on" to the NCC.

If the NCC receives a Net Entry Request with an invalid device ID, it replies with a Set Main Repeating Intervals Slot Definition message with sentinel values for the sample and reporting intervals that tell the device to retry its network entry after a given period of time (e.g., an hour).

Figure 5:
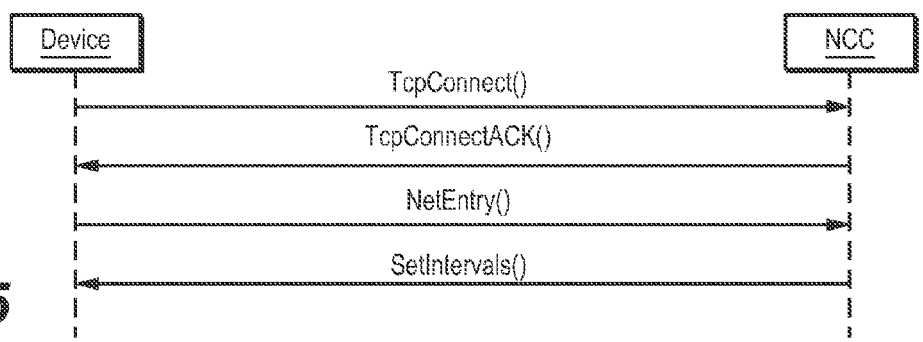
FIG. 5 shows a message flow between a NCC and a device with a successful logon in accordance with an embodiment of the present claimed invention.

As Shown in FIG. 5, when a device sends a valid Net Entry Request, the server replies with a Set Main Repeating Intervals Slot Definition message to allow the device to enter the network.

Figure 6:
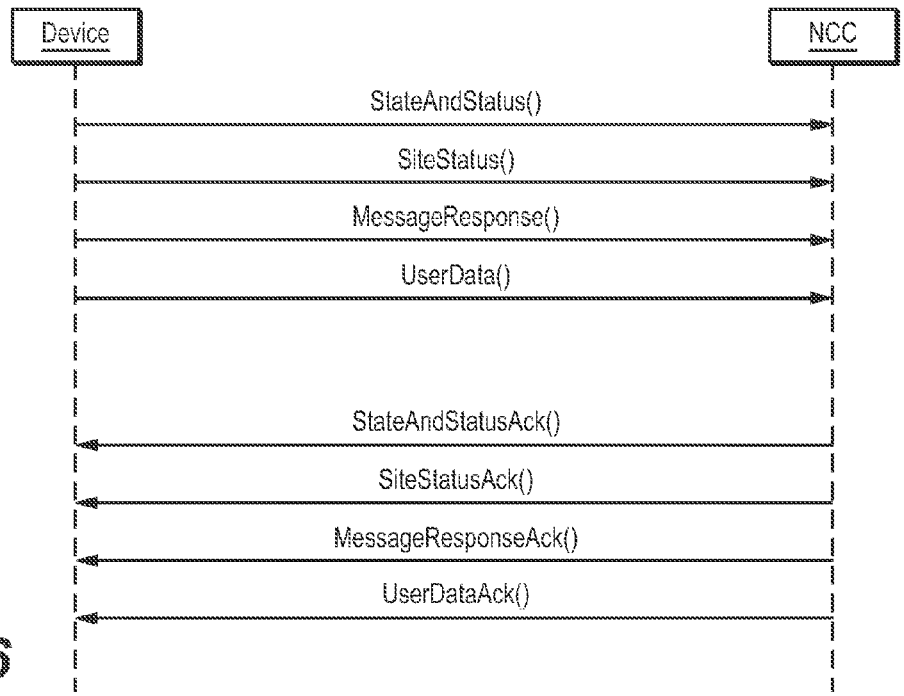
FIG. 6 shows a message flow between a NCC and a device including a bundled message in accordance with an embodiment of the present claimed invention.

FIG. 6 shows a message flow between a NCC and a device including a bundled message. Since TCP message headers account for much of the bandwidth used by protocol messages, the protocol allows both the device and the NCC to bundle several GPRS network protocol messages within a single TCP packet. Each side, at its discretion, may choose to bundle messages in this manner to reduce overhead. For example, a device may choose to send a State and Status message, a Site Status message, a Message Response, and a User Data message all in one TCP message. In response, the NCC may choose to send each of the four separate acknowledges in a single TCP message.

Since a device may have limitations as to how much data its TCP stack can buffer, the maximum size of a bundled message sent by NCC may be configurable. Also, note that the NCC may not send any additional outgoing message bundles to the device until the device has acknowledged all of the messages sent in the previous bundle.

The GPRS network protocol supports three different scenarios: a long-term connection with no keep-alives, a long-term connection with keep-alives, and a new connection per transaction.

Figure 7:
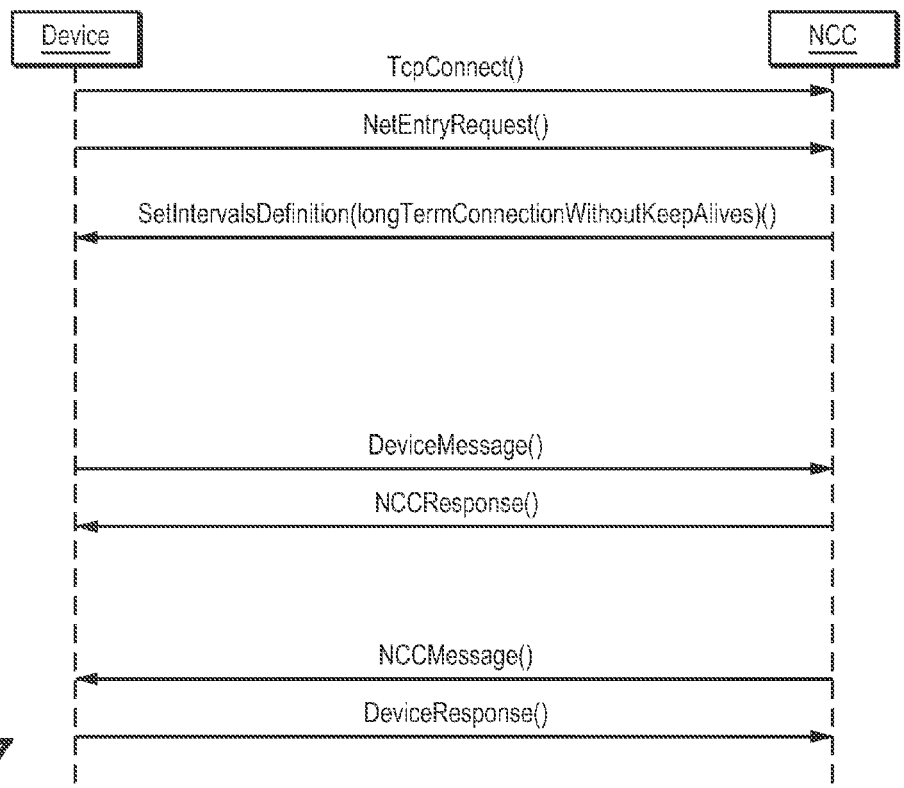
FIG. 7 shows a message flow between a NCC and a device in a long term connection without keep-alives in accordance with an embodiment of the present claimed invention.

The first scenario shown in FIG. 7, a long-term connection with no keep-alives, assumes that the GPRS network is configured such that the device can maintain a long-term connection to the NCC without having to worry about the GPRS network timing out an idle connection. In this scenario, the device and the NCC can send messages to each other at any time.

Figure 8:
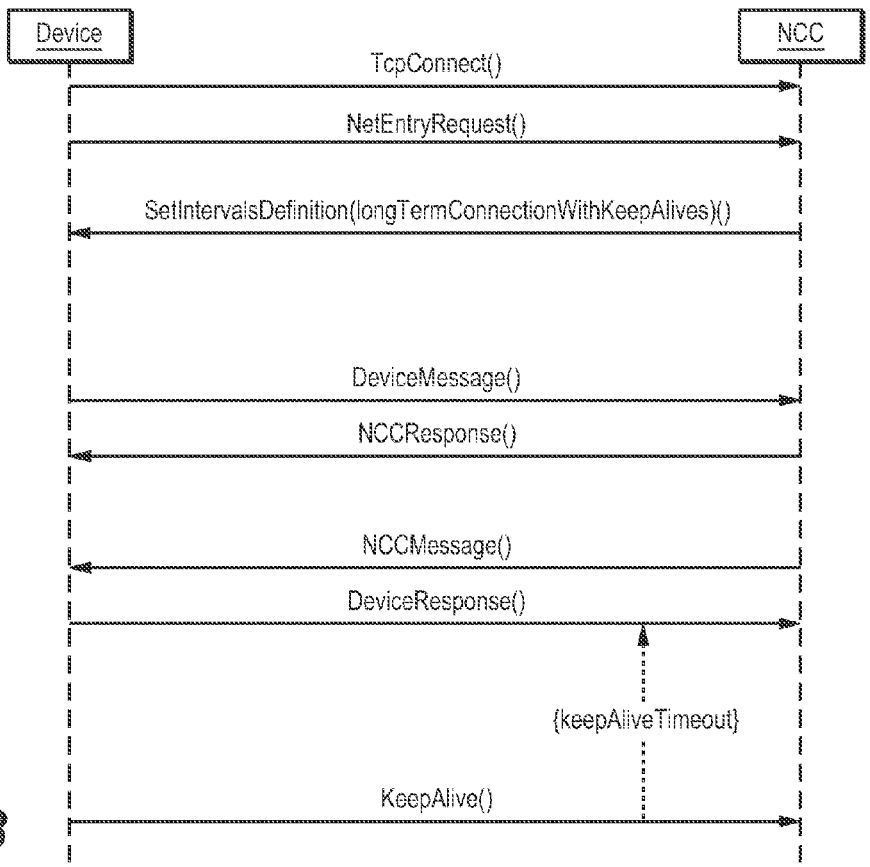
FIG. 8 shows a message flow between a NCC and a device in a long term connection with keep-alives in accordance with an embodiment of the present claimed invention.

The second scenario shown in FIG. 8, a long-term connection with keep-alives, assumes that a long-term connection is possible as long as periodic traffic on the connection prevents the GPRS network from timing out the connection. In this case, the device sends keep-alive messages to the NCC when necessary (e.g., when device has neither sent a message to the NCC nor received a message from the NCC within the specified time-out).

Figure 9:
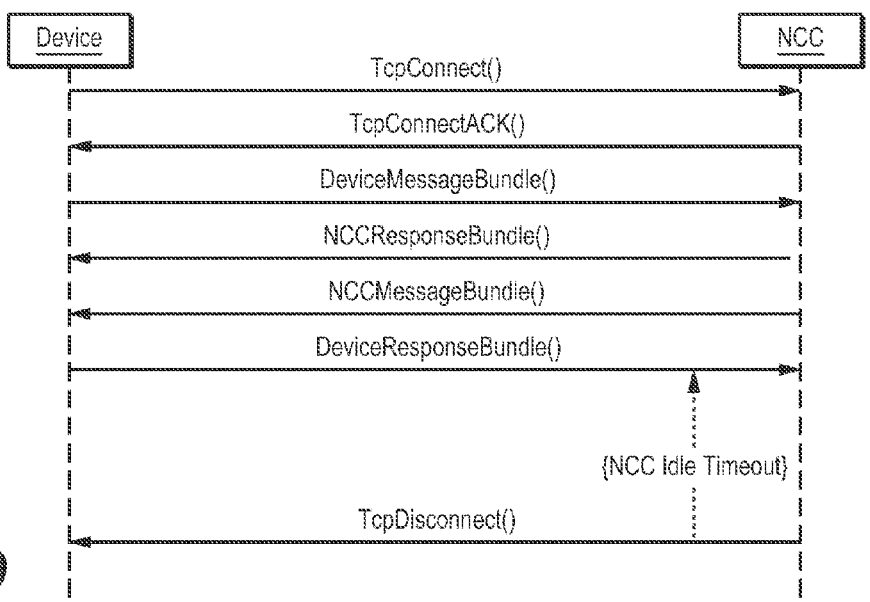
FIG. 9 shows a message flow between a NCC and a device with a new connection for each transaction in accordance with an embodiment of the present claimed invention.

In the third scenario shown in FIG. 9, a new connection per transaction, a long-term connection is impossible. The device must initiate a TCP connection to the NCC at its reporting interval. When the connection is established, the device sends all of its queued messages to the NCC (in a single TCP message if possible). The NCC processes and responds to all of these messages. Next, the NCC sends the device any messages it has queued and waits for the responses. After receiving the responses, the NCC keeps the connection open waiting for additional requests for up to T seconds (where T is the NCC Idle Time-out value). If no additional messages are exchanged, the NCC terminates the connection.

Note that the first DeviceMessageBundle from the device contains a Net Entry Request and the first NCCResponseBundle contains a Set Intervals message. Also note that the NCC specifies a connection mode of "New Connection Per Transaction" in the connection mode field of the Set Intervals message. The sequence diagram below does not explicitly show this behavior.

Also, note that this sequence depicts a DeviceResponseBundle as the last bundle sent before the NCC terminates the connection. However, in general, either side (the NCC or the device) may be the last side sending a bundle. For example, the NCCResponseBundle may be the last bundle sent before the NCC times out and terminates the connection.

Figure 10:
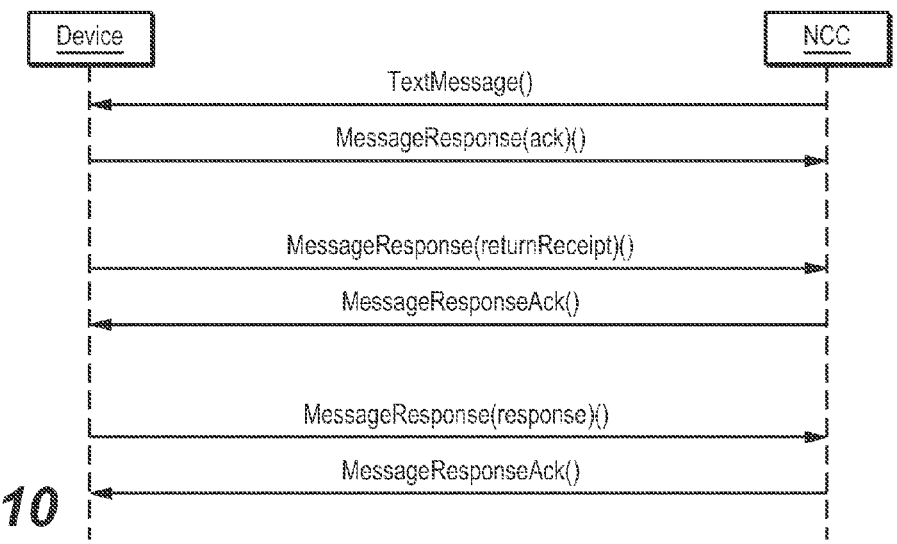
FIG. 10 shows a NCC initiated transaction with a text message in accordance with an embodiment of the present claimed invention.

FIG. 10 shows a NCC initiated transaction with a text message using an established TCP connection. The device sends an application-level acknowledge upon receipt of the message. If/when the message is read by a human, the device sends a return receipt. Finally, if/when a human responds to the message, the device sends a message response to the NCC.

Figure 11:
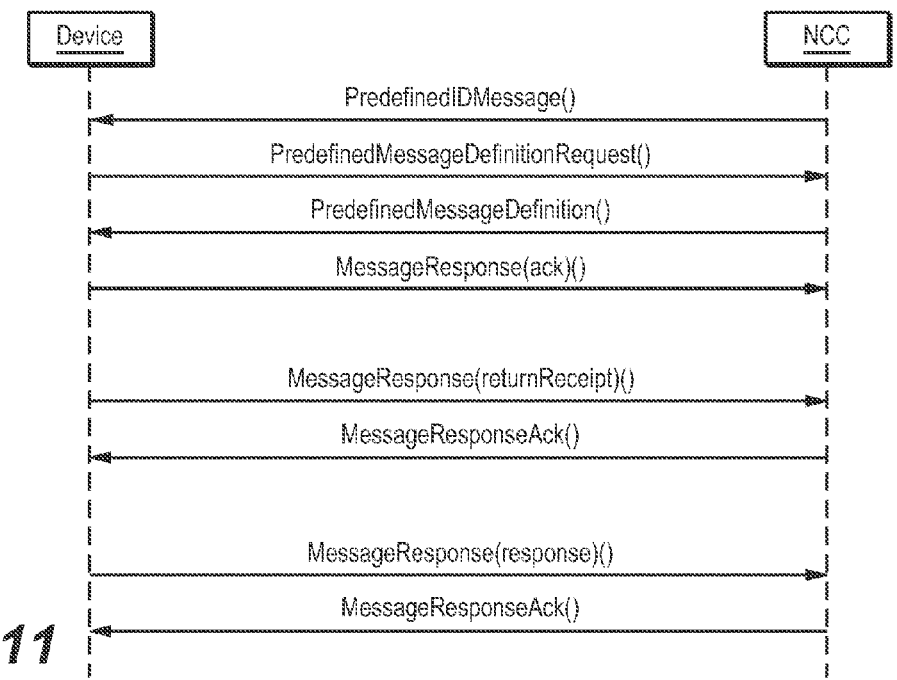
FIG. 11 shows a NCC initiated transaction with a predefined ID message in accordance with an embodiment of the present claimed invention.

The pre-defined-ID-message sequence shown in FIG. 11 contains many optional messages. First, when the NCC sends a pre-defined-ID message to the device, the device may or may not have an up-to-date programming for that particular ID.

If the device is up to date, the device responds with an application-level acknowledge. If not, the device sends a pre-defined ID message request to the NCC in order to obtain the ID's definition. The NCC replies with the appropriate definition, which the device acknowledges.

Figure 12:
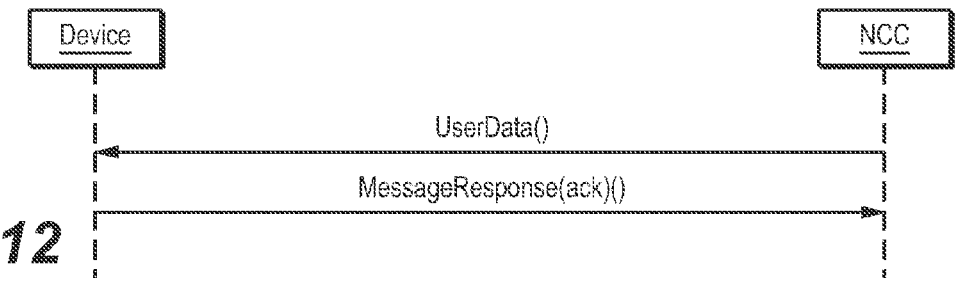
FIG. 12 shows a NCC initiated transaction with a user data message in accordance with an embodiment of the present claimed invention.

At this point, this message sequence resembles a normal text message. If/when the message is read by a human, the device sends a return receipt. Finally, if/when a human responds to the message, the device sends a message response to the NCC. FIG. 12 shows a NCC initiated transaction with a user data message.

Figure 13:
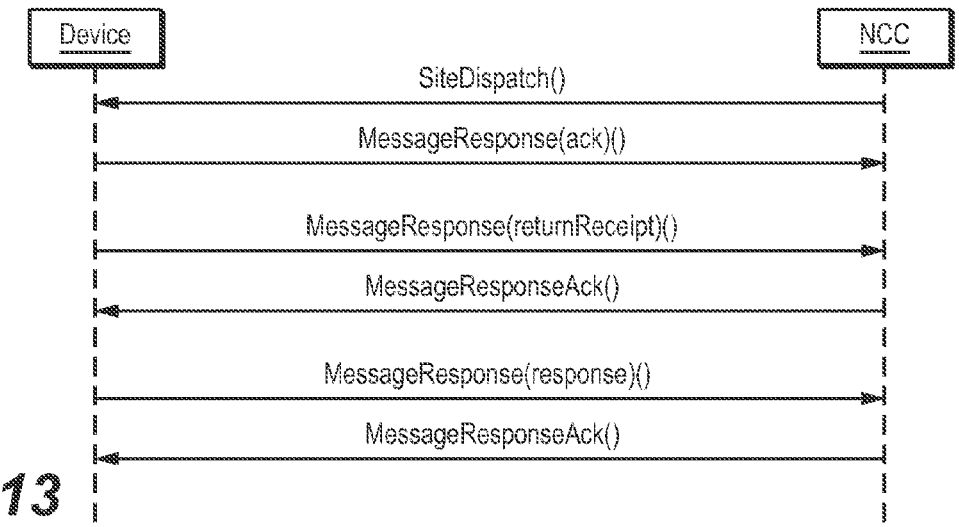
FIG. 13 shows a NCC initiated transaction with a site dispatch in accordance with an embodiment of the present claimed invention.

FIG. 13 shows a NCC initiated transaction with a site dispatch. The device sends a return receipt when a human reads the site dispatch, and the device sends a response when a human responds to the dispatch. Note that if the dispatch is a silent site dispatch (e.g., no text in the dispatch), there will be no return receipt and no dispatch response, as there will be no (human readable) visible indication of the dispatch. One example of a silent site dispatch is setting up a home site.

Figure 14:
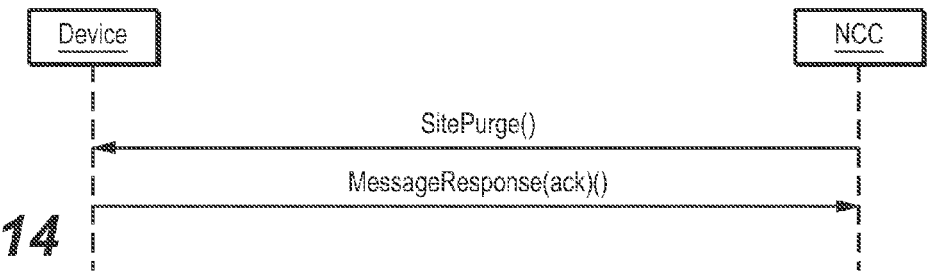
FIG. 14 shows a NCC initiated transaction with a site purge message in accordance with an embodiment of the present claimed invention.

FIG. 14 shows a NCC initiated transaction with a site purge message.

Figure 15:
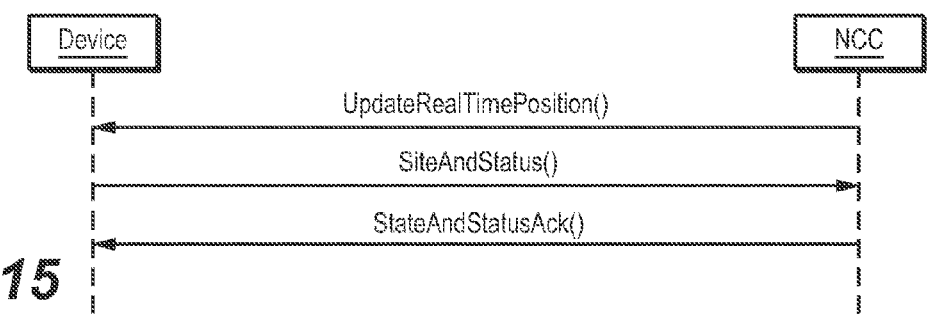
FIG. 15 shows a NCC initiated transaction with an update real-time position message in accordance with an embodiment of the present claimed invention.

FIG. 15 shows a NCC initiated transaction with an update real-time position message.

Figure 16:
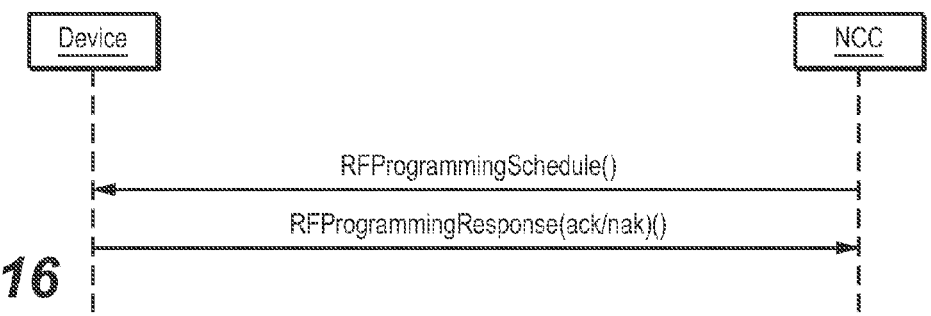
FIG. 16 shows a NCC initiated transaction with a schedule RF programming message in accordance with an embodiment of the present claimed invention.

FIG. 16 shows a NCC initiated transaction with a schedule RF programming message.

Figure 17:
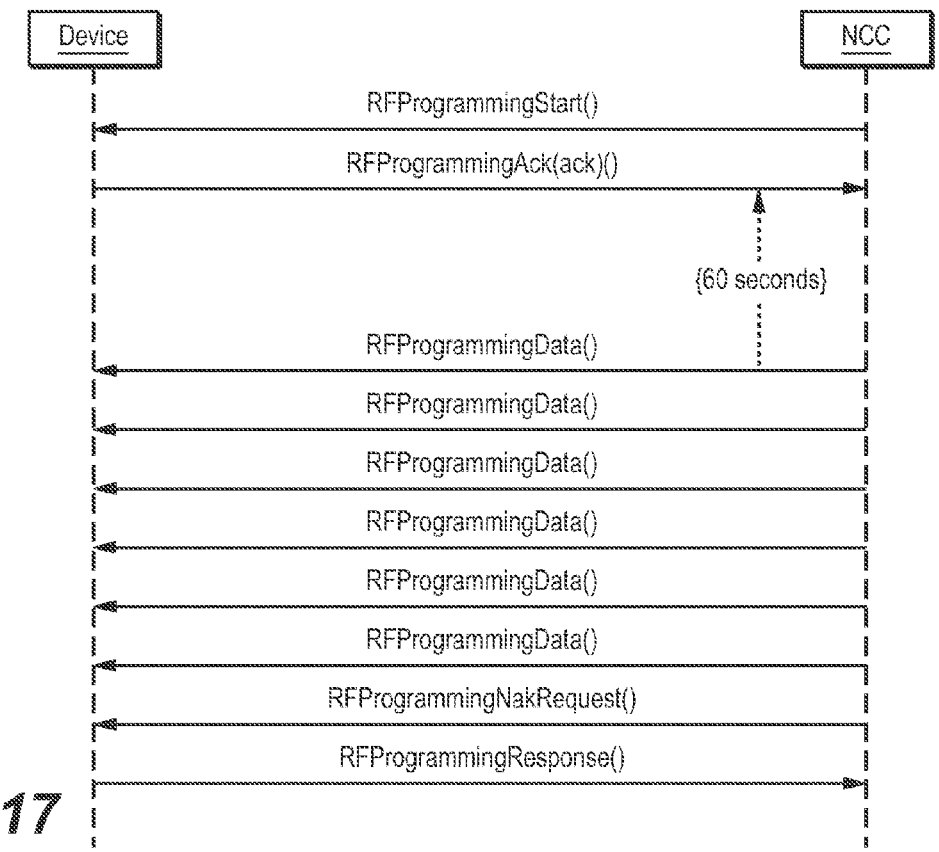
FIG. 17 shows an example of an RF programming session (ACK) in accordance with an embodiment of the present claimed invention.

FIG. 17 shows an example of an RF programming session (ACK).

Figure 18:
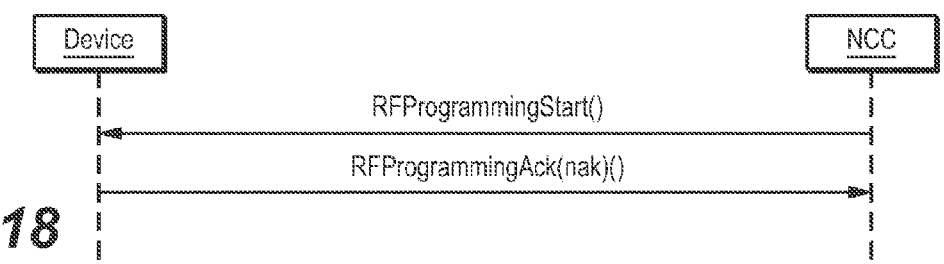
FIG. 18 shows an example of an RF programming session (NAK) in accordance with an embodiment of the present claimed invention.

FIG. 18 shows an example of an RF programming session (NAK).

Figure 19:
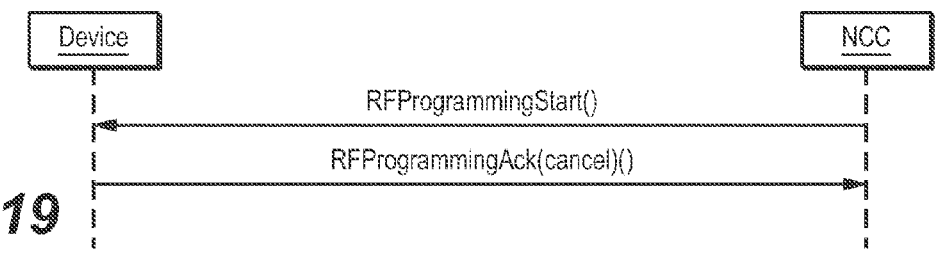
FIG. 19 shows an example of an RF programming session (Cancel) in accordance with an embodiment of the present claimed invention.

FIG. 19 shows an example of an RF programming session (Cancel).

Figure 20:
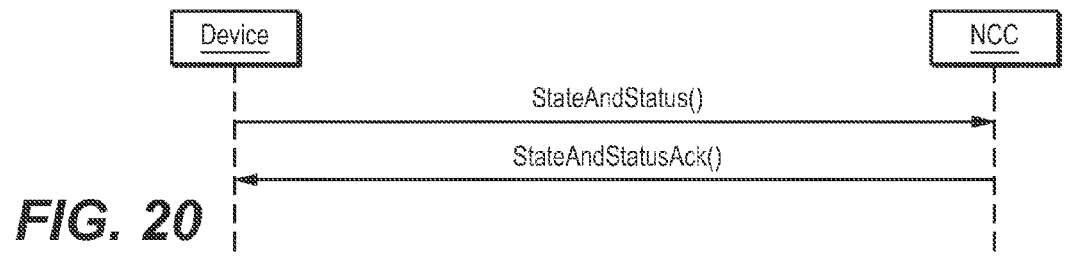
FIG. 20 shows a device initiated transaction with State and Status in accordance with an embodiment of the present claimed invention.

FIG. 20 shows a device initiated transaction with State and Status.

Figure 21:
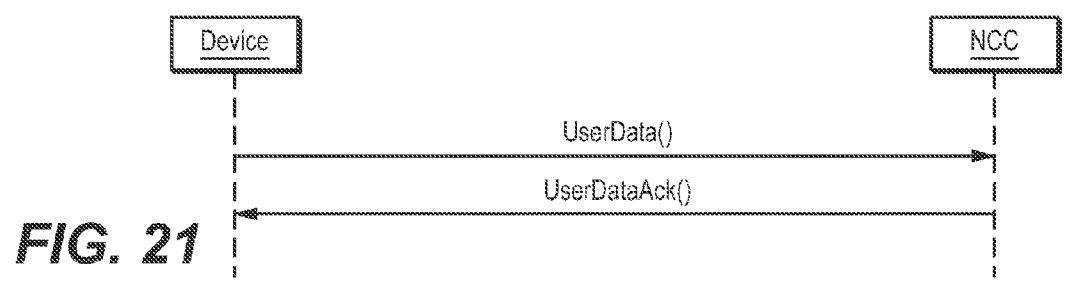
FIG. 21 shows a device initiated transaction with User Data in accordance with an embodiment of the present claimed invention.

FIG. 21 shows a device initiated transaction with User Data.

Figure 22:
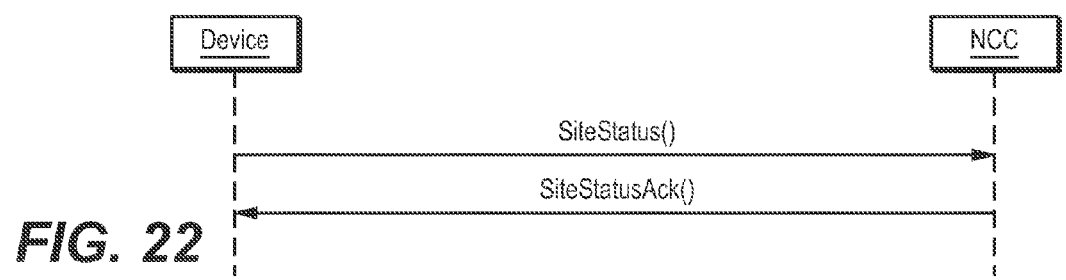
FIG. 22 shows a device initiated transaction with Site Status in accordance with an embodiment of the present claimed invention.

FIG. 22 shows a device initiated transaction with Site Status.

Figure 23:
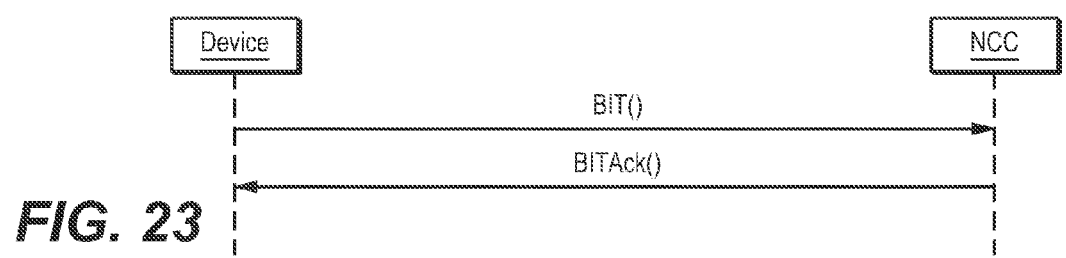
FIG. 23 shows a device initiated transaction with Built-In Test (BIT) in accordance with an embodiment of the present claimed invention.

FIG. 23 shows a device initiated transaction with Built-In Test.

FIG. 24 shows an example of a Network Control Center (NCC) 2400 coupled to mobile devices 2455 by a GPRS network 2450. FIG. 24 also illustrates the relationship between the GPRS Inbound/Outbound service 2445 the rest of the NCC system.

The GPRS Inbound/Outbound Service 2445 is an executable that allows the NCC to communicate with remote or mobile GPRS devices 2455. This service is the entity within the NCC 2400 that communicates with the GPRS devices. The NCC 2400 may use a TCP-based protocol to communicate with the devices.

The NCC may contain more than one instance of the GPRS Inbound/Outbound service (each running on a different machine in a multiple server environment) in order to achieve scalability and high-availability. Each service instance maintains TCP connections to GPRS devices. A device may connect to any service instance. However, once connected, a device may communicate only with the service instance to which it is connected.

The GPRS Inbound/Outbound Service's primary responsibilities include accepting incoming, and maintaining TCP connections from GPRS devices, receiving outbound messages from the GPRS device queue 2440 through the GPRS filtered queuing interface, transmitting them (while eliminating duplicates) to the appropriate devices, and storing them into the Network and Engineering Database (NED) 2425. Responsibilities may also include receiving incoming messages (including device-initiated acknowledgments) from devices, processing them, and storing them into the NED 2425 and, if necessary, the User Support Database (USD) 2430, and sending acknowledgment messages to devices.

For outbound messages, the XML Message Processor 2420, Tracker Configuration Service (TCS) 2415, and Reliable Message Router (RMR) 2410 each deliver messages to the tracker message queue. The XML Message Processor 2420 delivers messages initiated by web-based customer clients. TCS 2415 delivers device configuration messages. RMR 2410 is responsible for resending unacknowledged outgoing messages to ensure reliable transmission. The Tracker Message Router (TMR) 2435 delivers messages to the appropriate network-specific message queue. For devices, TMR 2435 posts messages to the GPRS device queue 2440.

For inbound messages, the devices send messages to the GPRS Inbound/Outbound service, which routes messages to the Customer Message queue. The Customer Message Router (CMR) 2405 handles routing messages from the Customer Message queue 2460. FIG. 24 shows only one instance of each service, in a real system, there may be several instances of each service (in order to address high-availability and scalability issues). Also, several different types of services may actually run on the same machine.

Even though the current embodiment of the GPRS protocol is TCP based and therefore reliable, a Reliable Message Router (RMR) 2410 is still desirable in the NCC architecture. A GPRS Inbound/Outbound service instance can terminate abnormally while holding outgoing messages pending delivery. In this case, the RMR 2410 resends these messages so another GPRS Inbound/Outbound service instance can transmit them once the devices 2455 have reconnected.

The operation of the RMR 2410 may produce duplicate messages in the GPRS device queue 2440. If there is a message in the GPRS device queue 2440 destined for a device 2455 that is not connected, the queue handles "timing out" the message. However, since RMR resends messages that are unacknowledged, there may be a window of time where the queue 2440 may contain duplicate messages. The GPRS Inbound/Outbound service must detect these duplicate messages and avoid sending them.

Most outgoing messages have 32-bit sequence number. These sequence numbers increase monotonically and are unique per customer. This implies that sequence numbers are also unique per device. One detail that complicates this situation is the fact that the messages sent to a device may be out of order if the RMR 2410 resends them. For example, a device 2455 may have a message with sequence number 300 pending retransmission by the RMR 2410 when it connects. Suppose that the service sends messages with sequence numbers 301, 302, and 303. Then, suppose that RMR retransmits 300. The service may not assume that since 300 is a lower sequence number than 303, the 300 message is a duplicate.

To correctly recognize duplicates, the service must maintain a history of sequence numbers sent. This history preferably includes (on a per-device basis) the first sequence number sent, the last sequence number sent, and a list of sequence numbers "less" than the first sequence numbers sent. The list allows handling of any out of order sequence numbers resulting from retransmissions by the RMR 2410. Since a message may not exist past one week (actually 1 GPS week minus 10 minutes), the service may discard the list and the first-sequence-number-sent value one week after a device connects. The time-out may actually occur much sooner. However, to handle an extremely unlikely case where all instances of the RMR are unavailable for an extended period of time, we use a time-out of one week.)

One week after a device's connection, the service may detect a duplicate simply by noting that the message's sequence number is "less than" the last sequence number of the last message sent to that device. In this case, the new message is a duplicate that the service can ignore.

Since sequence numbers may wrap, the service must be careful about how it determines that one sequence number is "less than" another. A simple comparison is insufficient. Instead, the service may test for values within a range of the last sequence numbers used by the device (e.g., 1,000,000). User data messages have a separate per-customer sequence. Therefore, the service must track both sequence number types (i.e., user data and non-user data) for each device.

The following outgoing messages do not have 32-bit sequence numbers: Set Intervals, Pre-Defined ID Message Definition, Update Real-Time Position, and RF Schedule/Start/Data/RequestNakMap. The service must handle each of these as a special case.

The service sends a Set Intervals message in response to a Net Entry request from the device. A Set Intervals message may also be inserted into the GPRS device queue 2440 as the result of a customer application requesting a change to a device's intervals. To avoid sending duplicates, the service must simply track the set of information in the last Set Intervals message sent to a device (during the current connection). The service may simply avoid sending additional Set Interval messages if the information has not changes. Also, if the service detects multiple Set Interval messages in the GPRS device queue, it must use the last message in the queue (since it is the one with the correct interval values).

The service sends the Pre-Defined ID Message Definition only in response to an ID-Message-Definition Request from the device. Therefore, a Pre-Defined ID Message Definition never appears in the GPRS device queue 2440. The service does not need to handle duplicates in this case.

Individual Update Real-Time Position messages are identical. Therefore, if the service detects multiple messages in the GPRS device queue, the service simply sends the last instance and ignores the others.

The RF Schedule, Start, and RequestNakMap messages do not have sequence numbers. However, the all have a 32-bit event ID. Therefore, the service may track the last event ID for each of these messages and avoid sending duplicates. A special case is the RF RequestNakMap message, which the Tracker Configuration Service (TCS) 2415 sends after sending all of the RF Programming Data messages in order to determine which packets were received and processed. The RF RequestNakMap message has the same event ID as the one that appeared in the Start and Data messages.

The Data and RequestNakMap portions of the programming sequence may iterate. The TCS 2415 sends the Start, followed by Data, followed by RequestNakMap. If the device did not receive/process some of the Data messages, TCS 2415 resends those Data messages, followed by another RequestNakMap. All of these messages have the same event ID. Therefore, once the service sees an RF Programming Data message with a specified event ID, it can send a RequestNakMap message with that ID.

Unlike other messages that depend on the RMR 2410 to perform resending unacknowledged messages, the TCS 2415 handles resending RF Programming messages. Also, RF Programming may involve sending huge amounts of data to trackers (devices).

RF Programming (a.k.a., over-the-air, OTA) of device firmware may involve the TCS 2415 sending Programming Data messages to a large number (e.g., 100, 1000, or 10,000) of devices. The total size of a device's firmware may be in neighborhood of 1 megabyte. Normally, the Tracker Message Router (TMR) 2435 separates messages destined for multiple devices into individual device messages. However, queuing 10,000 copies of 1 MB buffers would cause problems. If an instance of the GPRS Inbound/Outbound service had 1000 connected devices, it would need to buffer 1000 MB of programming data. Additionally, the GPRS device queue would need to buffer 10,000 MB of programming data.

To avoid queuing huge amounts of (repeated) data, the TMR 2435 handles RF Programming Data messages differently than other messages sent to the GPRS device queue. It does not split them into individual messages. TCS 2415, TMR 2435, and the GPRS Filtered Queuing mechanism of the GPRS Queue 2440 work together to broadcast Programming Data messages to all instances of GPRS Inbound/Outbound services. This means that each GPRS Inbound/Outbound service instance is responsible for determining if a Programming Data message applies to its connected devices and, if so, transmitting the message to them.

Additionally, the TCS 2415 avoids resending Programming Data messages until all of the devices being programmed have responded with an RF Programming NAK map. Via the NAK maps, TCS knows exactly which devices have received which Programming Data messages. The TCS 2415 never resends a Programming Data message to a device that has already received that particular data block. Therefore, the GPRS Inbound/Outbound service does not need to worry about duplicate Programming Data messages.

To minimize TCP overhead, the GPRS Inbound/Outbound service attempts to bundle messages into a single TCP message. However, sue to a typical device's RAM limitations, the GPRS Inbound/Outbound service may not blindly send huge amounts of data to the device. Doing so would most likely overflow the device's buffers and result in (costly) retransmission at the TCP level.

To avoid this problem, the GPRS Inbound/Outbound service defines a configurable maximum TCP payload size. The service does not create message bundles that exceed this size. Additionally, the service does not send any additional messages to a device until the device acknowledges all previously sent messages.

It is possible for a device to receive a request, send a TCP-level acknowledge, but then fail to send the application-level acknowledge (e.g., because the device went out of coverage and lost its connection). To handle this case, the service must time out "dead" connections. Otherwise, the service would be in a state where it is not sending queued messages to the device, and the service cannot detect a broken socket because there are no outstanding TCP-level acknowledges. Therefore, the service may maintain a "dead" connection timer to time out connections that never receive an application-level acknowledge.

Figure 25B:
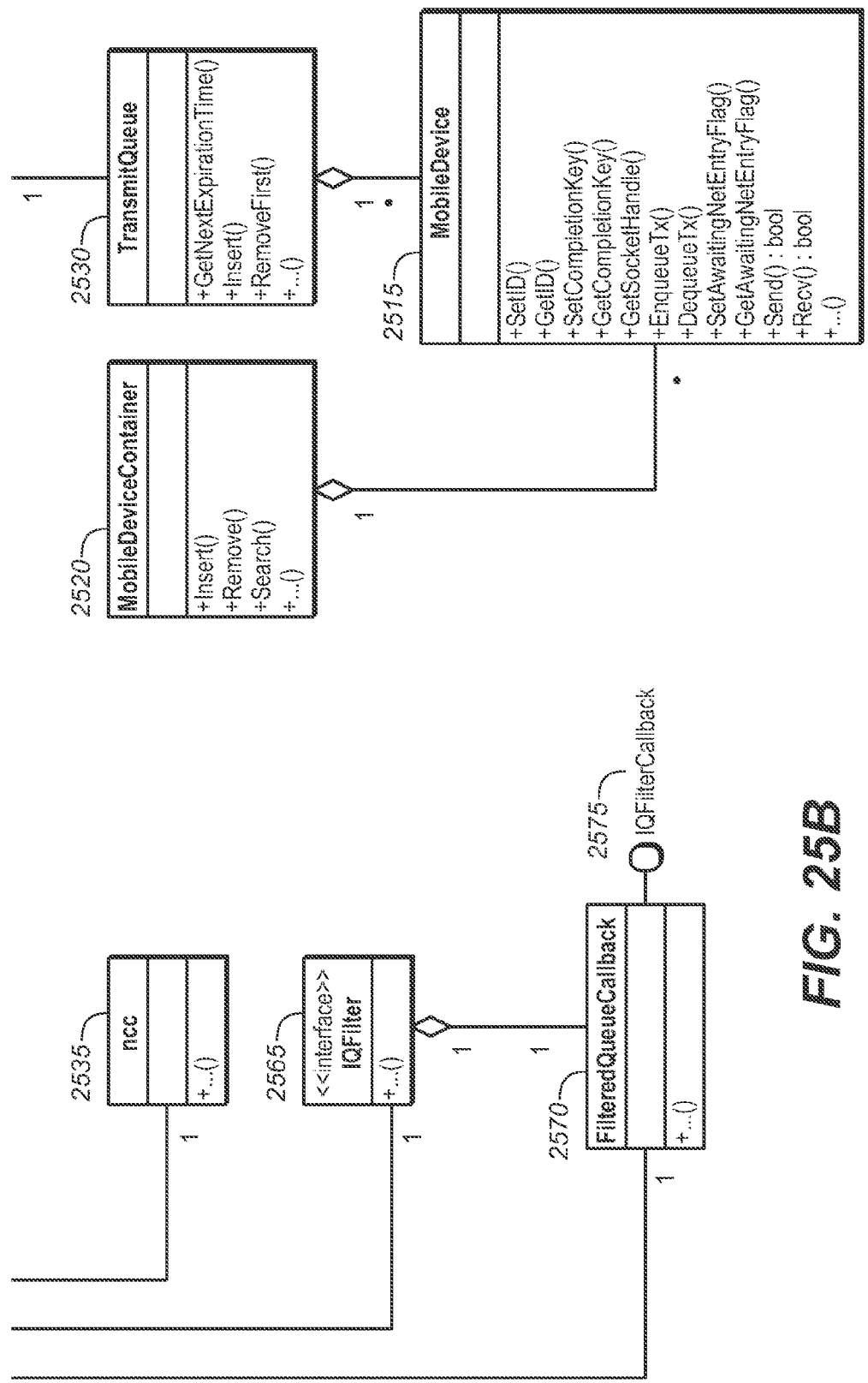
FIG. 25 shows a static structure diagram for the GPRS Inbound/Outbound service in accordance with an embodiment of the present claimed invention.

FIG. 25 shows a static structure diagram for an example of the GPRS Inbound/Outbound service. In this example, the service is an NT service running on a Microsoft Windows 2000 machine.

Class NTService 2505 is an abstract base class that provides an abstraction for implementing an NT service. Its purpose is to hide most of the OS-specific details of service support and Service Control Manager (SCM) interaction from the application layer. In general, derived classes override the Main ( )method to define the service's main thread of execution.

Class GPRSInboundOutboundService 2510 is a specialization of class NTService. Its Main ( ) method implements the main controlling logic for the GPRS Inbound/Outbound service.

Class MobileDevice 2515 stores the current state (e.g., device ID, socket handle, I/O completion key, sequence number of last message sent) of a connected GPRS device. Class MobileDevice's operations allow access to device state (e.g., get/set state) and provide support for communicating with the device (e.g., enqueue/dequeue data to be sent, send data, receive data, process received data). The GPRS Inbound/Outbound service maintains one MobileDevice object for each device. MobileDevice objects exist as nodes in several data structures to provide access to device state from different perspectives.

Class MobileDeviceContainer 2520 is a container for MobileDevice objects that supports fast object look-up by key (e.g., device ID or IOCP completion key).

Class IOCPManager 2525 provides an abstraction for a Win32 I/O Completion Port. It handles the bulk of the details involved in dealing with IOCP (e.g., creating the I/O Completion Port and the thread pool). The class provides a callback interface for notifying the application layer of completion events.

Class TransmitQueue 2530 is a time-ordered queue of MobileDevice objects. The order of the queue's elements corresponds with the order that devices are scheduled to transmit messages. The class does not have any transmit logic. It simply provides queue functions (insert, remove, etc.).

The TransmitQueue 2530 class allows the service to support scheduling transmit and connection time-out events (e.g., delaying a transmission until the bundling interval expires, disconnecting a device if it does not send a NetEntry, disconnecting a device if it does not send an application-level acknowledge, etc.).

Class ncc 2535 is a shared class that several projects use to obtain the NCC_CONFIG_SETTINGS configuration. The GPRS Inbound/Outbound service reuses this logic to obtain its configuration.

Class ThreadWithExceptionHandling 2540 is an abstract base class that provides an abstraction for a thread. Its purpose is to hide most of the OS-specific details of thread support from the application layer. This class provides support for performing a register and stack dump when a structured exception occurs. It also provides "basic" thread functionality (creating a thread, starting a thread, terminating a thread, posting a message to a thread, etc.). Class ThreadWithExceptionHandling also provides static methods that allow system-initiated threads (e.g., main ( ) to enjoy the benefits of the class ThreadWithExceptionHandling's structured-exception-handling support. In general, derived classes override the Main ( ) and MainCleanUp ( ) methods to define the thread of execution logic.

Class TcpServerThread 2545 handles accepting incoming TCP connections from GPRS devices. It accepts any incoming connection on its TCP port and passes the accepted socket connection to the I/O Completion Port Manager for further handling.

Class TcpTransmitThread 2550 performs all TCP transmissions to devices for the GPRS Inbound/Outbound service. This thread maintains a time-ordered queue of MobileDevice objects. The TcpTransmitThread traverses this queue and performs transmissions at the appropriately scheduled times.

The I/O Completion Port Manager 2525 maintains a pool of TcpIOCPThread 2555 objects to service incoming TCP messages. Class TcpIOCPThread 2555 provides a callback interface that allows the application layer to be notified of the arrival of TCP data on a socket managed by the I/O Completion Port Manager 2525.

The Class HealthMonitorThread 2560 handles periodically reporting configuration, status, and statistics to QMS.

The GPRS Filtered Queuing mechanism implements interface IQFilter 2565. This interface supports passing outgoing messages from the GPRS device queue to the GPRS Inbound/Outbound application layer for processing.

Class FilteredQueueCallback 2570 implements interface IQFilterCallback 2575. This class handles each message received from the GPRS device queue The GDInMsgs (In-Proc) COM server 2580 contains components that hold the NCC's representation of messages. The GPRS Filtered Queuing mechanism passes the GPRS Inbound/Outbound service messages in the form of a GDInMsgs component.

The Message (In-Proc) COM server 2585 contains components that handle converting messages to and from the message format described in the GPRS Wireless ICD. The device-message-transmit and device-message-receive logic both use Message components to handle serialization and deserialization of GPRS protocol messages.

Figure 26B:
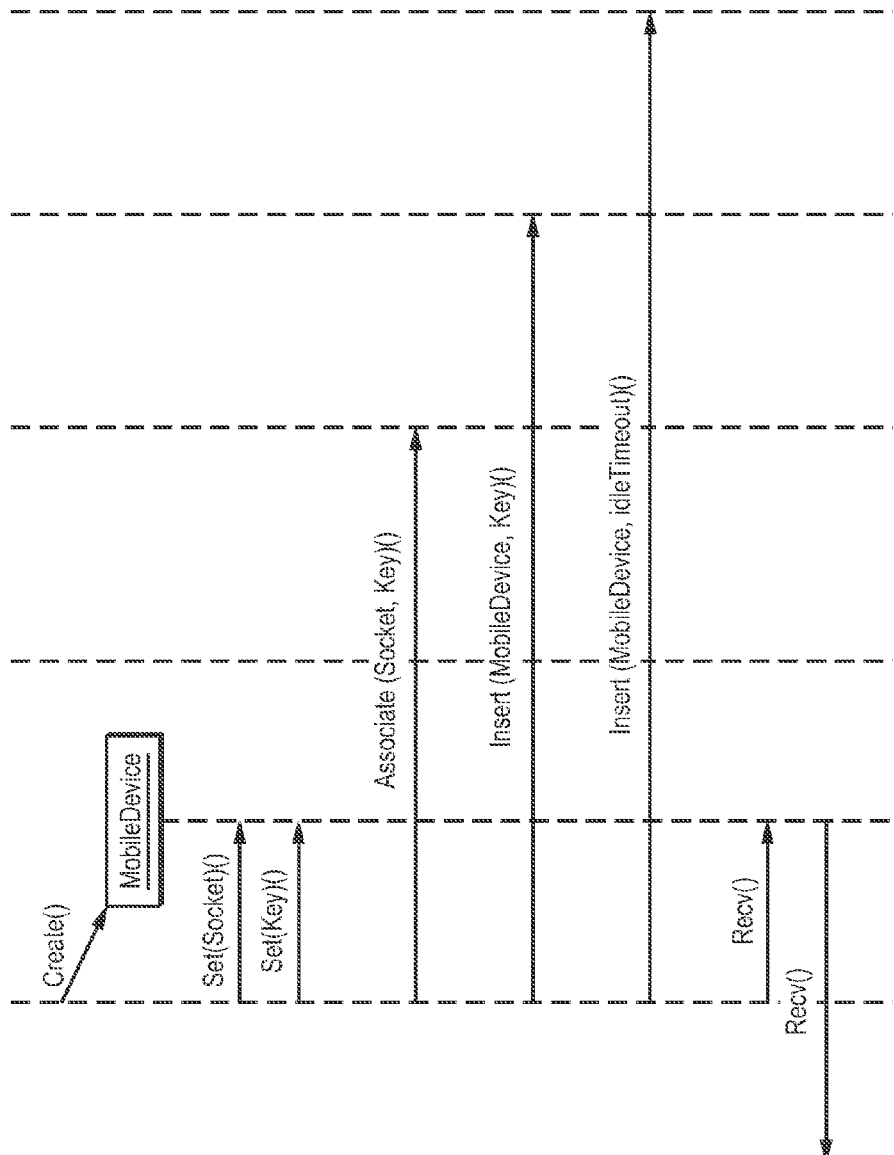
FIG. 26 shows a sequence diagram for events associated with processing an incoming connection from a device in accordance with an embodiment of the present claimed invention.

FIG. 26 shows a flow diagram for events associated with processing an incoming connection from a device.

Figure 27B:
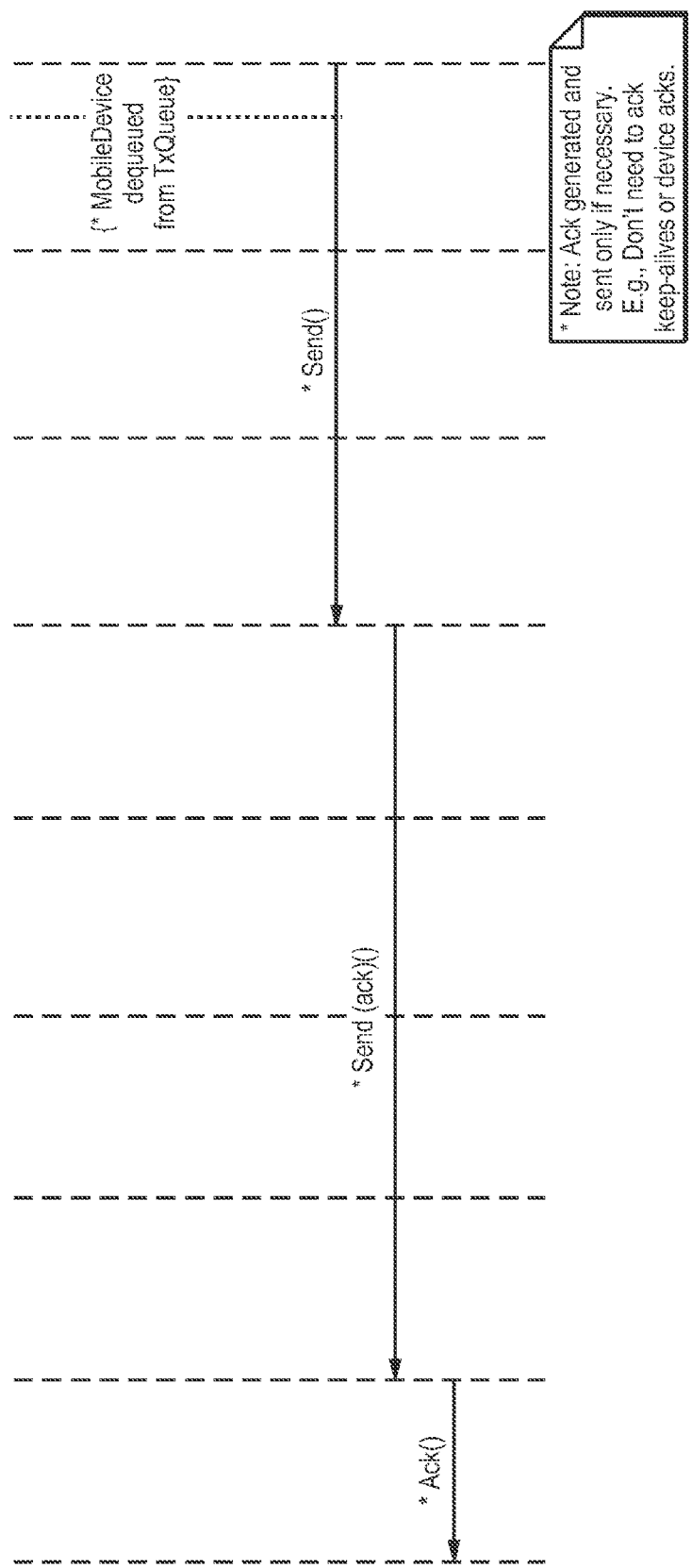
FIG. 27 shows a sequence diagram for the events associated with processing an incoming message from a device in accordance with an embodiment of the present claimed invention.

FIG. 27 shows a sequence diagram for the events associated with processing an incoming message from a device.

Figure 28:
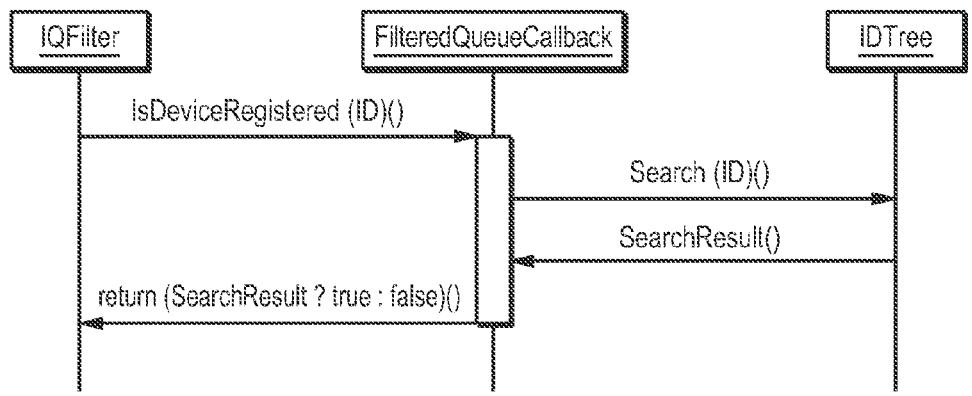
FIG. 28 shows the control flow resulting from the IQFilter interface checking to see if a device is registered in accordance with an embodiment of the present claimed invention.

FIG. 28 shows the control flow resulting from the IQFilter interface checking to see if a device is registered.

Figure 29:
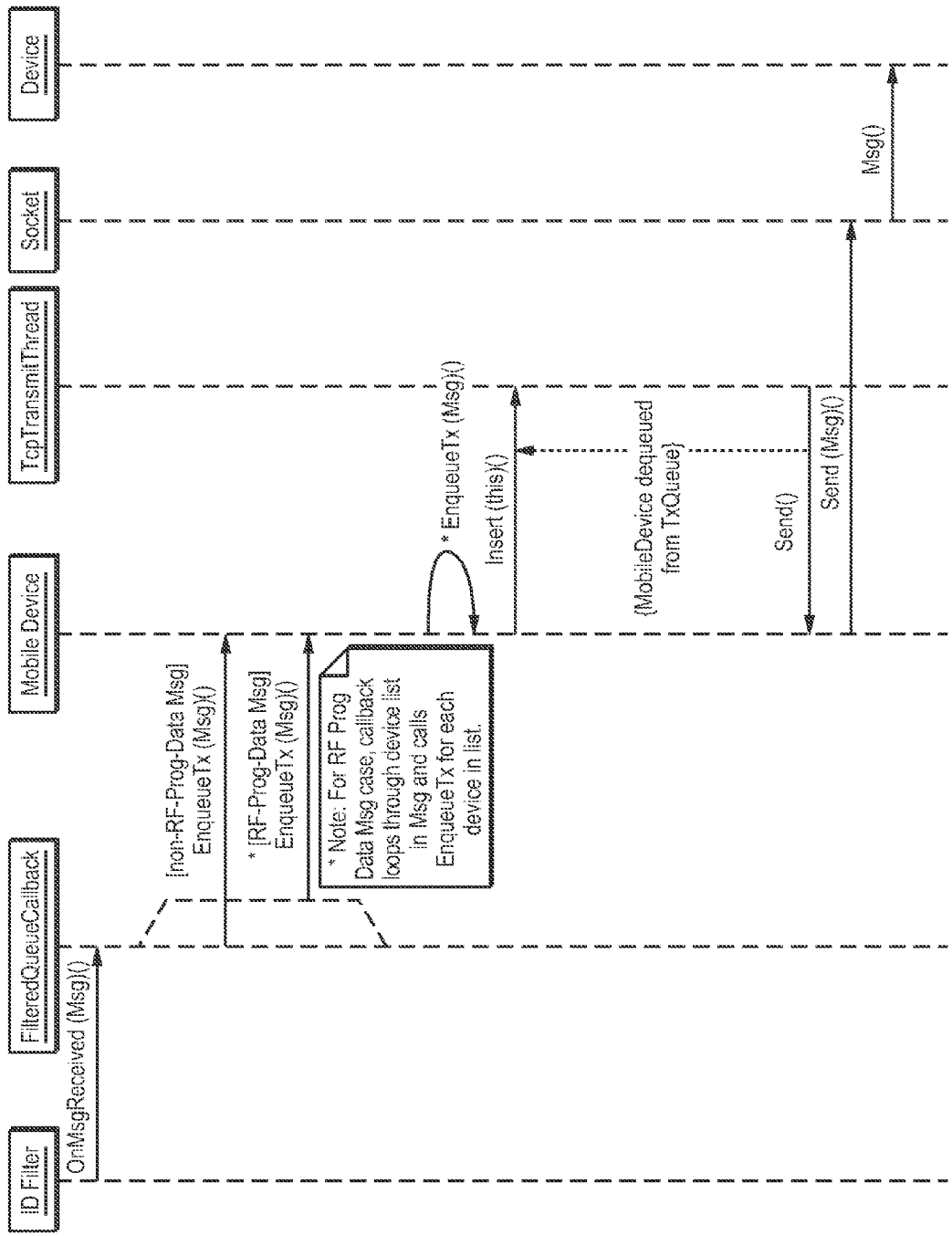
FIG. 29 shows a sequence diagram for the events associated with processing an outgoing message to a device in accordance with an embodiment of the present claimed invention.

FIG. 29 illustrates the events associated with processing an outgoing message to a device. Note that the TMR and the GPRS Filtered Queuing mechanism handles RF Programming Data messages to ensure that all GPRS Inbound/Outbound service instances are able to receive a copy of each data message. For details, refer to the GPRS Filtered Queuing Software Design Document.

Figure 30:
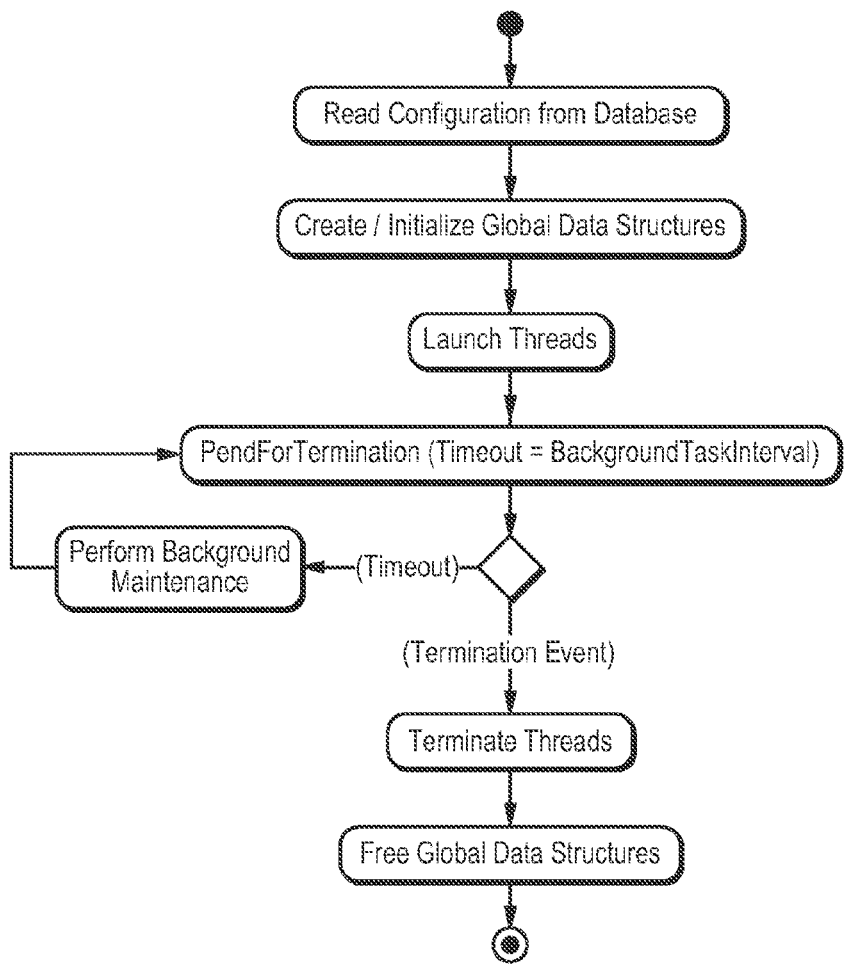
FIG. 30 shows an activity diagram for the logic of a main thread of the GPRS Inbound/Outbound Service in accordance with an embodiment of the present claimed invention.

FIG. 30 shows an activity diagram for the logic of a main thread of the GPRS Inbound/Outbound Service. The GPRS Inbound/Outbound service's main thread of execution handles performing process initialization and termination, as well as performing miscellaneous periodic background tasks.

Figure 31:
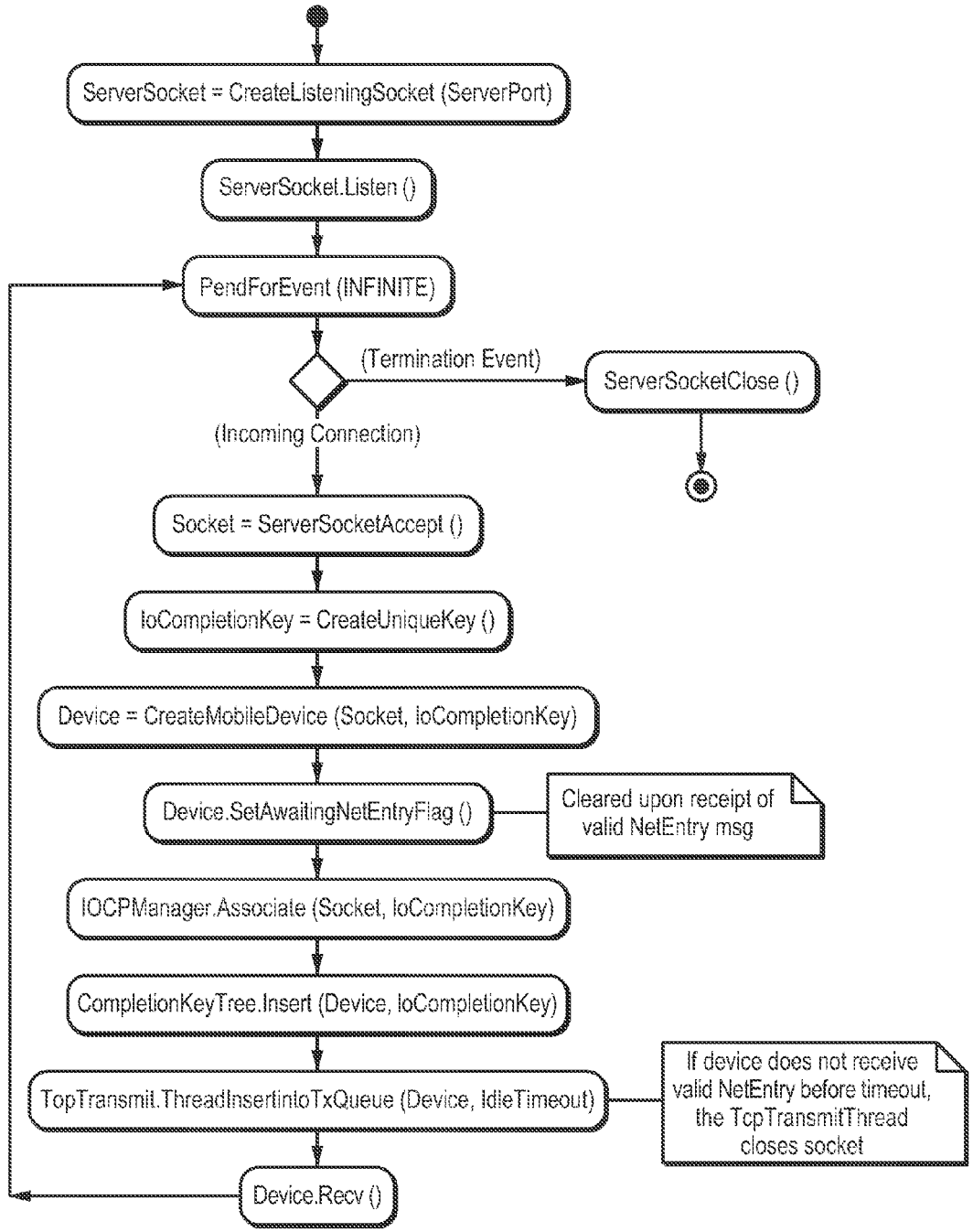
FIG. 31 shows an activity diagram for the controlling logic of the TcpServerThread in accordance with an embodiment of the present claimed invention.

FIG. 31 shows an activity diagram for the controlling logic of the TcpServerThread.

Figure 32:
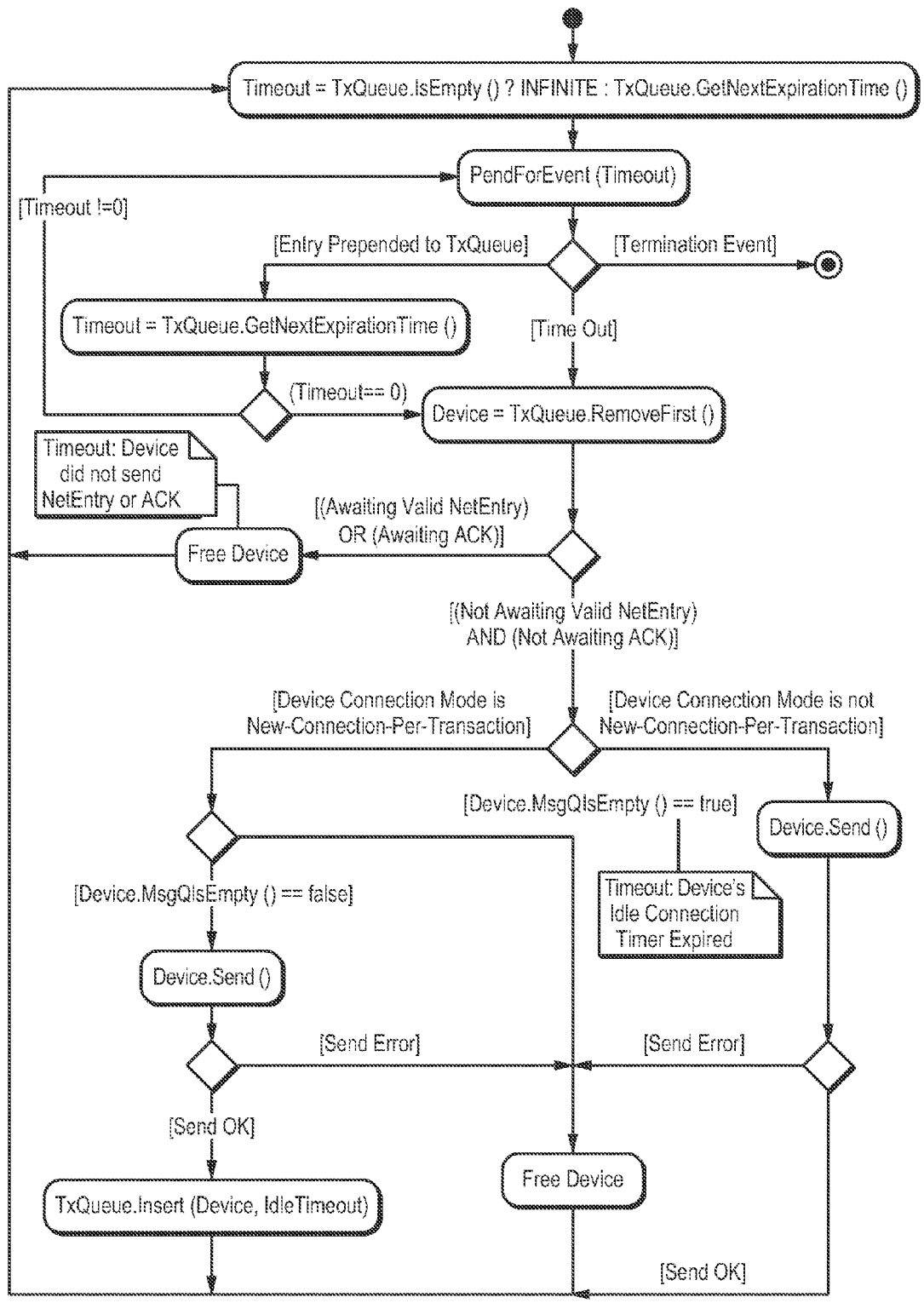
FIG. 32 shows an activity diagram for the controlling logic of the TcpTransmitThread in accordance with an embodiment of the present claimed invention in accordance with an embodiment of the present claimed invention.

FIG. 32 shows an activity diagram for the controlling logic of the TcpTransmitThread. The TcpTransmitThread handles transmitting messages to devices and timing out idle connections. The following activity diagram describes the TcpTransmitThread's controlling logic.

Figure 33:
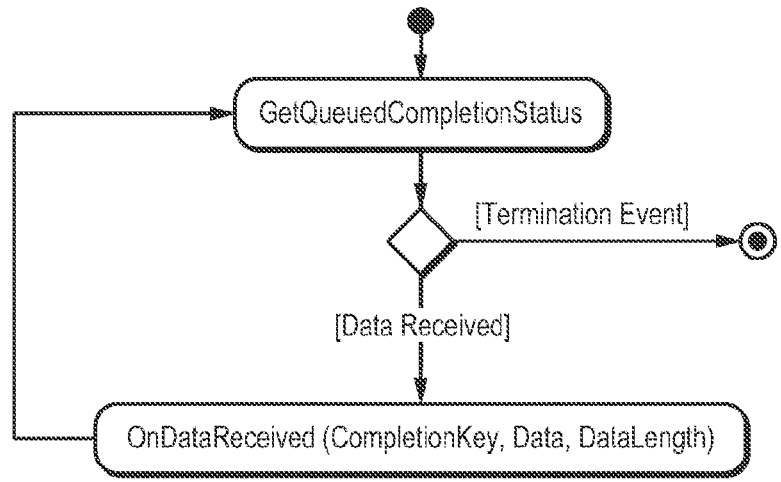
FIG. 33 shows an activity diagram for the controlling logic of the TcpIOCPThread in accordance with an embodiment of the present claimed invention.

FIG. 33 shows an activity diagram for the controlling logic of the TcpIOCPThread. The TcpIOCPThread is responsible for receiving TCP messages from devices and processing them.

Figure 34:
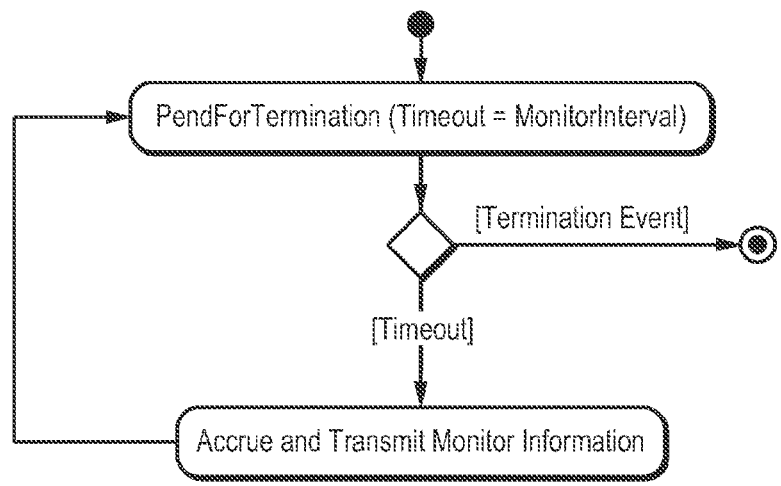
FIG. 34 shows an activity diagram for the controlling logic of the HealthMonitorThread in accordance with an embodiment of the present claimed invention.

FIG. 34 shows an activity diagram for the controlling logic of the HealthMonitorThread. The HealthMonitorThread is responsible for reporting the current status of the GPRS Inbound/Outbound service to QMS.

Table 49 contains the Global Variables.

TABLE 49

| | | |
|---|---|---|
| Global Variables | | |
| Name | Data Type | Description |
| g_CompletionKeyTree | MobileDeviceContainer | Balanced binary tree containing MobileDevice objects sorted and searchable by I/O Completion Key |
| g_IDTree | MobileDeviceContainer | Balanced binary tree containing MobileDevice objects sorted and searchable by device ID |

Table 50 lists the columns in the NCC_CONFIG_SETTINGS table for filtered queuing.

TABLE 50

| | | | | | |
|---|---|---|---|---|---|
| Configuration Settings | | | | | |
| APPL_NAME | SETTING_NAME | VALUE | SETTING_INDEX | CRUD | Comment |
| GPRS I/O | "Source Queue" | "gprs_src_queue" | 0 | R | Name of GPRS device queue |
| GPRS I/O | "Idle Time-out" | 45 | 0 | R | Number of seconds service waits before releasing idle connection for new-connection-per-transaction mode or when waiting for NetEntry from device |

TABLE 50-continued

| Configuration Settings | | | | | |
|---|---|---|---|---|---|
| APPL_NAME | SETTING_NAME | VALUE | SETTING_INDEX | CRUD | Comment |
| GPRS I/O | "Dead Socket Time-out" | 120 | 0 | R | Number of seconds service waits for application-level ACK before releasing connection |
| GPRS I/O | "TCP Initial RTT" | 15 | 0 | R | TCP Stack Initial Retransmission Time-out (per interface???) |
| GPRS I/O | "TCP Max Data Retries" | 3 | 0 | R | TCP Stack Maximum number of retries |
| GPRS I/O | "Bundle Timer" | 10 | 0 | R | Number of seconds to wait for additional messages to bundle |
| GPRS I/O | "RF Data Delay" | 1 | 0 | R | Number of seconds to wait between RF Programming Data messages to a device |

Table 51 lists the row in the NETWORK table for the GPRS network.

TABLE 51

| Network | | | | | |
|---|---|---|---|---|---|
| NETWORK_ID | MAX_MSG_SIZE | NETWORK_NAME | CONNECTION_MODE | CRUD | Comment |
| 3 | 1300 | "GPRS" | 720 | R | Describes configuration for GPRS network. CONNECTION_MODE is a new field that corresponds with Connection-Mode field in the SetIntervals message. See GPRS Wireless ICD for possible values. |

GPRS Filtered Queuing is a new type of queuing mechanism used by the NCC to interface with the GPRS wireless network.

Since the GPRS Inbound/Outbound Server communicates with devices using the connection-oriented TCP protocol, only the server that accepts a device's TCP connection can deliver messages to that device for the life of that connection. When a device connects to an instance of the GPRS Inbound/Outbound Server, the server will query the GPRS Device Queue for all messages destined for the device. As long as the device is connected to the server, the server will continue to monitor the queue for messages to be sent to the device.

This type of queuing is different from the queuing used by CDPD Outbound. Since CDPD Outbound communicates with the CDPD devices via the connectionless UDP protocol, any instance of the CDPD Outbound server can send a message to any CDPD device. Therefore, the CDPD Outbound device queue is simply a first-in, first-out queue. However, the GPRS Device Queue must allow the GPRS Inbound/Outbound Server to receive messages filtered by device ID.

The GPRS Filtered Queuing mechanism exists between TMR and GPRS Inbound/Outbound. The existing queuing infrastructure in the NCC will not be affected by the addition of GPRS Filtered Queuing.

The GPRS Device Queue physically resides on the Queue Manager machine. The GPRS Device Queue is NOT a transactional queue. Since this queue is not transactional, it does not have an associated Request queue and the GPRS Inbound/Outbound servers do not have local destination queues. Also, messages sent to this queue by TMR are sent as "Recoverable."

Only one instance of the GPRS Inbound/Outbound server can send messages to a given GPRS device at any given time. Therefore, the other instances of the server cannot "steal" messages from the queue for that device. It is possible that two GPRS Inbound/Outbound servers may think they have a connection to the same device. However, only one of those connections can be valid. This case only arises when the TCP connection between the device and the original server was not terminated cleanly, and the device subsequently connected to a different server. When this happens, it is possible for the server with the bad connection to grab a message for the device from the queue, thereby "stealing" the message from the server that is actually connected to the device. When the server with the broken connection tries to send the message, it realizes the connection is broken and tears it down. RMR ends up retransmitting the "stolen" message, which is then consumed by the correct instance of GPRS Inbound/Outbound.

Processing of the Device Message Queue by the TMR is not affected by the addition of GPRS Filtered Queuing. Also, the processing of device messages for all networks (e.g., Up.Link, CDPD, etc.) other than the GPRS network is not affected. Messages that are destined for the GPRS network are processed differently.

Every message TMR sends to the GPRS Device Queue is marked with a Correlation ID. The GPRS Inbound/Outbound server uses the Correlation ID to determine if the message is for a device that is currently connected. It also uses the Correlation ID to decide whether or not it needs to consume the message from the queue. Since every message requires a Correlation ID to identify the device it belongs to, TMR does not bundle messages for the GPRS Device Queue. Also, if a single message contains a list of devices, TMR breaks it up into multiple messages, unless it is an RF Programming Data message.

RF Programming Data messages are handled as a special case because the total size of those messages can be significantly larger than other messages. When an RF Programming Data message contains a list of devices, TMR will NOT put a separate message for every device on the list into the GPRS Device Queue. This could potentially cause the queue to grow to hundreds of megabytes in size very quickly. Instead, TMR puts the RF Programming Data message as is into the GPRS Device Queue. However, the message is marked with a special Correlation ID of −1. Note that all other RF Programming messages (Schedule, Start, and NAK Map Request) are not handled in this manner. Only the RF Programming Data messages are assigned a Correlation ID of −1.

All messages TMR sends to the GPRS Device Queue have a relatively short expiration time. All non RF Programming Data messages have an expiration time that is equal to the retransmit interval used by RMR. This prevents the GPRS Device Queue from filling up with duplicate messages destined for devices that are not connected to a GPRS Inbound/Outbound server. The expiration time for RF Programming Data messages is configurable. This value is typically on the order of minutes, and it should be slightly longer than it takes for a GPRS device to receive all of its programming messages. Even with these time-out values, it is possible for the GPRS Device Queue to contain a few duplicate messages. It is up to the GPRS Inbound/Outbound server to filter the duplicates.

The GPRS Inbound/Outbound server manages the connections to the GPRS devices. In addition to receiving messages from the devices, the server sends messages to the devices. The server can only send messages to devices that are connected to it. Therefore, the server monitors the GPRS Device Queue and filters out all messages for devices that are not connected to it. Also, when a device first connects, the server queries the queue for all pending messages for that device.

While devices are connected, the GPRS Inbound/Outbound server monitors the GPRS Device Queue by peeking at messages as they arrive in the queue. When a message arrives in the queue, the server checks the Correlation ID of the message. If the Correlation ID matches the device ID of a device that is connected, the server consumes the message from the queue and delivers it to the device. If the Correlation ID does not correspond to one of the connected devices, the server just ignores the message.

When TMR sends RF Programming Data messages to the GPRS Device Queue, it assigns them a Correlation ID of −1. When the GPRS Inbound/Outbound server peeks at a message with a Correlation ID of −1, it knows the message is an RF Programming Data message and it handles these messages differently. The GPRS Inbound/Outbound server never consumes an RF Programming Data message. The server peeks at the message to get all the information it needs to process it, but the message will remain in the queue until it expires. This type of message remains in the queue because all instances of the GPRS Inbound/Outbound server will need to process it. If one of the servers consumed the message, it would prevent the others from processing it.

To process an RF Programming Data message, the GPRS Inbound/Outbound server extracts the list of devices embedded in the message and determines which (if any) of those devices are connected. If none of the devices in the list are connected, the server can disregard the message. For any of the devices in the list that are connected, the server delivers the RF Programming Data message to them.

When a device connects to the GPRS Inbound/Outbound server, the server creates a temporary queue cursor for the device. GPRS Inbound/Outbound uses this cursor to traverse the entire queue looking for messages destined for the device. While traversing the queue, GPRS Inbound/Outbound skips over RF Programming Data messages. Any other RF Programming messages (Schedule, Start, and NAK Map Request) are processed normally.

Figure 35:
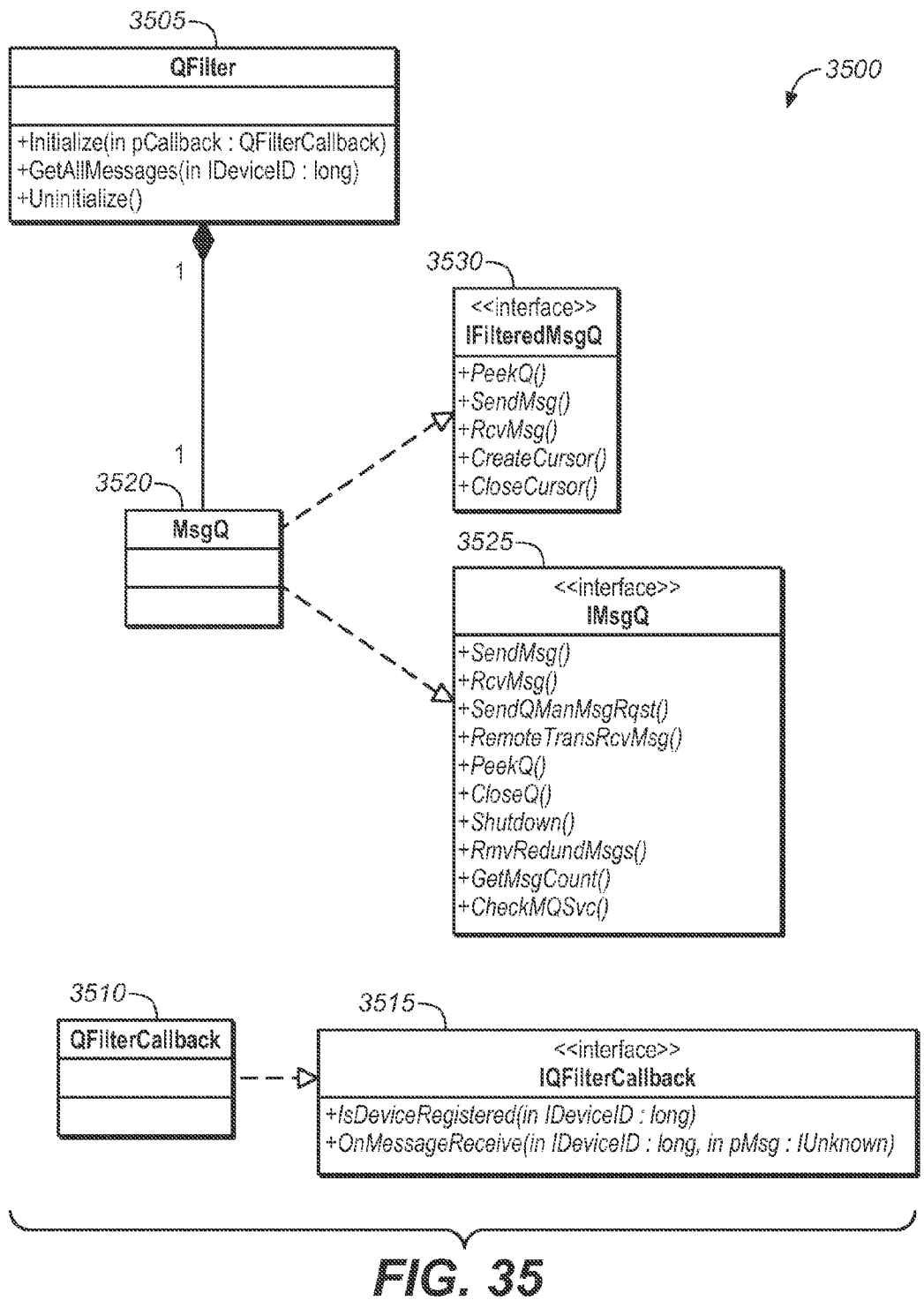
FIG. 35 shows a diagram of the static structure of the GPRS Inbound/Outbound Service's filtered queuing mechanism in accordance with an embodiment of the present claimed invention.

FIG. 35 shows a diagram of the static structure of the GPRS Inbound/Outbound Service 3500.

The QFilter class 3505 is the GPRS Inbound/Outbound server's interface to the GPRS Device Queue. This class provides the mechanism for monitoring the GPRS Device Queue and notifying the GPRS Inbound/Outbound server when messages arrive in the queue for devices that are connected to the server. It also allows the server to request all messages for a particular device when devices first connect to the server.

The QFilterCallback class 3510 provides the mechanism by which the QFilter class 3505 communicates with the core GPRS Inbound/Outbound server logic. The QFilterCallback class realizes the IQFilterCallback interface 3515. The GPRS Inbound/Outbound server implements the IQFilterCallback interface 3515 and passes it to the QFilter object 3505 during initialization. The QFilterCallback class 3510 is implemented by the GPRS Inbound/Outbound application layer.

The MsgQ class 3520 provides the interface to the GPRS Device Queue. On the GPRS Inbound/Outbound side, the QFilter class 3505 uses an instance of the MsgQ class 3520 to receive messages from the queue. On the TMR side, the MsgQ class is used to send messages to the queue. The MsgQ class 3520 realizes both the IMsgQ interface 3525 and the IFilteredMsgQ interface 3530.

Figure 36:
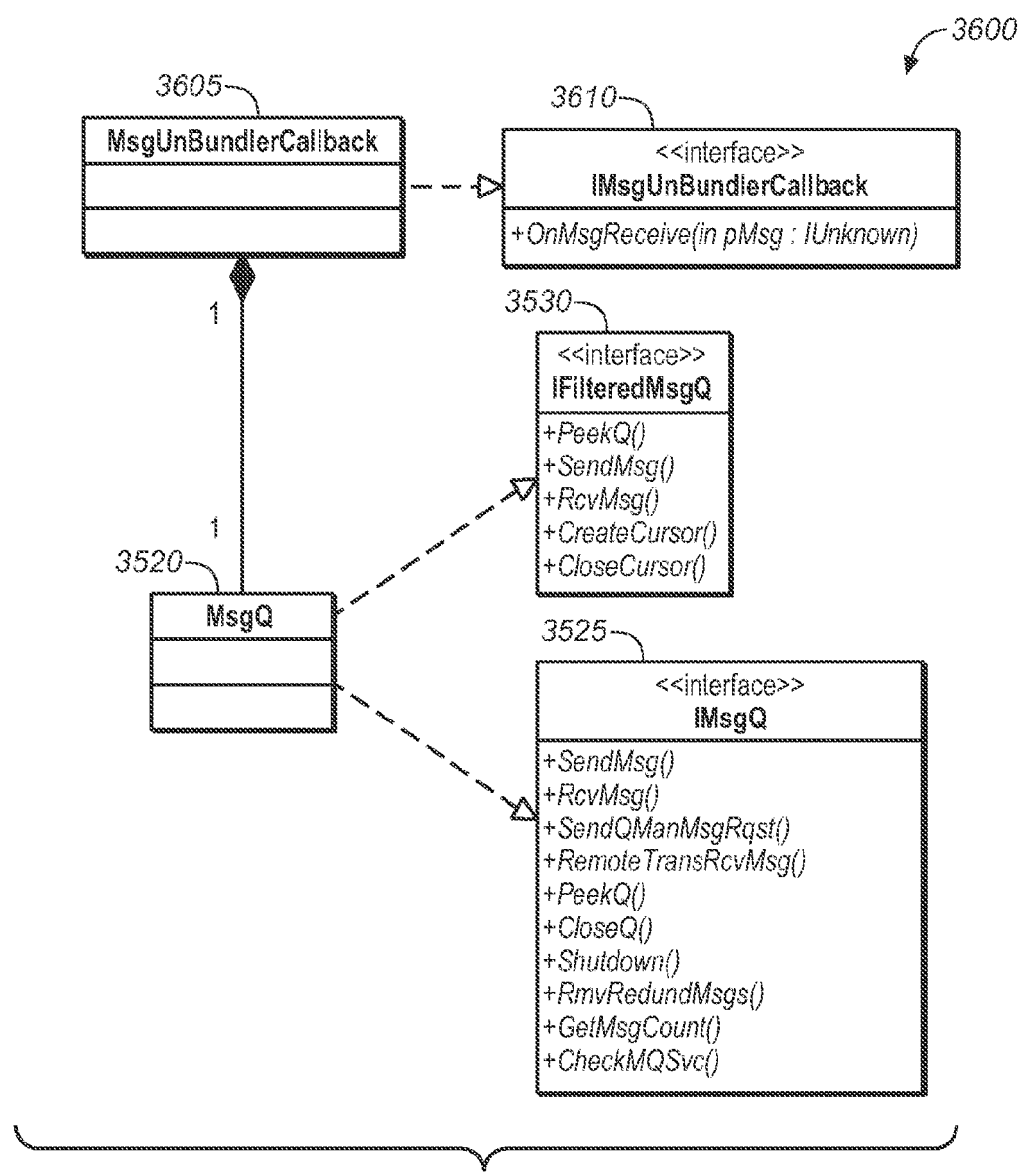
FIG. 36 shows a diagram of the static structure of the queuing mechanism as it relates to Tracker Message Router in accordance with an embodiment of the present claimed invention.

FIG. 36 shows a diagram of the static structure of the Tracker Message Router 3600. TMR implements the MsgUnBundlerCallback class 3605. This class is responsible for processing messages received from the Device Message Queue 3520 and forwarding them to appropriate device queues for the different networks (e.g., CDPD, GPRS, Up.Link, GPRS, etc.). Messages sent to the GPRS Device Queue are not be bundled, so MsgUnBundlerCallback 3605 uses a MsgQ object 3520 to place messages directly into the GPRS Device Queue.

The QFilterCallback class 3510 realizes the IQFilterCallback interface 3515. This interface has two methods, IsDeviceRegistered and OnMessageReceive. The IsDeviceRegistered method provides the QFilter 3505 object the ability to determine if a device is currently connected to the GPRS Inbound/Outbound server. The QFilter class 3505 calls this method after peeking at the GPRS Device Queue to determine if the device the message is for is currently connected to the GPRS Inbound/Outbound server. If the device is connected, the QFilter object pulls the message from the queue and calls OnMessageReceive to hand the message over to the GPRS Inbound/Outbound server.

The IMsgQ interface 3525 provides the basic operations for communicating with MSMQ queues; open, close, send, receive, etc.

The MsgQ class 3520 also realizes the IFilteredMsgQ 3530 interface. This interface provides filtered queuing support. The IFilteredMsgQ interface 3530 provides a method for sending a message to a queue and marking it with a special correlation identifier. It also provides methods for peeking at messages in the queue and receiving messages that are not at the beginning of the queue.

The MsgUnBundlerCallback class 3605 realizes the IMsgUnBundlerCallback interface 3610. This interface has the method OnMsgReceive. This method provides the interface for the MsgUnBundlerCallback object 3610 to receive messages from the Device Message Queue.

Figure 37:
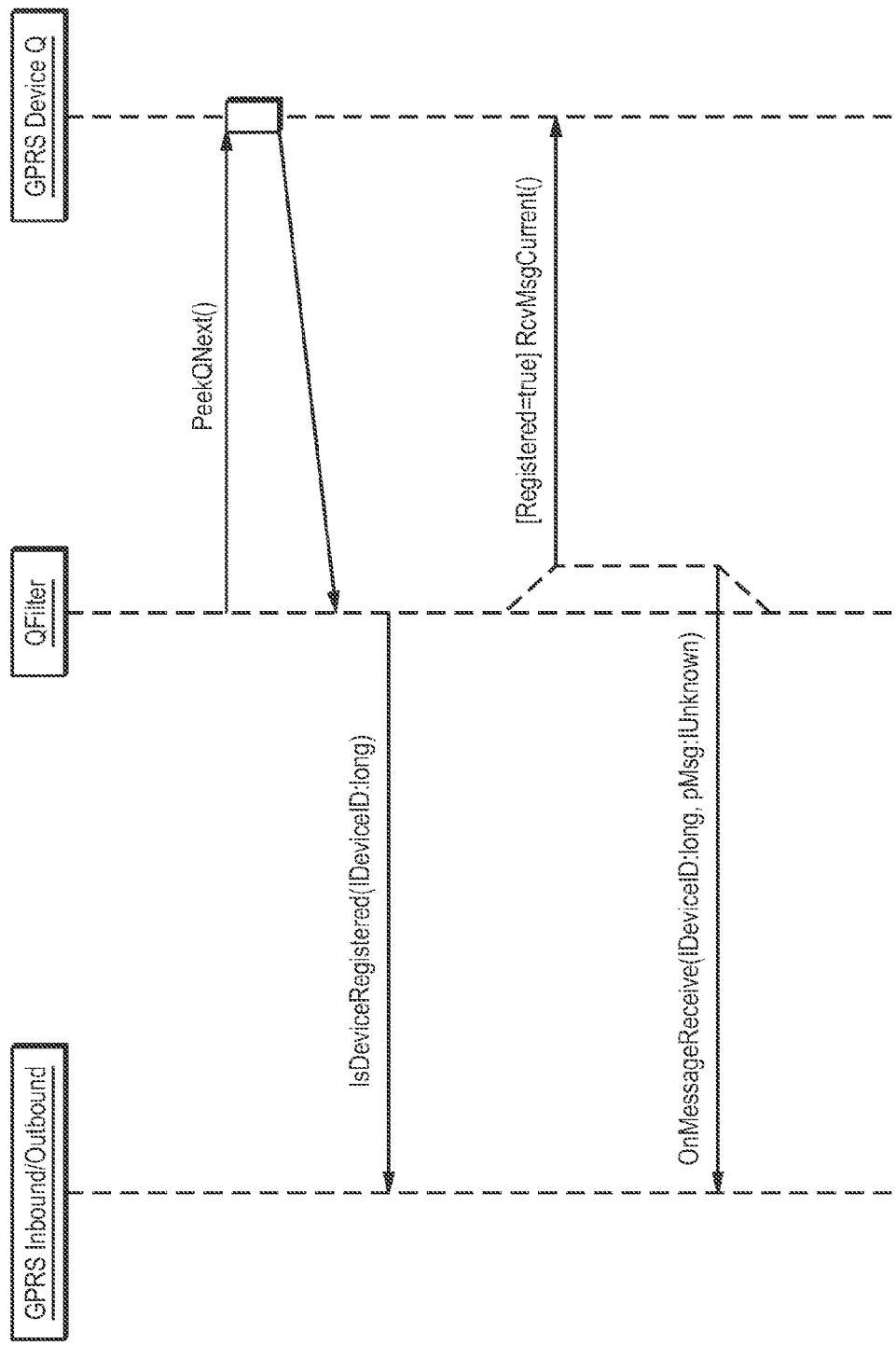
FIG. 37 shows a diagram of the interaction between the GPRS Inbound/Outbound Server and the GPRS Device Queue in accordance with an embodiment of the present claimed invention.

FIG. 37 shows a diagram of the sequence of events that occur when the GPRS Inbound/Outbound server receives a message for a device that is currently connected. The QFilter object starts the sequence by issuing an asynchronous "peek-next" operation on the GPRS Device Queue. When a message arrives in the queue, an event is signaled. The QFilter extracts the device ID from the message properties and asks the GPRS Inbound/Outbound application layer if the device is registered. If the device is not registered, the QFilter object simply issues another asynchronous "peek-next" operation to wait for the next message. If the device is registered, the QFilter object consumes the message from the queue and delivers it to the GPRS Inbound/Outbound application layer.

Figure 38:
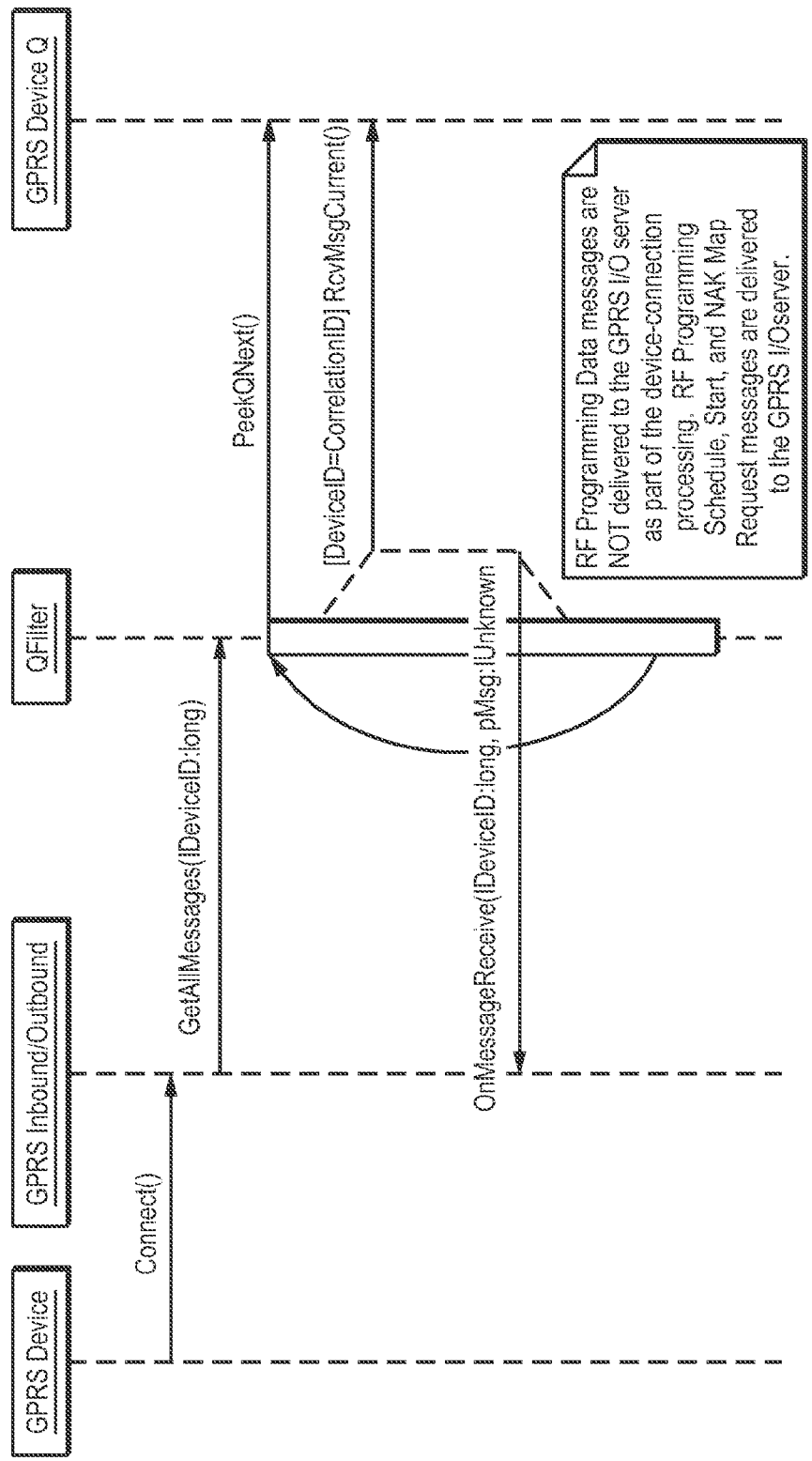
FIG. 38 shows a sequence diagram describing the events related to queuing that occur when a GPRS device connects to the GPRS Inbound/Outbound Service in accordance with an embodiment of the present claimed invention.

FIG. 38 shows a diagram of the sequence of events when a device connects to the GPRS Inbound/Outbound server. When a device is not connected, messages for the device can accumulate in the GPRS Device Queue. When the device connects, the GPRS Inbound/Outbound server pulls all messages for the device from the queue and delivers them to the device. The GPRS Inbound/Outbound server starts this process by asking the QFilter object for all messages for the device that just connected. The QFilter object opens a new cursor to the beginning of the queue and peeks at the first message. If the device ID matches the correlation ID of the message, the QFilter object consumes the message from the queue and delivers it to the GPRS Inbound/Outbound application layer. If the device ID does not match the correlation ID of the message, the QFilter object skips that message and peeks at the next message. This process repeats until the QFilter object reaches the end of the queue.

While the QFilter object is traversing the queue looking for messages for the device that just connected, it will not notify the GPRS Inbound/Outbound application layer about RF Programming Data messages. The QFilter object will notify GPRS Inbound/Outbound about any other RF Programming messages (e.g., Schedule, Start, and NAK Map Request). If the device that just connected established a new connection, rather than reconnecting after a previous connection was broken, then none of the RF Programming Data messages sitting in the queue will be destined for the device.

If, on the other hand, the device was in the process of being programmed when it lost its connection and it quickly reconnected, there may still be RF Programming Data messages for the device in the queue. However, this case is unlikely (although possible) because the device should be stationary while it is being programmed. Although the device will not receive the RF Programming Data messages after the reconnect, it will receive any other RF Programming messages that are waiting for it in the queue. If an RF Programming NAK Map Request message is waiting for the device, it will be delivered to the device. When the device acknowledges the NAK Map Request, TCS will retransmit the RF Programming Data packets that the device did not receive.

Figure 39:
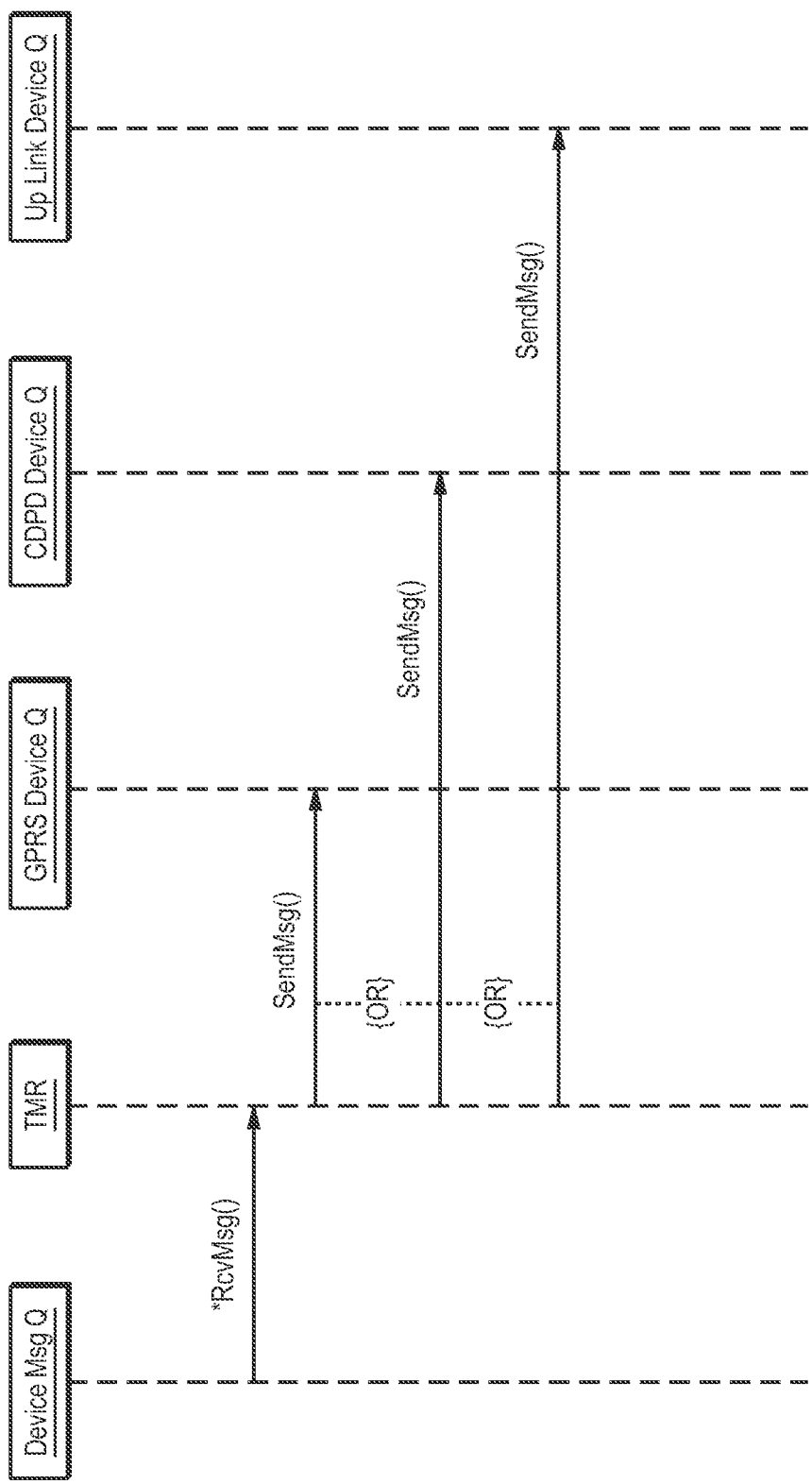
FIG. 39 is a sequence diagram showing Tracker Message Router routing a message to the appropriate device queue in accordance with an embodiment of the present claimed invention.

FIG. 39 shows a diagram of the high-level interaction between TMR and the various device message queues. When TMR receives a message from the Device Message Queue, it examines the message to determine which network it is for and then it delivers the message to the device queue for that network.

Figure 40:
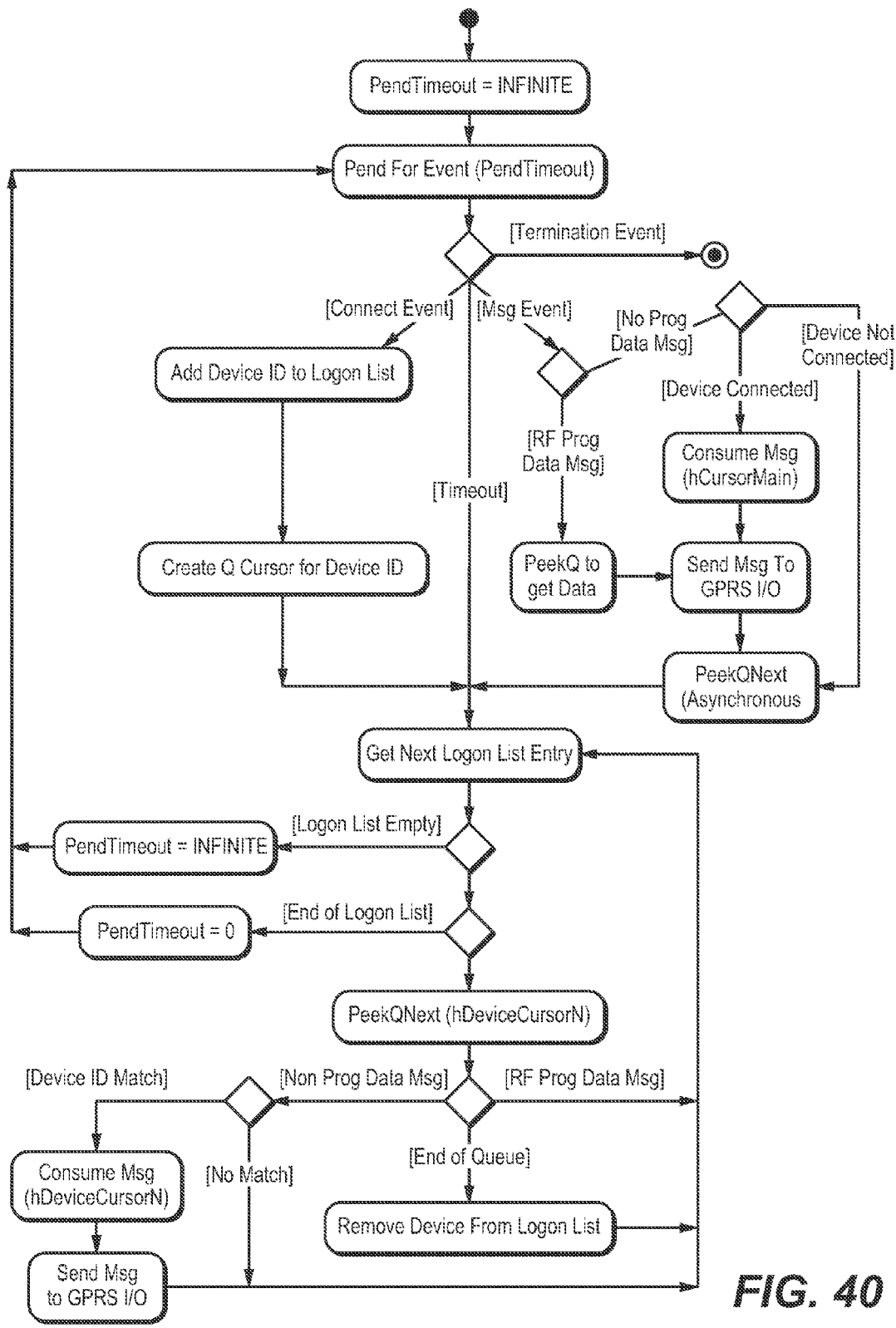
FIG. 40 shows an activity diagram for the GPRS Inbound/Outbound QFilter Thread in accordance with an embodiment of the present claimed invention.

FIG. 40 shows an activity diagram of the logic of the QFilter object's thread of execution. At the top of the main loop, the thread pends on three different events: the TerminationEvent, the ConnectEvent, and the MessageEvent. The time-out on the pend operation (PendTimeout) is either INFINITE or zero depending on the state of the Device Logon list. As long as the Device Logon list is not empty, the PendTimeout value is zero. When the Device Logon list is empty, the PendTimeout value is set to INFINITE. When the TerminationEvent is signaled, the thread terminates.

The ConnectEvent gets signaled when a device connects to the GPRS Inbound/Outbound server. When this happens, the server calls the GetAllMessages method of the QFilter object passing in the device ID of the device that just connected. When the QFilter thread detects the ConnectEvent, it adds the device ID to the Device Logon list and creates a new queue cursor for that device ID. The queue cursor is used to traverse the GPRS Device Queue looking for messages for the associated device. The Device Logon list is simply a list of device IDs each with it own corresponding queue cursor.

The QFilter thread could traverse the entire GPRS Device Queue at once when a device connects. However, depending on the size of the queue at that time, this could cause delays in processing messages for other devices. Therefore, the QFilter thread handles the Device Logon list as follows. During each pass through the main loop, the QFilter thread makes one complete iteration through the Device Logon list. For each device ID in the list, the QFilter thread peeks at the next message according to that device ID's associated cursor. If the message correlation ID does not match the current device ID, the message is ignored. If the correlation ID does match the current device ID, the message is either consumed and delivered to the GPRS Inbound/Outbound server (if it is not an RF Programming Data message) or ignored (if it is an RF Programming Data message). If the peek operation places the cursor at the end of the queue, the cursor for that device ID is closed and the device ID is removed from the Device Logon list.

After a complete pass through the Device Logon list, control returns to the top of the main loop to check the state of the three events and to service those events if signaled. Recall that the PendTimeout value is zero when there are entries in the Device Logon list. If this is the case, and if none of the events are signaled, control immediately falls through to make another pass through the Device Logon list. When the device logon list becomes empty, the PendTimeout value is set to INFINITE and the thread pends for one of the events to become signaled.

The last event is the MessageEvent. This event becomes signaled when a message arrives in the GPRS Device Queue. When the QFilter thread detects that this event has been signaled, it checks the correlation ID of the message that just arrived. If the message is an RF Programming Data message (Correlation ID=−1), the thread does not consume the message from the queue. It peeks at the message again to get the data and then it just delivers it to the GPRS Inbound/Outbound server. If it is not an RF Programming Data message, the thread checks to see if the correlation ID matches one of the devices that are connected to the GPRS Inbound/Outbound server. If the correlation ID doesn't match a connected device, the thread simply issues another asynchronous peek operation. If the correlation ID does match a connected device, the QFilter object consumes the message from the queue and then delivers it to the GPRS Inbound/Outbound application layer.

Figure 41:
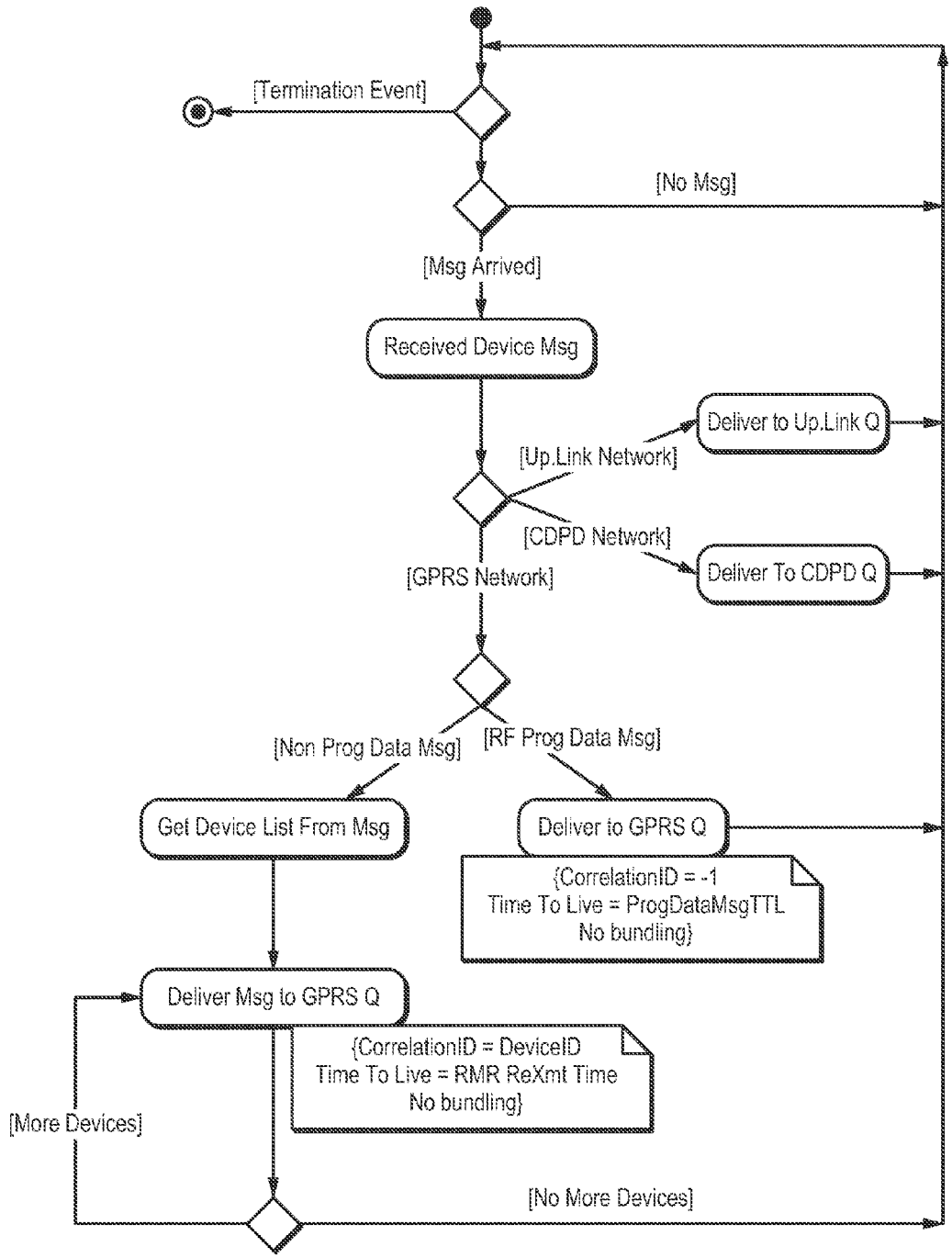
FIG. 41 shows an activity diagram for TMR Device Message Processing in accordance with an embodiment of the present claimed invention.

FIG. 41 shows an activity diagram for how TMR processes device messages. Generally, TMR sits in a loop waiting for messages from the Device Message Queue. When a message arrives, TMR determines which network the message is for and delivers the message to the device queue for that network. The details of the CDPD network and Up.Link network are beyond the scope of this document. Therefore, the diagram focuses on the details of messages bound for the GPRS network.

When TMR determines a device message is for the GPRS network, it checks the type of message before processing it. TMR handles RF Programming Data messages differently than all other messages. Only one copy of an RF Programming Data message is put into the GPRS Device Queue (even if the message contains a list of devices). These messages are tagged with a special correlation ID of −1 and a Time To Live value equal to the configurable ProgDataMsgTTL setting.

If the message isn't an RF Programming Data message, TMR extracts the device list from the message and places one copy of the message into the GPRS Device Queue for each device in the list. For each of these messages, the correlation ID will be set to the appropriate device ID and the Time To Live value will be set to the value of the RMR retransmit timer.

Table 52 describes the user database settings used to support GPRS Filtered Queuing.

TABLE 52

USD-NCC_CONFIG_SETTINGS

| APPL_NAME | SETTING_NAME | VALUE | SETTING_INDEX | Comment |
| --- | --- | --- | --- | --- |
| TMR | "Prog Data Msg TTL" | 300 | 0 | This is a new setting for TMR. The units are seconds. This parameter is used by TMR as the Time To Live value when sending RF Programming Data messages to the GPRS Device Queue. |
| RMR | "Rate" | 60 | 0 | This is an existing setting. TMR uses this setting to set the Time To Live value when sending non RF Programming Data messages to the GPRS Device Queue. |
| GPRS I/O | "Source Queue" | "gprs_src_queue" | 0 | Name of GPRS device queue. GPRS Inbound/Outbound and TMR use this value. |

Figure 42:
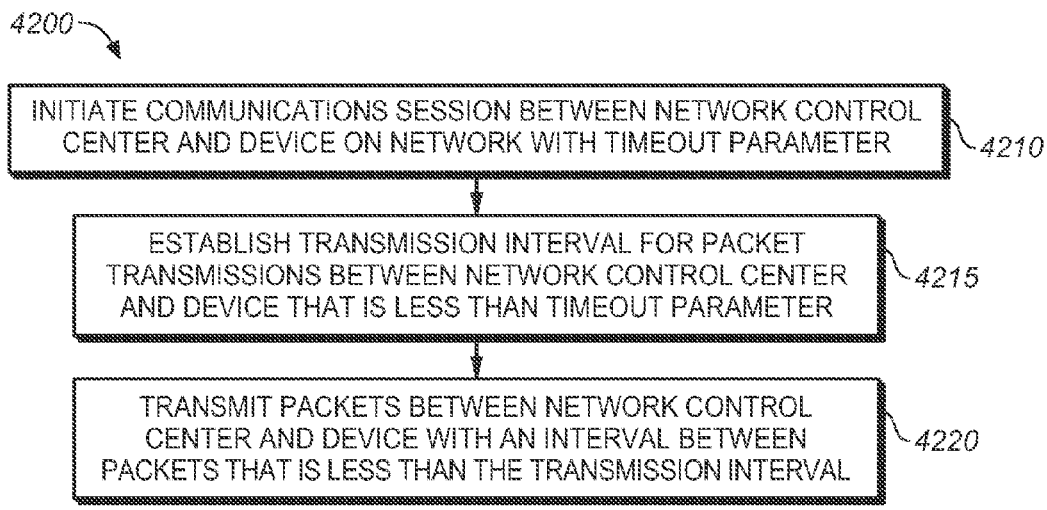
FIG. 42 shows a flow chart for optimizing data transmission between a network control center and a device in accordance with a method embodiment of the present claimed invention.

FIG. 42 shows a flow chart 4200 for optimizing data transmission between a network control center and a device in accordance with a method embodiment of the present claimed invention.

In step 4210, a communications session is initiated between a network control center and a mobile device on a network that has a timeout parameter. For example, a TCP or UDP session may be initiated on a GPRS network.

In step 4215, a transmission interval is established in view of the timeout parameter of the network. The transmission interval is set a value less than the timeout parameter.

In step 4220, the communications session is carried out by transmitting packets between the network control center and the device such that the time interval between packets is kept less than or equal to the transmission interval. When there is sufficient data to exchange, the packet stream may be made up of data packets; however, if necessary, a keep-alive packet may be transmitted to avoid the occurrence of a timeout.

Figure 43:
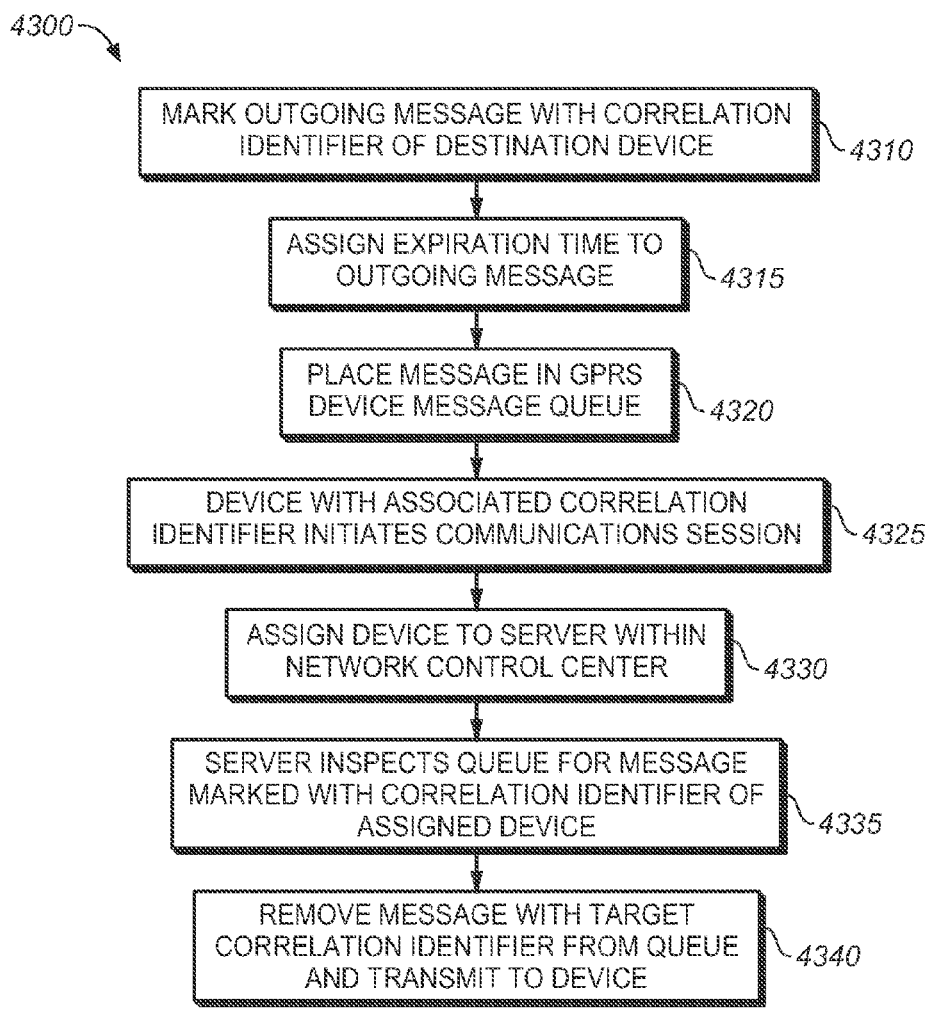
FIG. 43 shows a flow chart for queuing and serving an outgoing message in a network control center in accordance with a method embodiment of the present claimed invention.

FIG. 43 shows a flow chart 4300 for queuing and serving an outgoing message in a network control center that is coupled to a device by a GPRS network.

In step 4310, an outgoing message that is intended for a device is marked with a correlation identifier associated with that device. In step 4315, an expiration time is assigned to the outgoing message. In step 4320, the message is placed in a GPRS device message queue.

In step 4325, the device associated with the aforementioned correlation identifier initiates a communications session with the network control center. In step 4330, a server within the network control center is assigned to handle the communications session with the device. In step 4335, the server inspects the GPRS device queue, targeting messages for the device that has been assigned to it. In step 4340, the server removes the message having the correlation identifier of the device from the queue and transmits the message to the device.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

What is claimed is:

1. A method for optimizing data transmission using transmission control protocol (TCP) between a device and a network control center coupled by a General Packet Radio Service (GPRS) network having a time-out parameter, comprising:
    initiating a TCP session between said device and said network control center, wherein said device and said network control are coupled by said GPRS;
    establishing a transmission interval for packet transmissions between said device and said network control center wherein said transmission interval is less than said time-out parameter;
    transmitting a plurality of packets between said network control center and said device; and
    ensuring that a time interval between each transmitted packet of said plurality of packets is less than or equal to said transmission interval by a combination of:
        adjusting a frequency of said packet transmissions when there is sufficient data to exchange; and
        transmitting a keep-alive packet as one of said plurality of packets when there insufficient data to exchange.

2. The method of claim 1, further including having said network control center obtain said time-out parameter from said GPRS network.

3. The method of claim 1, further including having said device obtain said time-out parameter from said GPRS network.

4. The method of claim 1, further including having said network control center empirically determine said time-out parameter.

5. The method of claim 1, further including transmitting at least one keep-alive packet.

6. The method of claim 5, wherein said keep-alive packet is transmitted by said network control center.

7. The method of claim 5, wherein said keep-alive packet is transmitted by said device.

8. The method of claim 1, further including passing said transmission interval from said network control center to said device.

9. A method for optimizing data transmission using user datagram protocol (UDP) between a device and a network control center coupled by a General Packet Radio Service (GPRS) network having a time-out parameter, comprising;
    having said device initiate a UDP session with said network control center, wherein said device and said network control are coupled by said GPRS;
    establishing a transmission interval for packet transmissions between said device and said network control center wherein said transmission interval is less than said time-out parameter;
    transmitting a plurality of packets between said network control center and said device; and
    ensuring that a time interval between each transmitted packet of said plurality of packets is less than or equal to said transmission interval by a combination of:
        adjusting a frequency of said packet transmissions when there is sufficient data to exchange; and
        transmitting a keep-alive packet as one of said plurality of packets when there insufficient data to exchange.

10. The method of claim 9, further including having said network control center obtain said time-out parameter from said GPRS network.

11. The method of claim 9, further including having said device obtain said time-out parameter from said GPRS network.

12. The method of claim 9, further including having said network control center empirically determine said time-out parameter.

13. The method of claim 9, further including transmitting at least one keep-alive packet.

14. The method of claim 13, wherein said keep-alive packet is transmitted by said network control center.

15. The method of claim 13, wherein said keep-alive packet is transmitted by said device.

16. The method of claim 9, further including passing said transmission interval from said network control center to said device.

* * * * *